(12) United States Patent
El-Siblani et al.

(10) Patent No.: US 9,486,944 B2
(45) Date of Patent: Nov. 8, 2016

(54) RESIN SOLIDIFICATION SUBSTRATE AND ASSEMBLY

(71) Applicant: Global Filtration Systems, Dearborn Heights, MI (US)

(72) Inventors: Ali El-Siblani, Dearborn Heights, MI (US); Alexandr Shkolnik, Los Angeles, CA (US)

(73) Assignee: Global Filtration Systems, Dearborn Heights, MI (US)

( * ) Notice: Subject to any disclaimer, the term of this patent is extended or adjusted under 35 U.S.C. 154(b) by 852 days.

(21) Appl. No.: 13/740,397

(22) Filed: Jan. 14, 2013

(65) Prior Publication Data

US 2013/0140741 A1 Jun. 6, 2013

Related U.S. Application Data

(63) Continuation of application No. 12/907,853, filed on Oct. 19, 2010, now Pat. No. 8,372,330.

(60) Provisional application No. 61/300,417, filed on Feb. 1, 2010, provisional application No. 61/252,901, filed on Oct. 19, 2009.

(51) Int. Cl.
  *B29C 33/44* (2006.01)
  *B29C 67/00* (2006.01)

(52) U.S. Cl.
  CPC .......... *B29C 33/44* (2013.01); *B29C 67/0085* (2013.01)

(58) Field of Classification Search
  USPC .................................. 264/401; 425/174, 169
  See application file for complete search history.

(56) References Cited

U.S. PATENT DOCUMENTS

| | | | |
|---|---|---|---|
| 4,837,379 A | 6/1989 | Weinberg | |
| 4,929,402 A | 5/1990 | Hull | |
| 4,999,143 A | 3/1991 | Hull et al. | |

(Continued)

FOREIGN PATENT DOCUMENTS

| | | |
|---|---|---|
| DE | 4105314 | 8/1991 |
| DE | 4102257 | 7/1992 |

(Continued)

OTHER PUBLICATIONS

Opposition to EP 2 011 631, dated Jan. 14, 2013.

(Continued)

*Primary Examiner* — Alison L Hindenlang
*Assistant Examiner* — Kimberly A Stewart
(74) *Attorney, Agent, or Firm* — Hansen IP Law PLLC

(57) ABSTRACT

A solidification substrate assembly for making a three-dimensional object from a solidifiable material includes a solidification substrate assembly. In certain examples, the solidifiable material solidifies in contact with the solidification substrate, and the tilting of the substrate and/or or the use of a peeling member facilitates separation of the substrate from the solidified material. In other examples, the solidification substrate assembly includes a film that is adjacent to a rigid or semi-rigid layer. The solidifiable material solidifies in contact with the film, and a peeling member peels the film away from the solidified material. Intelligent solidification substrate assemblies are also described in which a force sensor determines when to expose the solidifiable material to solidification energy and/or whether to use a peeling member to separate the solidification substrate from a solidified objection section.

24 Claims, 46 Drawing Sheets

(56) References Cited

U.S. PATENT DOCUMENTS

| | | |
|---|---|---|
| 5,009,585 A | 4/1991 | Hirano et al. |
| 5,089,185 A | 2/1992 | Hirano et al. |
| 5,093,130 A | 3/1992 | Fuji et al. |
| 5,137,662 A | 8/1992 | Hull et al. |
| 5,139,338 A | 8/1992 | Pomerantz et al. |
| 5,143,663 A | 9/1992 | Leyden et al. |
| 5,157,423 A | 10/1992 | Zur |
| 5,171,490 A | 12/1992 | Fudim |
| 5,173,266 A | 12/1992 | Kenney |
| 5,174,931 A | 12/1992 | Almquist et al. |
| 5,236,637 A | 8/1993 | Hull |
| 5,247,180 A | 9/1993 | Mitcham et al. |
| 5,248,456 A | 9/1993 | Evans, Jr. et al. |
| 5,263,130 A | 11/1993 | Pomerantz et al. |
| 5,268,994 A | 12/1993 | Keskes |
| 5,289,214 A | 2/1994 | Zur |
| 5,298,208 A | 3/1994 | Sibley et al. |
| 5,306,446 A | 4/1994 | Howe |
| 5,345,391 A | 9/1994 | Hull et al. |
| 5,360,981 A | 11/1994 | Owen et al. |
| 5,391,072 A | 2/1995 | Lawton et al. |
| 5,447,822 A | 9/1995 | Hull et al. |
| 5,510,077 A | 4/1996 | Dinh et al. |
| 5,529,473 A | 6/1996 | Lawton et al. |
| 5,545,367 A | 8/1996 | Bae et al. |
| 5,569,431 A | 10/1996 | Hull |
| 5,571,471 A | 11/1996 | Hull |
| 5,611,880 A | 3/1997 | Onishi |
| 5,630,981 A | 5/1997 | Hull |
| 5,637,169 A | 6/1997 | Hull et al. |
| 5,651,934 A | 7/1997 | Almquist et al. |
| 5,653,925 A | 8/1997 | Batchelder |
| 5,658,412 A | 8/1997 | Retallick et al. |
| 5,823,778 A | 10/1998 | Schmitt et al. |
| 5,833,914 A | 11/1998 | Kawaguchi |
| 5,858,746 A | 1/1999 | Hubbell et al. |
| 5,876,550 A | 3/1999 | Feygin et al. |
| 5,891,382 A | 4/1999 | Almquist et al. |
| 5,894,036 A | 4/1999 | Tylko |
| 5,902,537 A | 5/1999 | Almquist et al. |
| 5,945,058 A | 8/1999 | Mannres et al. |
| 5,980,813 A | 11/1999 | Narang et al. |
| 6,013,099 A | 1/2000 | Dinh et al. |
| 6,027,324 A | 2/2000 | Hull |
| 6,048,487 A | 4/2000 | Almquist et al. |
| 6,051,179 A | 4/2000 | Hagenau |
| 6,153,034 A | 11/2000 | Lipsker |
| 6,158,946 A | 12/2000 | Miyashita |
| 6,171,610 B1 | 1/2001 | Vacanti et al. |
| 6,200,646 B1 * | 3/2001 | Neckers ............... B29C 67/007 264/401 |
| 6,280,727 B1 | 8/2001 | Prior et al. |
| 6,281,903 B1 | 8/2001 | Martin et al. |
| 6,334,865 B1 | 1/2002 | Redmond et al. |
| 6,352,710 B2 | 3/2002 | Sawhney et al. |
| 6,500,378 B1 | 12/2002 | Smith |
| 6,547,552 B1 | 4/2003 | Fudim |
| 6,630,009 B2 | 10/2003 | Moussa et al. |
| 6,740,474 B2 | 5/2004 | Border et al. |
| 6,764,636 B1 | 7/2004 | Atlanic et al. |
| 6,833,231 B2 | 12/2004 | Moussa et al. |
| 6,833,234 B1 | 12/2004 | Bloomstein et al. |
| 6,942,830 B2 | 9/2005 | John |
| 6,974,656 B2 | 12/2005 | Hinczewski |
| 6,989,225 B2 | 1/2006 | Steinman |
| 7,073,883 B2 | 7/2006 | Billow |
| 7,133,041 B2 | 11/2006 | Kaufman et al. |
| 7,195,472 B2 | 3/2007 | John |
| 7,215,430 B2 | 5/2007 | Kacyra et al. |
| 7,261,542 B2 | 8/2007 | Hickerson et al. |
| 7,614,866 B2 | 11/2009 | Sperry et al. |
| 7,845,930 B2 | 12/2010 | Shkolnik et al. |
| 7,906,061 B2 | 3/2011 | Partanen et al. |
| 8,142,179 B2 | 3/2012 | Kihara et al. |
| 2001/0028495 A1 | 10/2001 | Quate et al. |
| 2001/0048183 A1 | 12/2001 | Fujita |
| 2002/0028854 A1 | 3/2002 | Allanic et al. |
| 2002/0153640 A1 | 10/2002 | John |
| 2002/0155189 A1 | 10/2002 | John |
| 2003/0067539 A1 | 4/2003 | Doerfel et al. |
| 2003/0074096 A1 | 4/2003 | Das et al. |
| 2003/0205849 A1 | 11/2003 | Farnworth |
| 2004/0008309 A1 | 1/2004 | Yamahara et al. |
| 2004/0020614 A1 | 2/2004 | Lindsay et al. |
| 2004/0118309 A1 | 6/2004 | Fedor et al. |
| 2005/0023710 A1 | 2/2005 | Bridkin et al. |
| 2005/0208168 A1 | 9/2005 | Hickerson et al. |
| 2005/0248061 A1 | 11/2005 | Shkolnik et al. |
| 2005/0248062 A1 | 11/2005 | Shkolnik et al. |
| 2005/0288813 A1 | 12/2005 | Yang et al. |
| 2006/0078638 A1 | 4/2006 | Holmboe et al. |
| 2006/0192312 A1 | 8/2006 | Wahlstrom et al. |
| 2006/0239588 A1 | 10/2006 | Hull et al. |
| 2006/0249884 A1 | 11/2006 | Partanen et al. |
| 2007/0074659 A1 | 4/2007 | Wahlstrom |
| 2007/0075458 A1 | 4/2007 | Wahlstrom et al. |
| 2007/0075459 A1 | 4/2007 | Reynolds et al. |
| 2007/0075460 A1 | 4/2007 | Wahlstrom et al. |
| 2007/0075461 A1 | 4/2007 | Hunter et al. |
| 2007/0077323 A1 | 4/2007 | Stonesmith et al. |
| 2007/0120842 A1 | 5/2007 | Hess |
| 2007/0257055 A1 | 11/2007 | Scott et al. |
| 2007/0259066 A1 | 11/2007 | Sperry et al. |
| 2008/0038396 A1 | 2/2008 | John et al. |
| 2008/0054531 A1 | 3/2008 | Kerekes et al. |
| 2008/0169586 A1 | 7/2008 | Hull et al. |
| 2008/0169589 A1 | 7/2008 | Sperry et al. |
| 2008/0170112 A1 | 7/2008 | Hull et al. |
| 2008/0179786 A1 | 7/2008 | Sperry et al. |
| 2008/0179787 A1 | 7/2008 | Sperry et al. |
| 2008/0181977 A1 | 7/2008 | Sperry et al. |
| 2008/0206383 A1 | 8/2008 | Hull et al. |
| 2008/0217818 A1 | 9/2008 | Holmboe et al. |
| 2008/0226346 A1 | 9/2008 | Hull et al. |
| 2008/0231731 A1 | 9/2008 | Hull |
| 2008/0309665 A1 | 12/2008 | Gregory, II et al. |
| 2009/0020901 A1 | 1/2009 | Schillen et al. |
| 2009/0289384 A1 | 11/2009 | Maaldernik et al. |
| 2010/0320648 A1 | 12/2010 | Jamar et al. |
| 2011/0001272 A1 | 1/2011 | Honda et al. |

FOREIGN PATENT DOCUMENTS

| | | |
|---|---|---|
| DE | 4125534 | 2/1993 |
| DE | 9319405 | 5/1994 |
| DE | 4340108 | 9/1997 |
| DE | 19727554 | 1/1999 |
| DE | 29911122 | 11/1999 |
| DE | 19838797 | 2/2000 |
| DE | 19929199 | 1/2001 |
| DE | 10003374 | 8/2001 |
| DE | 10018987 | 10/2001 |
| DE | 20106887 | 10/2001 |
| DE | 69909136 | 5/2004 |
| DE | 10256672 A1 | 6/2004 |
| EP | 0250121 | 12/1987 |
| EP | 0435564 | 7/1991 |
| EP | 0426363 | 8/1991 |
| EP | 0466422 | 1/1992 |
| EP | 0484086 | 5/1992 |
| EP | 1250995 | 10/2002 |
| EP | 1250997 | 10/2002 |
| EP | 1270185 | 1/2003 |
| EP | 1192041 | 3/2003 |
| EP | 1156922 | 6/2003 |
| EP | 1338846 | 8/2003 |
| EP | 1674243 | 6/2006 |
| EP | 1849587 | 10/2007 |
| EP | 1876012 A1 | 1/2008 |
| EP | 1880830 | 1/2008 |
| EP | 1894704 | 3/2008 |
| EP | 1950032 | 7/2008 |
| EP | 2011631 | 1/2009 |
| EP | 2011631 B1 | 4/2012 |

(56) References Cited

FOREIGN PATENT DOCUMENTS

| | | |
|---|---|---|
| FR | 2254194 | 12/1986 |
| FR | 2634686 | 2/1990 |
| FR | 2692053 | 12/1993 |
| JP | 04371829 | 12/1992 |
| JP | 08150662 | 6/1996 |
| JP | 08192469 | 7/1996 |
| WO | 9511007 | 4/1995 |
| WO | 9600422 | 1/1996 |
| WO | 0100390 | 1/2001 |
| WO | 0112679 | 2/2001 |
| WO | 0172501 | 10/2001 |
| WO | 03059184 | 7/2003 |
| WO | 2005110722 | 11/2005 |

OTHER PUBLICATIONS

European Patent Office (EPO) Notice of Opposition, dated Feb. 25, 2013.
Huang, et al., "Computer Supported Force Analysis and Layer Imagine for Masked Rapid Prototyping System" Department of Mechanical Engineering, National Taiwan University of Science and technology, Taipei, Taiwan.
Huang, et al., "On-line force monitoring of platform ascending rapid prototyping system" Journal of Materials Processing Technology 159 (2005) 257-264.
English translation of JP 08150662 from: http://www19.ipdl.inpit.go.jp/PA1/result/main/woYeaMaDA408150662P1.htm Jul. 15, 2011.
English translation of DE 10256672 from Lexis Nexis Total Patent.
International Search Report for PCT/US2011/033436 Written Opinion of the International Searching Authority for PCT/US2011/033436.
Burns "Automatic Fabrication Improving Productivity in Manufacturing," 1993 (ISBN 0-13-119462).
Wohlers Report 2000, "Rapid Prototyping & Tooling State of the Industry Annual Worldwide Progress report," T. Wohlers, Wohlers Association, Inc., Fort Collins, Colorado (2000).
Stark, G.B., et al.,"Biological Matrices and Tissue Reconstruction," Springer Publications, Berlin (1998).
Sachs. E., et al., "Three Dimensional Printing: Rapid Tooling and Prototypes Directly from CAD Model," Journal of Engineering for Industry, 114: 481-488 (1992).
U.S. Appl. No. 12/916,818, "Process for the Production of a Three-Dimensional Object With an Improved Separation of Hardened Material Layers From a Constuction Plane."
Kuhtreiber, W., Ph.D., et al., "Cell Encapsulation Technology and Therapeutics," Birkhauser, Boston (1998).
Landers, R., and Mulhaupt, R., "Desktop Manufacturing of Complex Objects, Prototypes and Biomedical Scaffolds by Means of Computer-Assisted Design Combined with Computer-Guided 3D Plotting of Polymers and Reactive Oligomers," Macromolecular Materials and Engineering, 282:17-22 (2000).
Okada, T., and Ikada, Y., "Tissue Reactions to Subcutaneously Implanted, Surface-Modified Silicones," Journal of Biomedical Materials Research, 27:1509-1518 (1993).
Complaint, *3D Systems* v. *Envisiontec Incorporated et al.*, Case 2:05-cv-74894-AC-RSW.
Nikolaychik, V.V., et al., A New, Cryoprecipitate Based Coating for Improved Endothelial cell Attachment and Growth on Medical Grade Artificial Surfaces; ASAIO Journal, 40:M846-M852 (1994).
Relou, I.A., et al., "Effect of Culture Conditions on Endothelial Cell growth and Responsiveness," Tissue & Cell, 30 (5) :525-538 (1998).
English translation of DE4125534, from Lexis Nexis Total Patent.
English translation of DE69909136, from Lexis Nexis Total Patent.
English translation of EP1250997, from Lexis Nexis Total Patent.
English translation of EP1192041, from Lexis Nexis Total Patent.
English abstract of WO2005110722, from Lexis Nexis Total Patent.
English translation of DE19727554, from Lexis Nexis Total Patent.
English translation of DE10018987, from Lexis Nexis Total Patent.
English translation of DE20106887, from Lexis Nexis Total Patent.
English translation of WO0112679, from Lexis Nexis Total Patent.
English translation of EP1849587, from Lexis Nexis Total Patent.
English translation of WO0172501, from Lexis Nexis Total Patent.
English translation of FR2634686, from Lexis Nexis Total Patent.
English translation of DE4105314, from Lexis Nexis Total Patent.
English translation of DE4102257, from Lexis Nexis Total Patent.
English translation of DE4340108, from Lexis Nexis Total Patent.
English translation of DE19838797, from Lexis Nexis Total Patent.
English translation of DE10003374, from Lexis Nexis Total Patent.
English translation of FR2254194, from Lexis Nexis Total Patent.
English translation of DE19929199, from Lexis Nexis Total Patent.

\* cited by examiner

RESIN SOLIDIFICATION SUBSTRATE AND ASSEMBLY

CROSS-REFERENCE TO RELATED APPLICATIONS

This application is a continuation of U.S. patent application Ser. No. 12/907,853, filed on Oct. 19, 2010, which claims the benefit of U.S. Provisional Patent Application No. 61/300,417, filed on Feb. 1, 2010 and U.S. Provisional Patent Application No. 61/252,901, filed on Oct. 19, 2009. The entirety of each of the foregoing applications is hereby incorporated by reference.

FIELD

The disclosure relates to a system and method for manufacturing three-dimensional objects, and more specifically, to a solidification substrate and assembly used in such methods.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

In certain three-dimensional object manufacturing processes, it is important to ensure that the solidifiable material (e.g., polymeric resin) used to make the object forms a smooth and substantially planar surface to which solidification energy from a pattern generator will be applied. One technique requires the use of a "smoothing blade" or "doctor blade" to remove irregularities in the surface profile of a solidifiable polymeric resin. However, this technique requires additional moving parts and introduces undesirable complexity into the system. Another technique provides a transparent or translucent rigid layer of material which sits on top of the exposed surface of the solidification material. However, this technique can cause the solidifiable material to solidify in contact with the reference plane, in which case the solidified material must be removed from the reference plane. In certain cases, the separation force required to separate the solidified material from the reference plane is so great that it causes the object to deform or break. Thus, a need has arisen for a system and method of making three-dimensional objects which addresses the foregoing issues.

BRIEF DESCRIPTION OF THE DRAWINGS

The disclosure will now be described, by way of example, with reference to the accompanying drawings, in which:

FIG. 20b is a longitudinal cross-sectional view of the solidification substrate assembly taken along line 20b-20b of FIG. 20a;

DETAILED DESCRIPTION

Figure 1A:
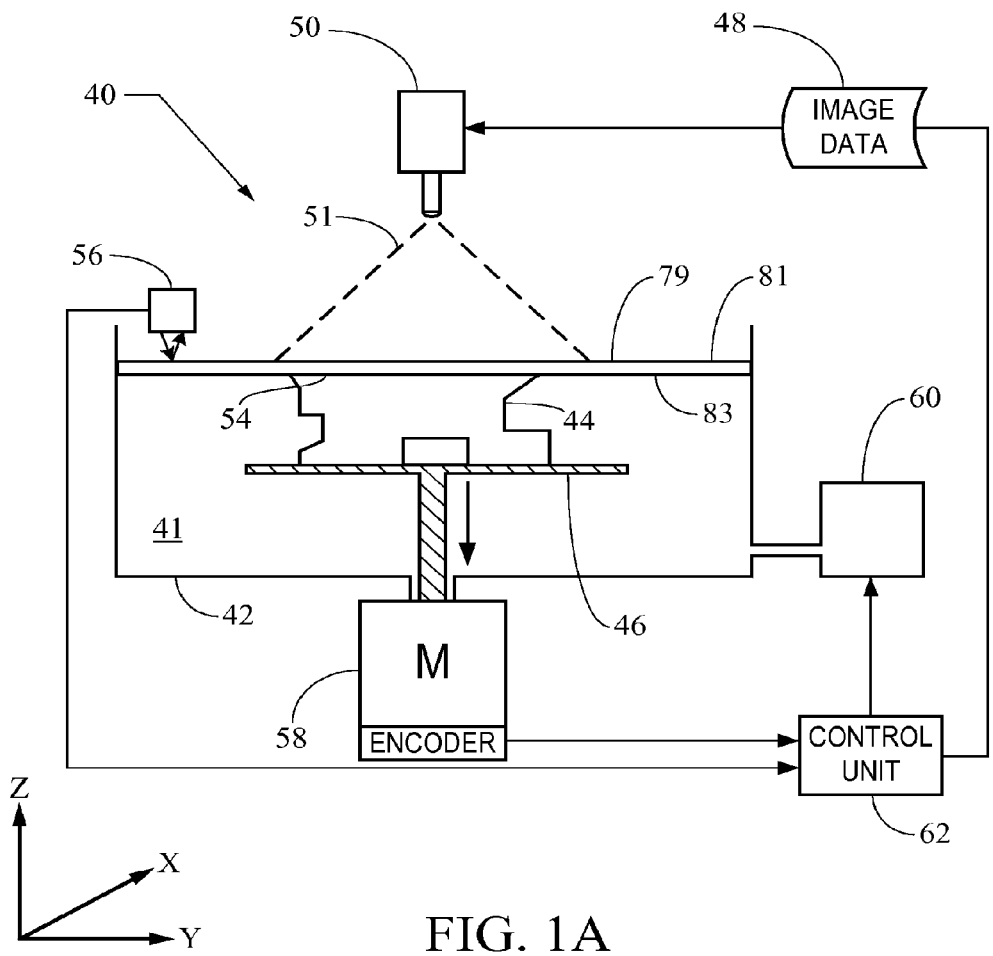
FIG. 1A is a cross-sectional view of system for making a three-dimensional object from a solidifiable material depicting an object build platform in a first position relative to a solidification substrate.

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art.

The system and methods described herein are generally applicable to additive manufacturing of three-dimensional objects, such as components or parts (discussed herein generally as objects), but may be used beyond that scope for alternative applications. The system and methods generally include a solidification substrate against which a solidifiable material is solidified as an object is built from the solidification material. The solidification substrate facilitates the creation of a substantially planar surface of solidification material which is exposed to energy provided by a pattern generator. The substantially planar surface improves the accuracy of the build process. In certain embodiments, as discussed below, the solidification substrate is tiltable to facilitate the separation of solidified material from the solidification substrate. In certain other embodiments, a peeling member is provided to separate the solidification substrate assembly from an object being built. In further embodiments, a force sensor is attached to the solidification substrate assembly and is used to determine when to apply the force peeling member and/or when to expose the solidifiable material to solidification energy.

The system is generally used for manufacturing three-dimensional objects from a solidifiable material and rapid prototyping. A pattern generator (such as a digital light projector, laser, etc.) provides an image to the solidifiable material to selectively solidify it.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but not limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis (eta 5-2,4-cyclopenadien-1-yl)Bis[2,6-difluoro-3-(1H-pyrrol-1-yl) phenyl]titanium, such as Irgacure 784, which is supplied by Ciba Specialty chemicals. Examples of suitable 1,2 di-ketones include quinones such as camphorquinone. Examples of suitable acylphosphine oxides include bis acyl phosphine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl)phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The pattern generator(s) may be configured in a number of ways. Many may provide controlled electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Figure 1B:
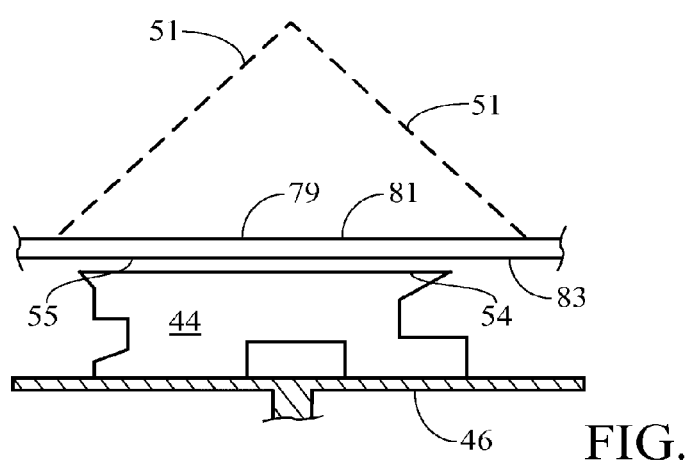
FIG. 1B is a detailed view of the system of FIG. 1A depicting the object build platform in a second position relative to solidification substrate.

Referring to FIGS. 1A and 1B, a first illustrative example of a system 40 for making a three-dimensional object from a solidifiable material 41 is described. System 40 is generally configured to receive data describing the shape and appearance of the object (such as CAD data) and to create a solid object 44 in conformity with the data. System 40 includes a solidifiable material 41, which in the example of FIG. 1A is a photopolymeric resin capable of being selectively hardened by the application of electromagnetic radiation. Container 42 is a generally rigid vessel with an empty interior that holds solidifiable material 41. Build platform 46 is a generally rigid platform on which object 44 is progressively built from a first end proximate build platform 46 to an opposite end distal from build platform 46. Build platform 46 is generally moveable in a vertical direction as indicated by the downward pointing arrow. Motor "M" actuates the movement of build platform 46. FIG. 1A depicts a first position of build platform 46 in which pattern generator 50 has just solidified solidifiable material 41, and FIG. 1B depicts a second position of build platform 46 in which build platform 46 has moved away from solidification substrate 79, thereby separating the upper, most recently solidified surface 54 of object 44 from solidification substrate 79, as discussed further below.

Object 44 is shown here as an example of a design that is made by system 40. The size, shape, or any other feature of object 44 is a function of energy pattern 51 and the motion of object build platform 46. For example, the arbitrary shape shown is produced through movement of support plate 46 downward while pattern generator 50 selectively hardens solidifiable material 41. However, such a shape could also be constructed as a series of layers by moving object build platform 46 a certain distance downward and then exposing solidifiable material 41 to energy supplied by pattern generator 50 for a predetermined time, and then repeating the process until the object is built.

Pattern generator 50 is positioned to supply solidification energy 51 such as electromagnetic radiation to solidifiable material 41 to selectively solidify material 41 in accordance with a generated energy pattern 51. In an example wherein pattern generator 50 is a digital light projector, the generated energy pattern 51 comprises volumetric pixels or "voxels." Each voxel defines a position in the x, y plane of the exposed surface 55 (FIG. 1B) of solidifiable material 41 as well as a solidification depth, z, which is a distance below exposed surface 55 in which solidification occurs. At any given location on exposed surface 55, the voxel depth will depend, at least in part, on the localized intensity of the energy supplied by pattern generator 50 (e.g., light intensity) as well as the time period for which the energy is supplied. In an example wherein pattern generator 50 is a moving light source (e.g., a movable laser), the generated energy pattern corresponds to the path of travel of the light source. Again, the depth of curing at any particular location will depend, at least in part, on the exposure time and intensity of the energy supplied.

Control unit 62 supplies image data 48 to pattern generator 50 to drive the pattern generation process. Image data 48 may include voxel data that includes an intensity for each pixel in the x, y plane, slice-data files, or bitmaps that are derived from slice-data files. Typical file types used to generate bitmaps include STL (Stereo Lithography) files or other CAD (Computer Aided Drafting) files commonly translated for rapid prototyping systems into formats such as SLC, CLI slice data files or voxelized data files which may include data formats such as BMP, PNG, etc. However, any data input type may be used and converted internally to create the image data 48 used by the pattern generator 50. Image data 48 corresponds to energy pattern 51 and may be generated by control unit 62, by pattern generator 50, or by an external source or device (e.g., a network or storage device). Image data 48 may also be modified to a format suitable for pattern generator 50 (e.g., modification of a compressed file such as a TIFF file using CCIT type 4 compression into a standard bitmap). In general, image data 48 may be bi-tonal bitmap images, "grayscale" (e.g., pixel data with variable energy intensities and/or exposure times associated with each pixel), color, or color with intensity and/or exposure time information. Other pattern formats may be available for use such as JPEG, DXF, BMP, PNG, SVG, etc., or other vector or pixel-defined image files (which may be based on industry standards or custom file types).

In certain examples, image data 48 comprises voxel data. Voxel data may be considered a collection or set of data that represents volumetric pixels. The voxel data may be organized into a voxelized bitmap pattern that includes a grayscale value for each pixel and/or an exposure time. The voxelized bitmap may be considered an organized collection of individual voxels, each voxel having its own depth that is independent of the other voxels. Although the voxels may be organized into a bitmap, each voxel is generally treated individually and has its own curing depth (which can be determined by the exposure time and/or intensity value assigned to each voxel) to determine each voxel's geometry independent of any other voxel data. The object 44 may be formed using the voxel data where each voxel may be created in the solidifiable material 41 by exposing the exposed surface 54 to obtain a particular depth of cure (typically determined by the grayscale value and/or exposure time) and thereby create the three-dimensional voxel in the solidifiable material 41. Each voxel may be generated individually, in a group or subset (e.g., more than one voxel), or as a whole of the voxel data (e.g., all voxels at once).

Two-dimensional bitmap data may also be used as image data 48. The bitmap information may be a typical (x,y) location for a pixel (whether inherent to the file format or having specified locations). The grayscale value represents a total exposure for the pixel (where total exposure for the pixel is expressed as follows:

$$\text{Total Exposure} = \int I dt$$

where I is the intensity of the supplied solidification energy (e.g., Watts/pixel) and the integration is performed over the exposure time period, $\Delta t$. In certain examples, the grayscale output value may be used to control the pattern generator's output to provide full intensity, no output, or variations in between. In processes using a fixed exposure time per pixel, the pattern generator may reduce the amount of electromagnetic radiation (e.g., intensity, I) that the solidifiable material 41 is exposed to for each pixel for the specified exposure time. For example, where a DLP® type pattern generator is used, the DLP® micro-mirror for a particular pixel or group of pixels may be positioned to direct the electromagnetic radiation away from the solidifiable material 41. Thus, the electromagnetic radiation is reflected away, but not necessarily completely, from the solidifiable material 41 using the micro-mirror to reduce or eliminate exposure after the elapsed time. Alternatively, the pattern generator 50 may "turn off" the light entirely for that pixel after the exposure time has elapsed. When using a voxelized construction process, each voxel may have its own thickness (e.g., depth of cure) which is controlled by the grayscale value.

In an example where a grayscale value is assigned to a pixel and a DLP® type pattern generator 50 is used, the DLP® micro-mirror may be moved so as to expose the pixel at the build surface in an alternating manner to provide an overall grayscale value. Where a 50% grayscale is desired, the micro-mirror may be moved so that the solidifiable material 41 is exposed for 50% of the time, and the other 50% of the time the micro-mirror may be moved so as to reflect light away from the solidifiable material 41.

Control unit 62 may be constructed as part of an integral three-dimensional object forming machine, portions of a machine without direct connection to the machine, or distributed elsewhere and connected via a communication medium, such as a network. Control unit 62 may be, for example, a computing device (that may be an embedded resource, external, or a distributed resource) and may be configured as a computer, a programmable logic device, a specialized processor, etc. Control unit 62 also receives a signal indicative of the level of exposed surface 54 in container 42. Based on the signal, control unit 62 adjusts the flow rate from reservoir 60.

As discussed below, the systems and methods described herein may be used with "downward", "upward" and "side" projecting systems in continuous or non-continuous exposure modes (e.g., pattern generating modes), any of which may include additional optical elements such as a mirrors or lenses. The systems and methods may be used in a layer, slice, or voxelized data production process, among others, where the pattern generating system provides the electromagnetic radiation to react with (e.g., solidify or partially solidify) a solidifiable material 41 or other material to create the three-dimensional object. Moreover, the systems and methods described herein may also apply to layered construction processes using "upward" or "downward" build directions that may use lithography (generally), FTI (Film Transfer Imaging), three-dimensional Printing technologies, SLS (Selective Laser Sintering) or SLA (Stereolithography Apparatus). Examples of pattern generator 50 may include Digital Light Processing technology (DLP) from Texas Instruments® or SXRD™ or LCD or LCOS or J-ILA from JVC, or LVT (Light Valve Technology), DMD (digital mirror device), or GLV (Grating Light Valve) technology, SLM (Spatial light modulator), or any type of selective electromagnetic radiation or light modulation system, in addition to a scanned and/or vector pattern generators (e.g., using a laser).

The matching of technologies between the pattern generator 50 and solidifiable material 41 may be determined based on the compatibility of the respective technologies used (e.g., a reactive UV photopolymer material and a UV pattern generator). Typical solidifiable materials include photo-reactive (or photo curable) resins that may be in liquid, paste, powder, or other form. Moreover, the systems and methods described herein are not tied to a particular pattern generator or imager technologies.

In the case of voxel-based systems, the electromagnetic radiation supplied by pattern generator 50 may have an adjustable intensity range. In one example of a voxel-based system, electromagnetic radiation from pattern generator 50 is scaled from zero (the minimum) to 255 (maximum). Pattern generator 50 may receive bitmaps having intensity and/or exposure time values for each individual pixel. However, in an example where each voxel is individually addressed (e.g., $x_i$, $y_i$, $z_i$), bitmaps are unnecessary since pattern generator 50 can uniquely receive and access each voxel. The bitmaps include "bits" or regions that collectively determine the energy pattern 51. These "bits" or regions (e.g., that make up the voxelized bitmap) are typically defined as rectangular or square regions, but when each "bit" is treated as a voxel, the depth of cure (which determined the depth of the voxel) may be determined for each voxel independently of the other.

Each bit in a bitmap may also have a unique intensity value associated with it. Thus, a voxelized bitmap may cover a wide range of curing depths through the use of the independent grayscale value associated with each bit. Although the intensity may be used to adjust the total exposure that a given voxel receives, the exposure time may also be used. In addition, methods using both a variable intensity and variable exposure time for each pixel may be used.

While the intensity may be expressed as an integer number on a reference scale (e.g., 0 . . . 255), the intensity value may also be compensated or adjusted before being sent to the pattern generator, or may be compensated or adjusted at the pattern generator, or both. For example, where solidifiable material 41 has a minimum intensity threshold that is required for polymerization or partial-polymerization, the "off" or zero (0) value intensity (e.g., brightness and/or "on" time) may be determined based on the minimum intensity threshold specific to the particular solidification material 41. A zero value for intensity does not necessarily imply that the energy supplied by pattern generator 50 is actually zero. In a typical case, a low level of brightness may correspond to a zero (0) intensity.

Intensity ranges of 0 to 255 are convenient for examples when an 8-bit system is used to determine intensity. However, systems having more or less resolution for intensity may be used. Examples may include a 4 bit system or a 16 bit system. Further, the exposure time of the electromagnetic radiation may have a wide range, for example, 1 millisecond to 100 seconds. Note that the time range is merely an example and is not limiting as the "on time" for the electromagnetic radiation may be dependent on other variables such as the minimum switching time of the pattern generator, the intensity of the electromagnetic radiation, the solidifiable material's minimum effective time and radiation intensity for solidification, the speed of movement of build platform 46, and other factors.

Both intensity and exposure time, or either of them, may be parameters for the bitmap. For example, when a pattern generator 50 has a fixed intensity (such as a laser), the time the source is "on" may be modulated to produce a total exposure value. Alternatively, where the time of exposure is a predetermined value, the intensity of the voxels generated by pattern generator 50 may be modified produce the desired total exposure value.

As discussed herein, with respect to a pixel the term "total exposure" may be considered the integral of the product of the electromagnetic radiation intensity with respect to time (E=∫I dt) over the exposure period. When performing voxelized construction, the total exposure determines the depth of cure for each voxel separately and independently of any other voxel. The time and intensity to achieve a particular depth of cure is material dependent. Thus, the time and intensity determined to provide a particular curing depth for a first solidifiable material 41 may not be usable for a second solidifiable material 41. Thus, the depth of cure can be a function of at least the exposure time, the intensity of the electromagnetic radiation, and the properties of the solidifiable material 41. The combination of intensity and exposure time can be expressed independently (e.g., in data file or data structure) or they may be combined and expressed for each voxel as a grayscale value where the exposure time is predetermined.

However, solidifiable material 41 may behave differently based on the intensity of electromagnetic radiation and/or the time. For example, a low level intensity may not reach a minimum threshold required for the solidifiable material 41 to become wholly or partially solidified. In this case, no amount of exposure time will be sufficient to harden the solidifiable material 41 because the necessary polymerization and/or cross-linking reactions will not be initiated. Alternatively, a higher intensity may cause solidifiable material 41 to become solidified or partially solidified non-linearly faster.

As indicated in FIG. 1A, solidification substrate 79 is a substantially planar substrate that rests on the exposed surface 54 of solidification material 41. Solidification substrate 79 is generally rigid or semi-rigid and substantially permeable to the energy supplied by pattern generator 50. In certain examples, it is preferred that the energy from pattern generator 50 can pass through solidification substrate upper surface 81 and lower surface 83 without a significant diminution in transmitted energy or a significant alteration in the energy spectrum transmitted to solidification material 41 relative to the spectrum that is incident to solidification substrate upper surface 81. In the case where energy pattern 51 is a light pattern (including non-visible light such as UV light), solidification substrate 79 is preferably substantially translucent to the wavelengths of light supplied by pattern generator 50. As energy is supplied to exposed surface 83, solidification material 41 will begin to solidify in accordance with the energy pattern 51 supplied by pattern generator 50. Build platform 46 moves away from solidification substrate 79 during an object building operation, causing fresh solidification material 41 to be supplied to the space between previously solidified portions of object 44 and solidification substrate 79 (FIG. 1B). Once the upper surface 54 of the previously solidified portion of the object reaches a certain distance from solidification substrate 79, pattern generator 50 again applies an energy pattern 51 to upper surface 55 (FIG. 1B) of the solidifiable material 41. The process repeats itself until the object 44 is built. In certain illustrative examples, build platform 46 stops at periodic intervals, and pattern generator 50 supplies energy pattern 51 to the exposed solidification material 41 at exposed solidifiable material surface 55. In other examples, build platform 46 moves continuously away from solidification substrate 79 during an object building operation.

As an object building operation proceeds, solidified material may adhere to bottom surface 83 of solidification substrate 79. If the forces of adhesion between solidification substrate 79 and object 44 are too strong, the movement of build platform 46 away from solidification substrate 79 can cause object 44 to break or distort. To reduce the likelihood of such breakage or distortion, it is preferred that object 44 have greater adhesion to build platform 46 than to solidification substrate 79. It is also preferred that recently solidified material at the upper surface 54 of the object 44 adhere more strongly to the previously solidified material below it than to solidification substrate 79.

Figure 3:
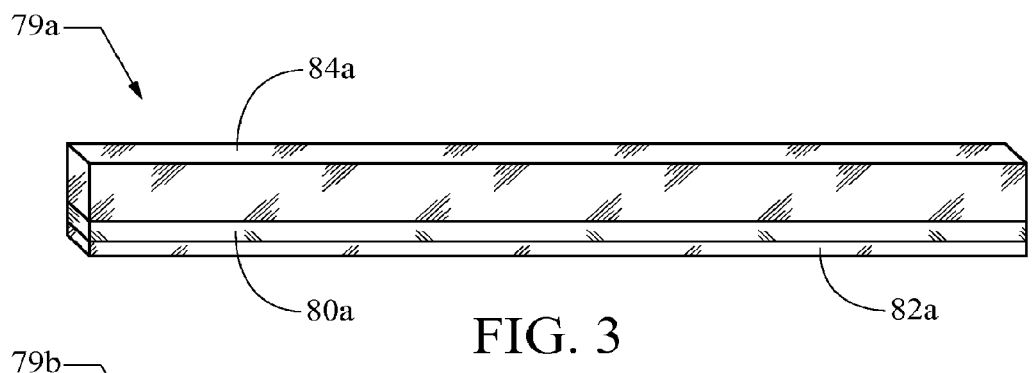
FIG. 3 is a detailed perspective view of an embodiment of a solidification substrate.

One exemplary illustration of a solidification substrate 79a is depicted in FIG. 3. Substrate 79a is depicted in an exaggerated perspective view to better illustrate layers 80a, 82a, and 84a. A typical exemplary substrate 79a will be significantly thinner and flatter than shown in the figure.

Solidification substrate 79a comprises a first translucent layer 84a that is rigid or semi-rigid. One example of a rigid or semi-rigid layer 84a is a translucent float glass. Another example is a translucent plastic. A variety of different float glasses and plastics may be used. Exemplary plastics that may be used include transparent acrylic plastics supplied by Evonik under the name Acrylite®. First translucent layer 84a is preferably rigid enough to provide a substantially planar exposed surface 55 of solidification material 41 when energy pattern 51 is projected onto surface 55. The term "translucent" is meant to indicate that first layer 84a is capable of transmitting the light wavelengths (including non-visible light such as UV light if supplied by pattern generator 50) necessary to solidify solidifiable material 41 and that the intensity of such wavelengths is not significantly altered as the light passes through first layer 84a. In the case of photopolymers, a photoinitiator is commonly provided to start the polymerization/cross-linking process. Photoinitiators will have an absorption spectrum based on their concentration in the photopolymer. That spectrum corresponds to the wavelengths that must pass through solidification substrate 79 (and, therefore, first layer 84a) and which must be absorbed by the photoinitiator to initiate solidification.

In certain examples, solidification substrate 79 is provided with a localized area of resiliency proximate the exposed surface 55 of solidification material 41. Referring to FIG. 3, a translucent resilient layer 80a is provided. The term "translucent" is again used in the sense described above with respect to rigid or semi-rigid first translucent layer 84a. A variety of different translucent resilient materials may be used for layer 80a. When provided as a 10 mm layer, the resilient layer 80a preferably transmits at least about 60 percent of received light in the 325-700 nm range. The resilient layer 80a preferably has a 10 mm layer transmission percentage of at least about 70 percent, more preferably at least about 80 percent, and even more preferably at least about 88 percent for light in the 325-700 nm range. The resilient layer 80a preferably also has a percent elongation at break (according to ISO 37) that is at least about 80 percent, more preferably at least about 90 percent, even more preferably at least about 95 percent, and still more preferably at least about 100 percent. In addition, resilient layer 80a preferably has a tensile strength (according to DIN ISO 37) that is at least about 3.0 N/mm$^2$, more preferably at least about 5.0 N/mm$^2$, even more preferably at least about 6.0 N/mm$^2$, and still more preferably at least about 7.0 N/mm$^2$.

Resilient layer 80a may be formed from one or more elastomeric polymers. In one example, silicone elastomers are provided. One particular example of a suitable silicone elastomer is Elastosil® RT 601, which is supplied by Wacker Silicones. Elastosil® RT 601 is a transparent, addition-curing silicone rubber having greater than 88 percent transmission of light in the 325-700 nm range (for a 10 mm layer). The material has an elongation at break of about 100 percent (ISO 37), and a tensile strength of about 7.0 N/mm$^2$ (DIN ISO 37) tear strength (ASTM D 624B) of about 3.0 N/mm$^2$. Resilient layer 80a may be connected to first translucent layer 84a using known techniques. In one example, an adhesive such as a pressure sensitive adhesive is used to bond resilient layer 80a and first translucent layer 84a together. The adhesive preferably does not significantly alter the wavelengths or intensities of electromagnetic radiation transmitted through layers 80a and 84a.

Certain solidifiable materials 41 may include components that chemically degrade translucent resilient layer 80a. For example, when certain photoinitiators are used to cure polymeric resins, the solidification process may be damage layer 80a. Accordingly, in certain examples, a translucent protective film 82a is provided. Translucent protective film 82a is preferably a homopolymer or copolymer formed from ethylenically unsaturated, halogenated monomers. Fluoropolymers are preferred. Examples of suitable materials for protective film 82a include polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable protective film 82a materials include PVDF films sold under the Kynar name by Arkema, ECTFE films sold under the Halar name by SolvaySolexis, ETFE films sold under the Tefzel® name by DuPont, PFA films sold under the Teflon®-PFA name by DuPont, and MFA films sold under the name Nowofol.

In one example, solidification material 41 comprises a 1,6 hexanediol diacrylate and/or trimthelolpropane triacrylate (TMPTA) with an acylphosphine oxide initiator, such as Irgacure 819. Without wishing to be bound by any theory, it is believed that the photopolymerization/photocrosslinking reaction that occurs generates an amount of heat that can damage elastomeric translucent layer 80a. Accordingly, in such examples an MFA protective film layer 82a is provided to reduce the effect of the generated heat on translucent resilient layer 80a. In another example, solidification material 41 comprises 1,6 hexanediol diacrylate and/or TMTPA with a Darocur TPO initiator. Again, it is believed that the photopolymerization/photocrosslinking reaction generates an amount of heat that may damage elastomeric translucent layer 80a. Accordingly, in such examples, an MFA protective film layer 82a is provided.

Figure 4:
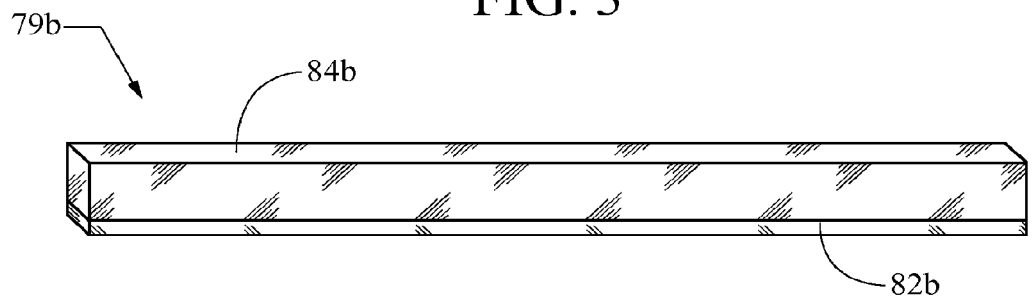
FIG. 4 is a detailed perspective view of an alternative embodiment of a solidification substrate.
Figure 5:
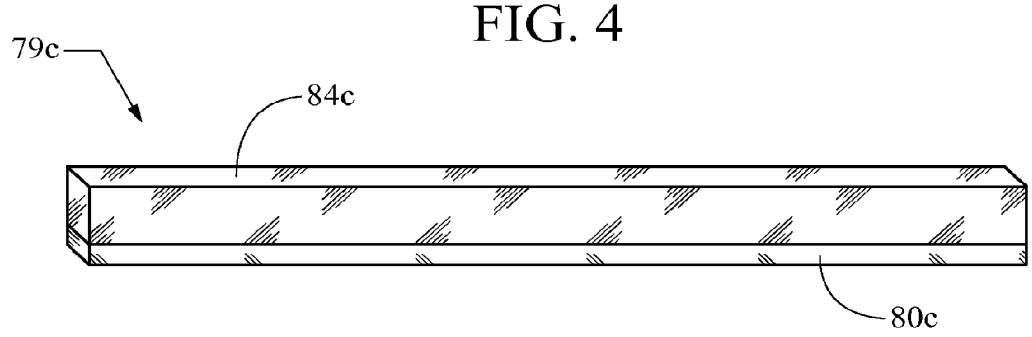
FIG. 5 is a detailed perspective view of another alternative embodiment of a solidification substrate.

In certain cases, the force required to separate a solidified section of object 44 from solidification substrate 79 will be low enough that the resiliency provided by translucent resilient layer 80a will not be required. However, protective film 82 may still be used to protect the rigid or semi-rigid translucent layer 80. Referring to FIG. 4, a solidification substrate 79b is provided which comprises rigid or semi-rigid translucent layer 84b and translucent protective film 82b. In certain examples a slipping agent is included in the composition of solidifiable material 41, allowing for better release of solidified object section 44 from solidification substrate 79b, eliminating the need for a resilient layer. Suitable slipping agents include TEGORAD 2250 from the Degussa Company and silicone agent EFKA 7454 from the EFKA Company. In certain other cases, the photopolymerization/photocrosslinking reaction proceeds without damaging the resilient translucent layer 80a or translucent rigid or semi-rigid layer 84a through the generation of excess heat or otherwise. In such cases, protective film 82a is not required. Referring to FIG. 5, a solidification substrate 79c is provided which comprises a rigid or semi-rigid translucent layer 84c and an elastomeric translucent layer 80c. In one example, a resin such as TMPTA, IBOA, or Ebecryl 3500 is used with an Irgacure 784 initiator and no protective film is required.

Figure 2A:
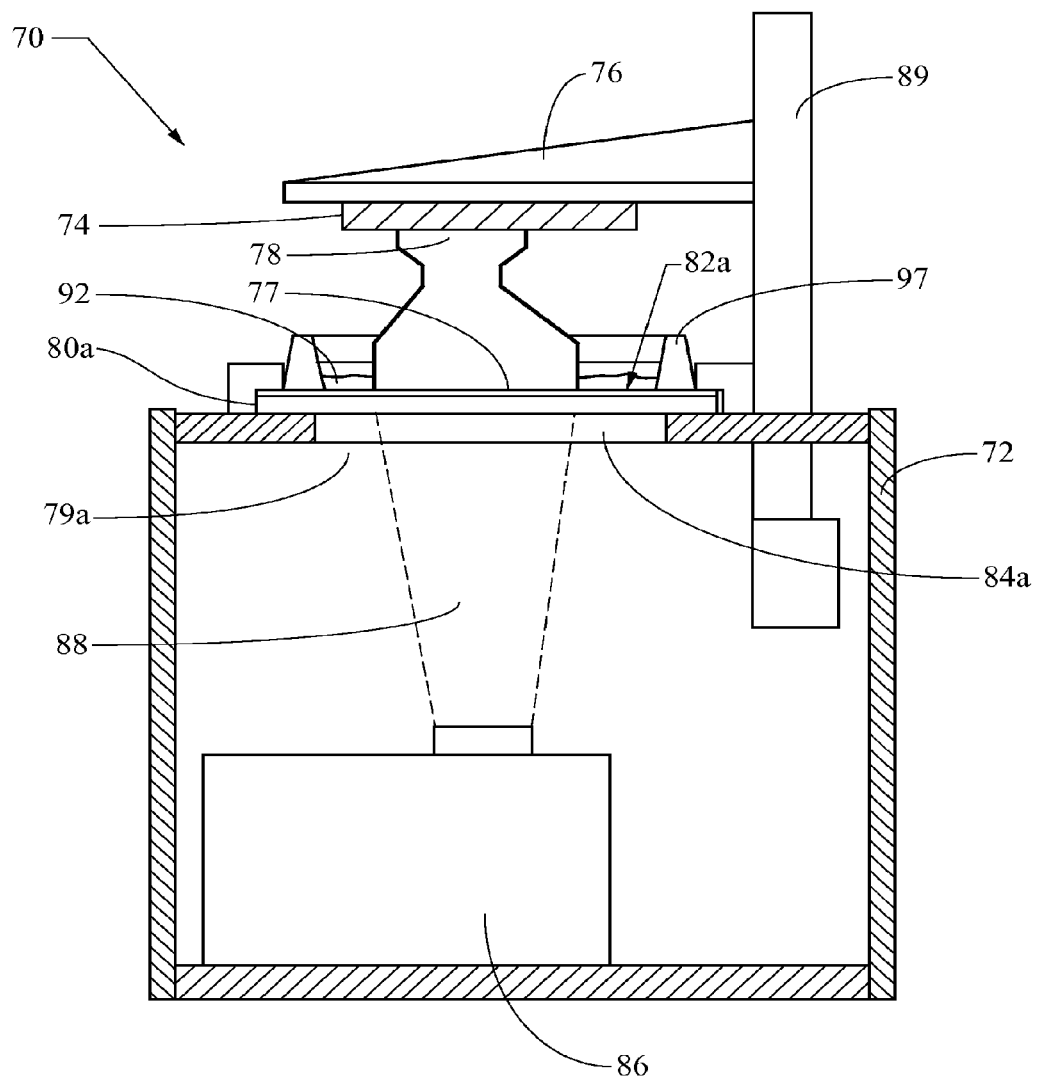
FIG. 2A is a cross-sectional view of an alternative embodiment of a system for making a three-dimensional object from a solidifiable material depicting an object build platform in a first position relative to a solidification substrate.
Figure 2B:
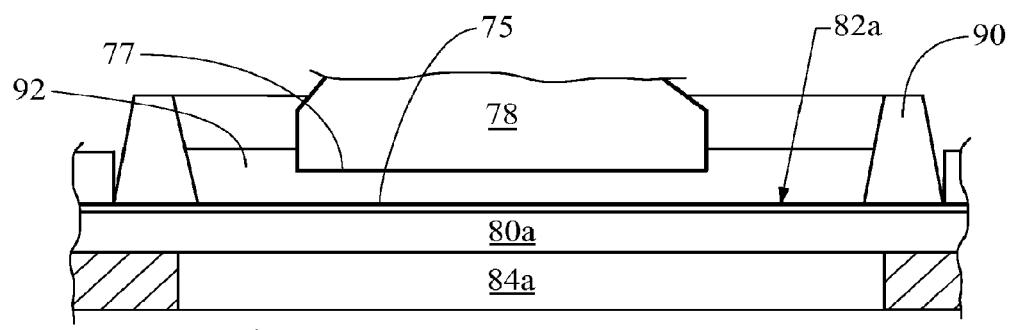
FIG. 2B is a cross-sectional view of the system of FIG. 2A depicting the object build platform in a second position relative to a solidification substrate.

In FIGS. 1A-1B, the object 44 is progressively built in a vertically upward direction by moving build platform 46 progressively downward into resin container 42. However, other build orientations and directions may be used. FIGS. 2A-2B depict another system 70 for making a three-dimensional object 78 from a solidifiable material 92. FIG. 2A depicts system 70 with build platform 74 in one position relative to solidification substrate 79a, while FIG. 2B depicts build platform 74 in another position relative to solidification substrate. In FIG. 2A, recently solidified material is adhered to solidification substrate 79a, while in FIG. 2B, the recently solidified object surface 77 is spaced apart from solidification substrate 79a with solidifiable material 92 occupying the space therebetween. Solidifiable material 92 is of the type described previously for solidifiable material 41 in FIG. 1A. In system 70, a build platform 74 is suspended on a support 76 that is attached to an elevator 89. Elevator 89 progressively moves build platform 74 in a vertically upward direction during an object building operation. Pattern generator 86 is provided underneath build platform 74 and is disposed in housing 72. Pattern generator 86 projects an energy pattern 88 in an upward direction to solidify solidifiable material 92 contained in a trough 97. Although not separately shown in FIGS. 2A-2B, a control unit is provided to direct the actuation of elevator 89 and to provide the necessary image data to pattern generator 86. Pattern generator 86 is of the type described previously with respect to the pattern generator 50 of FIG. 1A.

The process of solidifying solidifiable material 92 may occur in discrete steps with the formation of discrete object layers or without the use of a layered formation process. In particular, a continuous build process may be used in which build platform 46 moves during the entire build process. Even with continuous build processes, due to possible electromagnetic radiation interruptions, some slight interface layer formation could still occur. Nevertheless, such interface formation can be minimized or even totally eliminated. It is further possible to dispense with the generation of sliced image data, for example, by using voxel data. Moreover, the relative movement between the build platform 46 and the solidification substrate 79a can be achieved in several ways. In one example, build platform 46 is moved while the solidification substrate 79a remains stationary. In another example, the solidification substrate 79a moves while the build platform 46 remains stationary. In the latter case, the level of solidifiable material 41 is preferably increased so that solidifiable material 41 remains in contact with solidification substrate 79a as the substrate moves.

When continuous build processes are used, structural "steps" that sometimes appear in the outer contours of objects built with layer processes can be minimized. In continuous build processes, the three-dimensional object 44, 78 is allowed to solidify or grow in the main building direction (typically in the Z-direction) without interrupting the supply of electromagnetic radiation during an irradiation phase and optionally during the whole building process. The corresponding continuous growth of solidifiable material 41 in the main building (Z) direction during an irradiation phase may thus proceed at an extent exceeding a usual hardening depth typical of conventional layer-wise solidification and which is predetermined by the used supply of electromagnetic radiation and/or by a used polymerizable material.

By the layer-independent continuous operation, it is even possible to specifically influence and to control a current hardening depth of the solidifiable material 41. An adjustment of the speed of the support plate supporting the object to be generated moving away from the building surface, and an adjustment of the irradiation intensity of pixels (grey value or color value), respectively alone or in combination, are particular means for controlling the hardening depth.

Systems 40, 70 allow the provision of a three-dimensional object, which has been formed by electromagnetic radiation of a solidifiable material 41 using a continuous construction method, but without separately polymerized structure elements that might be formed from layers, dots or strands of the photopolymerizable material. Unlike conventional stereolithography or other conventional free-form building techniques such as selective laser sintering, ballistic particle production, fusion deposition modeling, three-dimensional printing, three-dimensional plotting or other rapid prototyping processes, three-dimensional objects having no separate layers or individual material strands or dots can be provided through an uninterrupted continuous build process avoiding formation of layer lines or visible cross-sections in the Z direction. The technique is particularly suitable for providing a three-dimensional object which comprises different sectional areas in the direction of continuous material construction.

Figure 26:
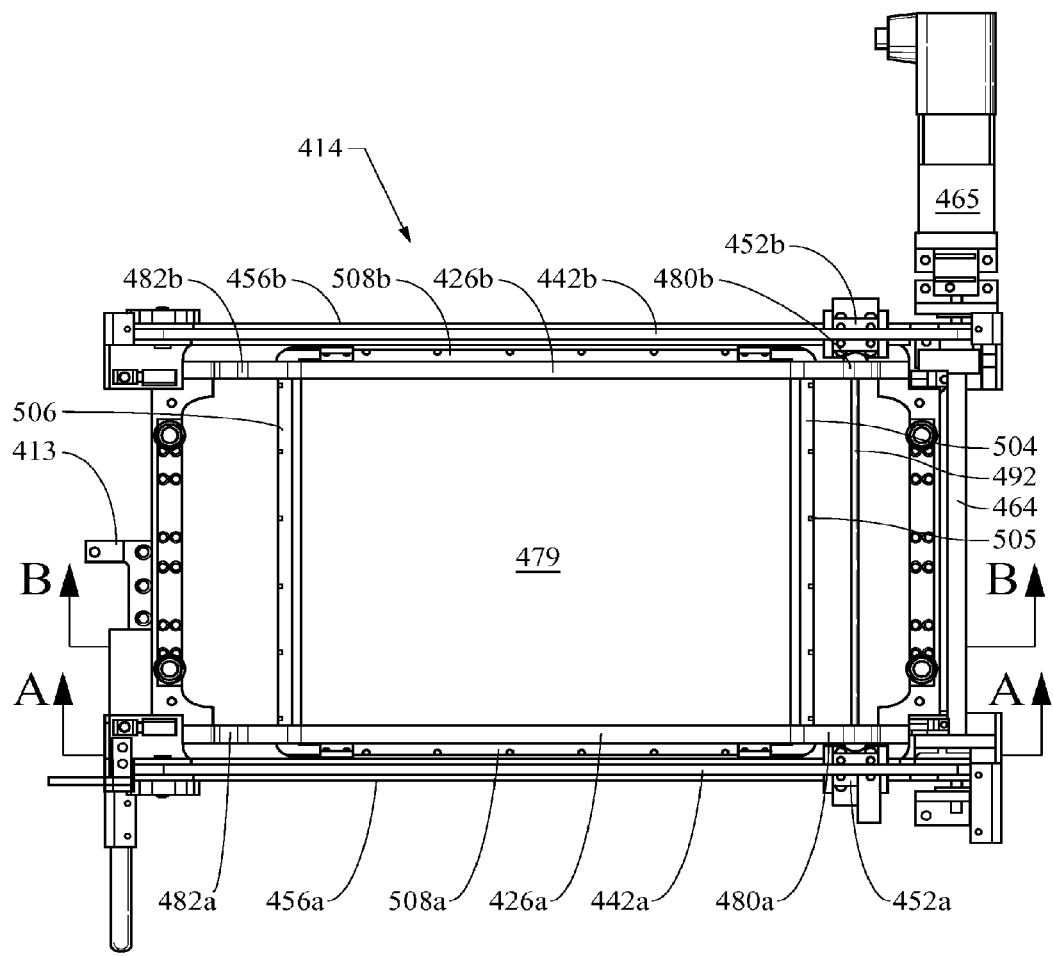
FIG. 26 is a top plan view of a second alternative embodiment of a solidification substrate assembly.

Referring again to FIGS. 2A and 2B, solidification substrate 79a is provided and is of the type described previously. Solidifiable material 92 disposed between object 78 and solidification substrate 79a (FIG. 2B) defines an exposed solidifiable material surface 75 (FIG. 26). Pattern generator 86 projects an energy pattern 88 onto exposed surface 77, causing the solidifiable material 92 to selectively harden in accordance with the projected pattern 88. In the example of FIGS. 2A-2B, solidification substrate 79a is generally of the type depicted and described in FIG. 3. Rigid or semi-rigid translucent layer 84 is mounted in a complementary opening formed in the upper surface of housing 72. Elastomeric translucent layer 80 is bonded to rigid or semi-rigid translucent layer 84 and is positioned vertically above rigid or semi-rigid translucent layer 84a. Protective film 82 is positioned above elastomeric translucent layer 80a. However, depending on the nature of the solidifiable material 92, the other solidification substrates 79b and 79c depicted in FIGS. 4 and 5 may be used. As the object build process progresses, elevator 89 moves build platform 74 upward, which causes the lower surface 77 of object 78 to move away from solidification substrate 79a, allowing additional solidifiable material 92 to then flow into the space between the solidified lower surface 77 of object 78 and solidification substrate 79a (FIG. 2B). Although not depicted, a system may also be provided for filling trough 97 with additional solidifiable material 92 based on a level of material 92 measured in trough 97.

As will be discussed in detail below, a solidification substrate system may be provided in which one or more layers of rigid, semi-rigid, and/or elastomeric materials cooperatively function as a solidification substrate even though the layers are not physically bonded or connected to one another.

Figure 6:
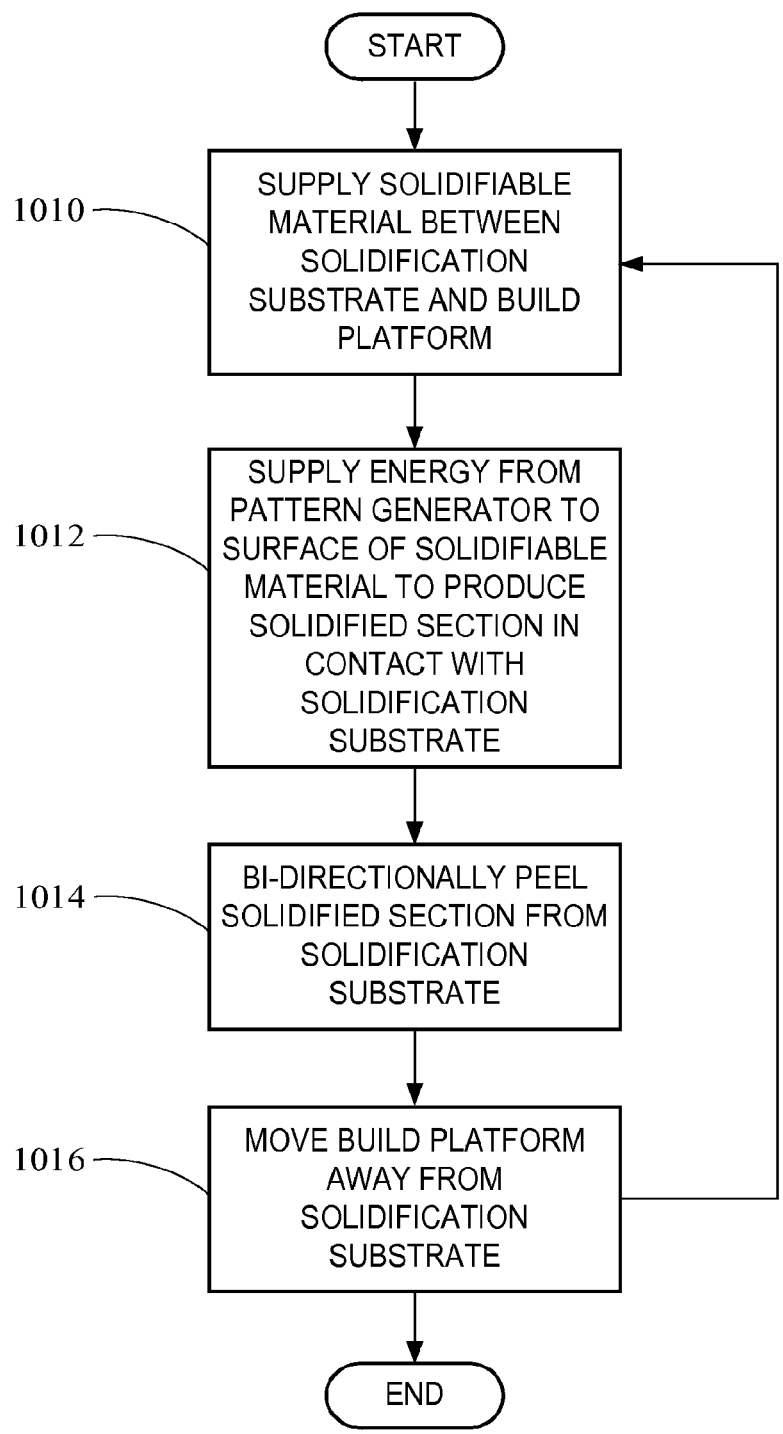
FIG. 6 is a flow chart depicting a method of making a three-dimensional object by bi-directionally peeling a solidification substrate.

In certain methods of making a three-dimensional object, it may be desirable to include a mechanism for peeling solidified material from solidification substrate 79a, 79b, or 79c to ensure complete separation of the recently built section of the object and substrate 79a, 79b, or 79c. One such method is depicted in the flow chart of FIG. 6. In accordance with the method, solidifiable material such as a photopolymeric resin is supplied between the solidification substrate and 79 the build platform 46, 74 (Step 1010). If portions of the object have already been built on the platform, the solidifiable material will be supplied to the location between the most recently solidified material (e.g., object surface 54 in FIG. 1B and object surface 77 in FIG. 2B) and the solidification substrate. In step 1012, energy is supplied to the exposed surface (55,75) of the solidifiable material to selectively harden it in contact with the solidification substrate. To better ensure full separation of the recently hardened material (55, 75) and the solidification substrate 79, in step 1014 the solidification substrate is bi-directionally tilted to peel the exposed surface of the object (i.e., the surface closest to the pattern generator) from the solidification substrate 79. In one example, one end of the solidification substrate 79 is tilted about a first tilting axis, and another end of solidification substrate 79 is tilted about another tilting axis. The build platform (46, 74) is then moved away from the solidification substrate 79 to allow fresh solidifiable material (41, 92) to be supplied to the space between the exposed object surface (55, 75) and the solidification substrate 79. The process then returns to step 1010 and repeats itself until the object is fully built. In the case of continuous build processes, the build platform will keep moving during the object build, and the pattern generation and peeling processes will occur as the platform moves.

Referring to FIGS. 7-17, a system 90 for making a three-dimensional object is depicted. System 90 includes a bi-directional peeling mechanism of the type described above. Although system 90 is used to illustrate a bi-directional peeling mechanism, it should be understood that the mechanism could be implemented on a variety of different systems, including those with pattern generators having moving or stationary sources of energy, for example digital light projector systems or laser systems. In addition, the bi-directional peeling mechanism can be used on both desktop and free standing three-dimensional object manufacturing systems, as well as on systems that build upward or downward.

System 90 includes a housing 91 for supporting and enclosing the components of system 90. Housing 91 includes a viewing window 94 that is moveably disposed in a housing opening 96. Viewing window 94 allows users to observe an object as it is being built during an object build operation. In the example of FIGS. 7-17, viewing window 94 is mounted on a hinge 98 (FIG. 8), allowing the window 94 to be pivotally opened and closed about the longitudinal axis of hinge 98, thereby providing access to the built object once the build operation is complete.

Housing 91 also includes a lower compartment 93 (FIG. 8) for housing a photopolymer resin container 100. Photopolymer resin container 100 is mounted on a sliding support assembly 102 that allows container 100 to be slidably inserted and removed from lower compartment 93. The sliding support assembly 102 provides a means for adding or removing photopolymer resin from container 100 or for replacing container 100.

Figure 8:
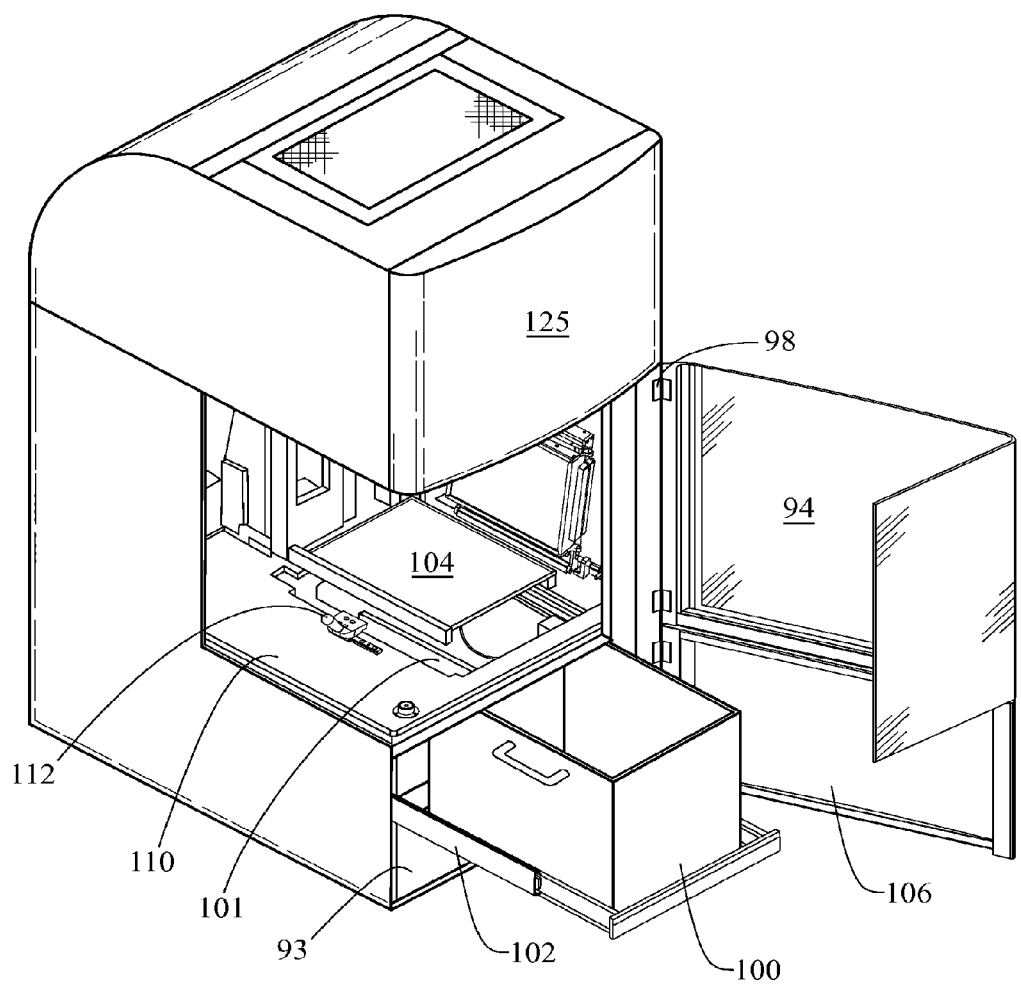
FIG. 8 is a perspective view of the system of FIG. 7 with the build area door and resin container shown in an open position.
Figure 9:
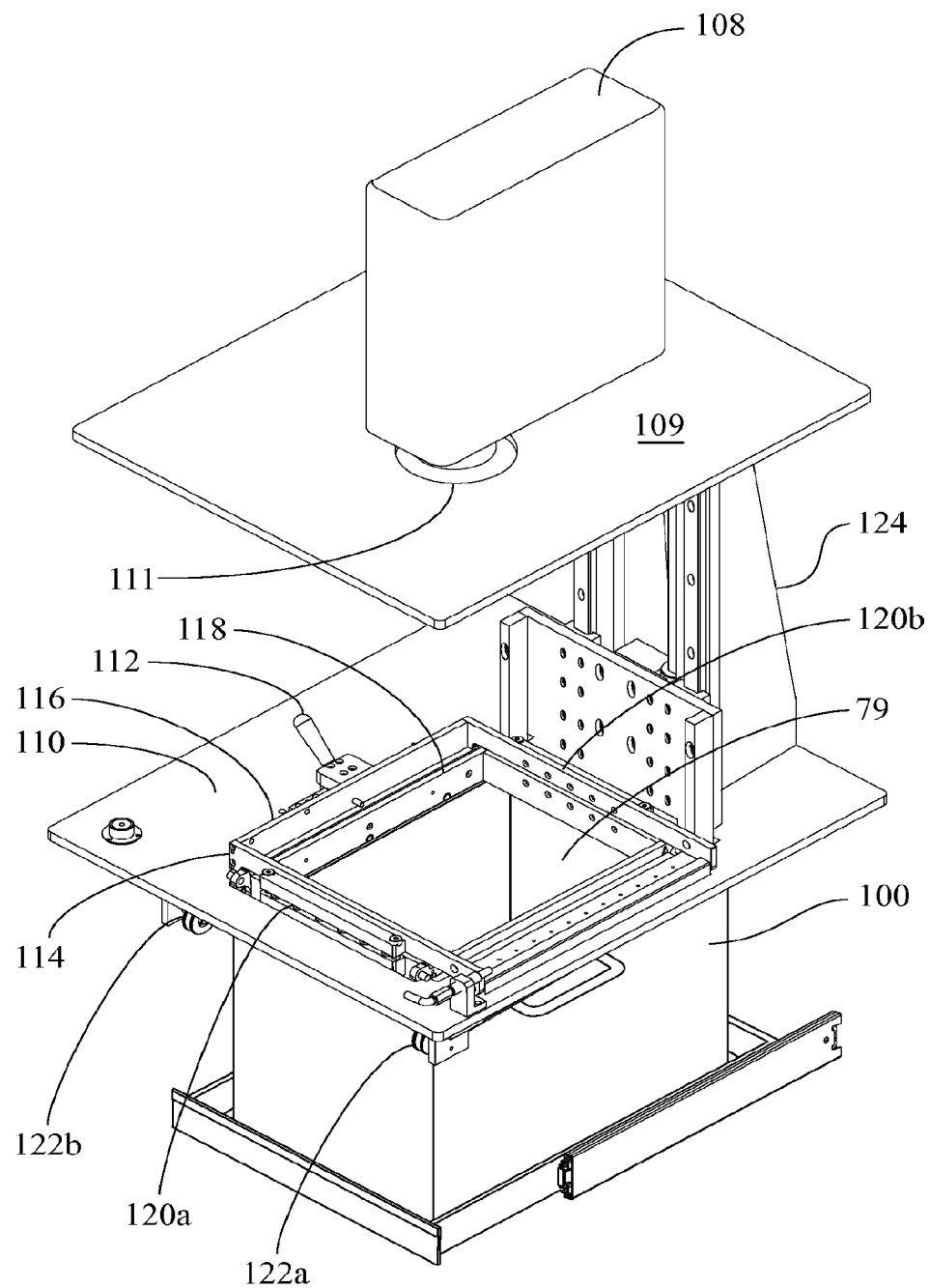
FIG. 9 is a perspective view of the system of FIG. 7 with the housing removed.
Figure 10:
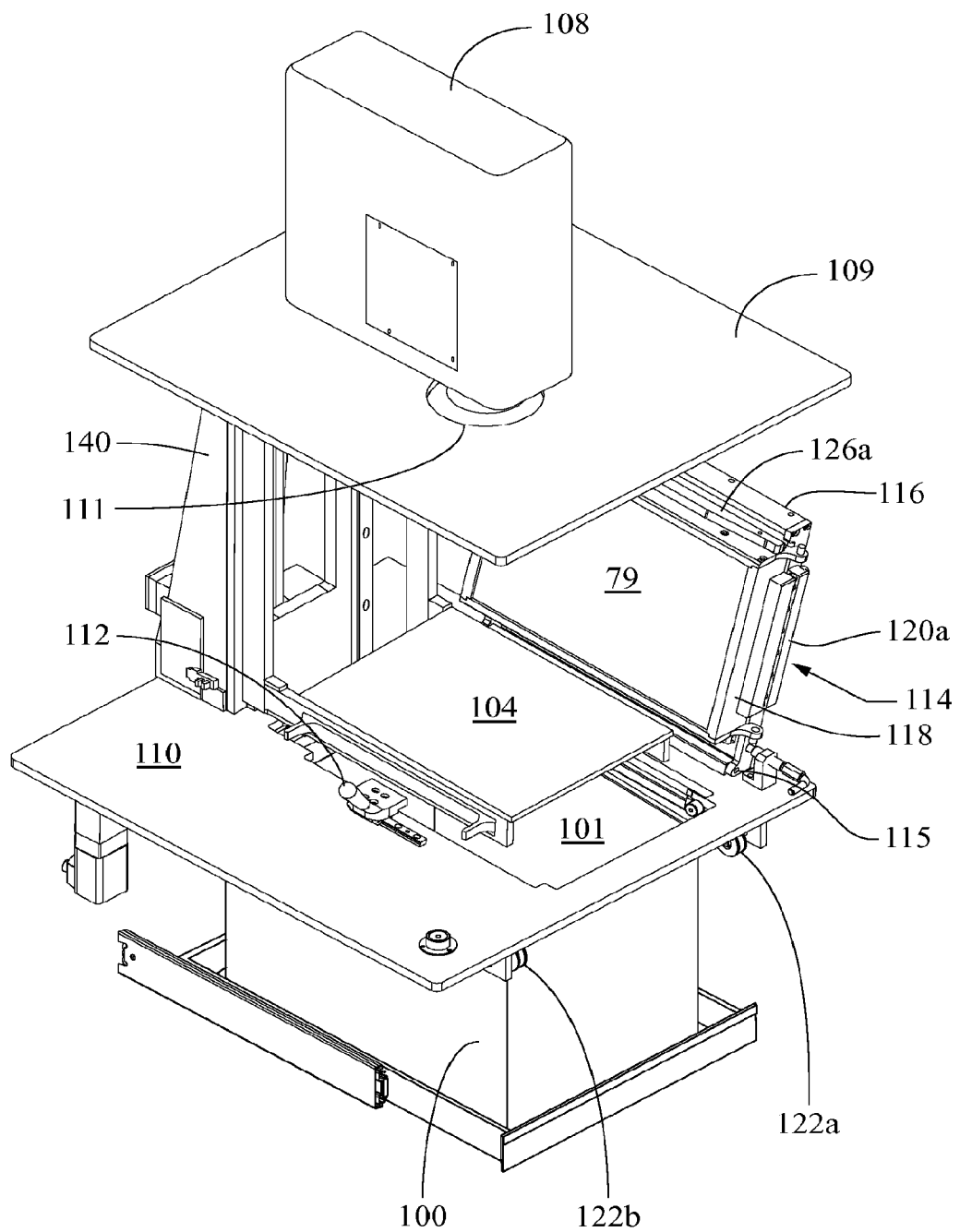
FIG. 10 is a perspective view of the system of FIG. 7 with the housing removed and a solidification substrate assembly shown in an open position.

In addition, housing 91 includes an upper compartment 127 (not shown) which is accessed via upper door 125 (FIG. 8). Upper compartment 127 houses pattern generator 108 and pattern generator support platform 109 (FIGS. 9-10). Upper door 125 is hingedly connected to housing 91, allowing it to be pivoted about a hinge to provide user access to upper compartment 127. Pattern generator support platform 109 includes an opening 111 through which energy is projected from pattern generator 108 to solidify the resin in container 100. In FIG. 8, one pattern generator is depicted. However, multiple pattern generators may be used, and in one preferred example, two pattern generators comprising two DLP projectors are provided.

Work table assembly 105 (FIG. 12) comprises a work table 110 and a solidification substrate assembly 114 (FIGS. 9-12). Work table 110 is disposed in the interior of housing 91 between the upper compartment 127 and the lower compartment 93 and includes opening 101 (FIGS. 10, 12) through which object build platform 104 is movably disposed. Opening 101 is preferably at least partially aligned with pattern generator support platform opening 111 so that energy supplied by pattern generator 108 is incident on the top surface of the resin in container 100.

Build platform 104 (FIG. 10) is connected to elevator assembly 140 (FIG. 10) which moves build platform 104 downward into resin container 100 during an object build operation and upward out of resin container 100 after an object build operation is complete. As indicated in FIG. 10, build platform 104 has a rest position in which it is elevated above work table 110 to facilitate the removal of finished objects as well as the removal of any excess resin on platform 104.

Figure 11:
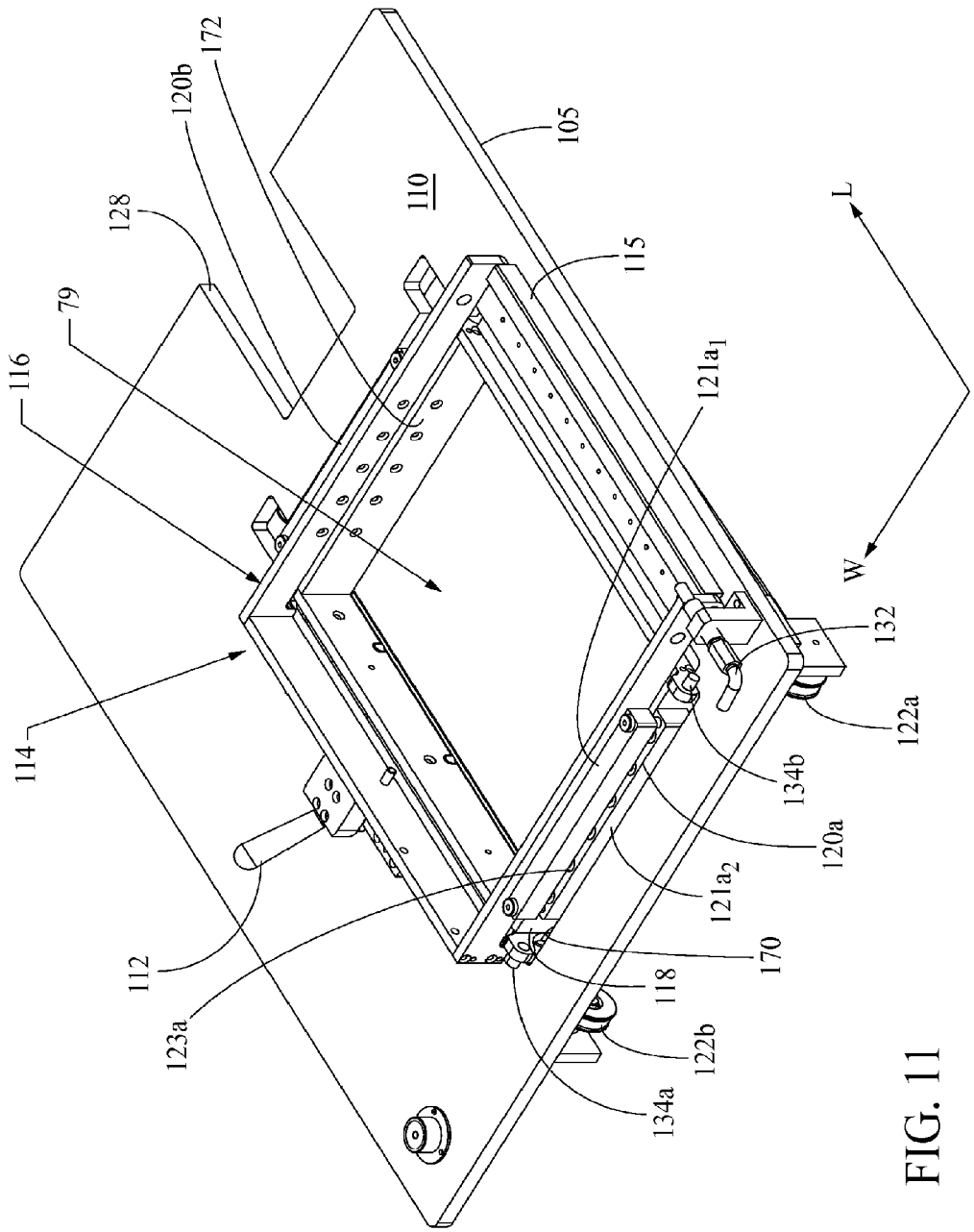
FIG. 11 is a perspective view of a work table assembly of the system of FIG. 7 with a solidification substrate assembly in a closed position.
Figure 12:
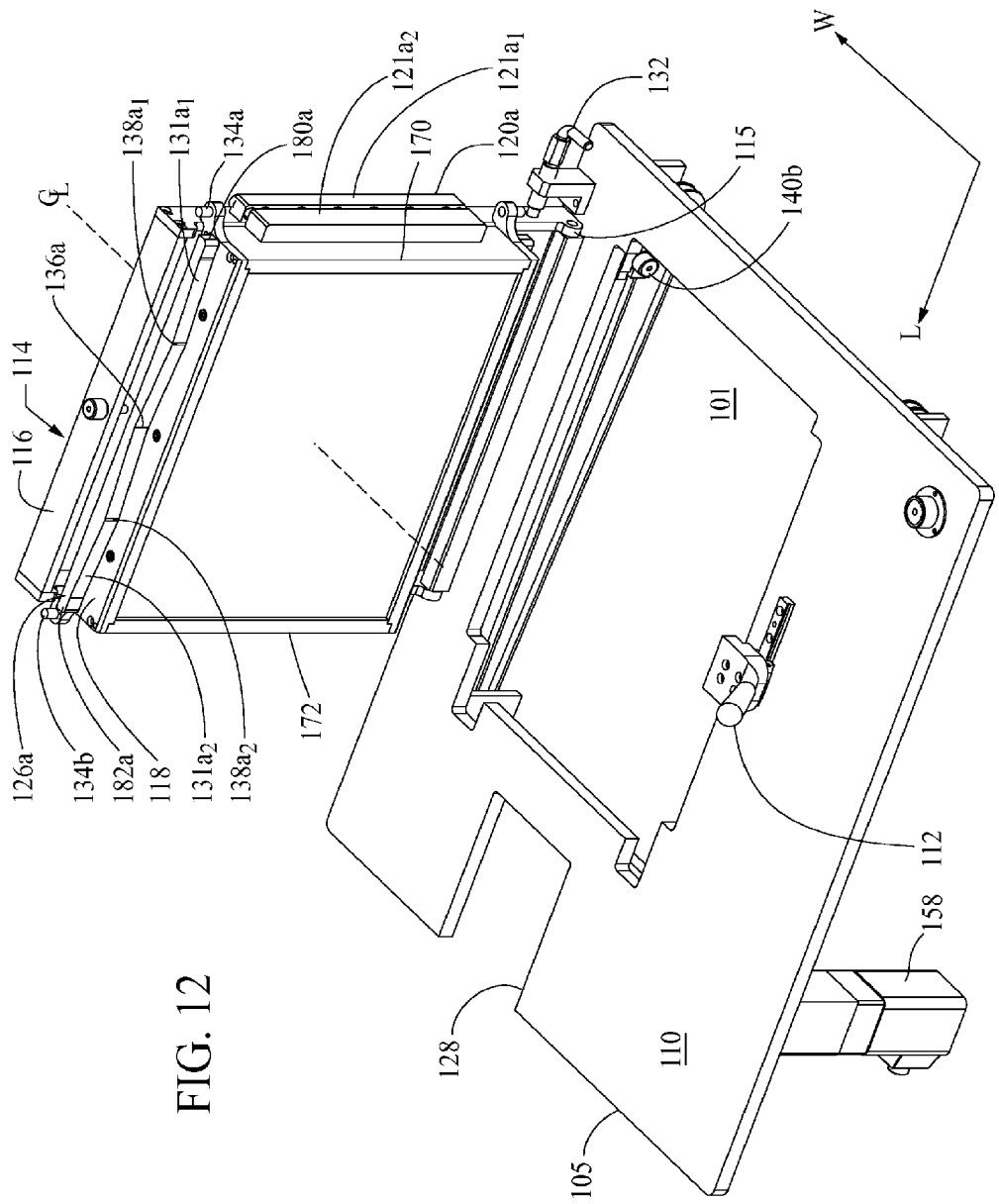
FIG. 12 is a perspective view of the work table assembly of the system of FIG. 7 with a solidification substrate assembly in an open position.

As best seen in FIGS. 11-12, solidification substrate assembly 114 is moveably positioned in work table opening 101. Solidification substrate assembly 114 is pivotable from a closed position (FIG. 11) to an open position (FIG. 12) about a hinge 115 defining a pivot axis. Solidification substrate assembly 114 includes solidification substrate 79 which is mounted in a solidification substrate frame 118. Solidification substrate frame 118 comprises a plurality of sides, which in the case of FIGS. 7-17 is four sides. Solidification substrate frame 118 is mounted beneath and in abutting engagement with a load frame 116.

At least one compression spring assembly is provided to supply a downwardly exerted force against solidification substrate frame 118. In the example of FIGS. 7-12, the at least one compression spring assembly comprises two compression spring assemblies, 120a and 120b, which are spaced apart from one another in the direction of the length L of solidification substrate assembly 114. Compression spring assembly 120a (best seen in FIG. 13) comprises an upper housing $121a_1$ and a lower housing $121a_2$ with a plurality of springs 123a spaced apart along the length of compression spring assembly 120a (i.e., spaced apart in the direction of the width W of solidification substrate assembly 114. Shoulder pins $144a_1$ and $144a_2$ secure upper spring housing $121a_1$ to lower spring housing $121a_2$, while still allowing relative movement between upper spring housing $121a_1$ and lower spring housing $121a_2$. Although not fully visible in the figures, compression spring assembly 120b similarly comprises upper housing $121b_1$, lower housing $121b_2$, a plurality of spaced apart springs 123b, and shoulder pins $144b_1$ and $144b_2$. The upper spring housings $121a_1$ and $121b_1$ are mounted on opposing sides of the load frame 116, and the lower spring housings $121a_2$ and $121b_2$ are mounted on corresponding opposing sides of the solidification substrate frame 118. Registration members 134a and 134b (FIGS. 11-13) (e.g., pins) are provided proximate the upper surface of solidification substrate frame 118 and are spaced apart from one another along the length L of solidification substrate assembly 114. Registration members 134a and 134b abut against work table 110 to vertically support solidification substrate frame 118 within work table opening 101. Registration members 134a, 134b each project away from the pivot axis defined by load frame hinge 115 of solidification substrate assembly 114 and provide a stop that limits the pivotal movement of solidification substrate assembly 114 in a direction beneath the plane of work table 110. In certain examples, registration members 134a and 134b comprise threaded pins used to align solidification substrate frame 118 parallel to build platform 104.

Work table assembly 105 also includes a bi-directional peeling mechanism 113 (not separately shown in figures). As best seen in FIGS. 13-17, bi-directional peeling mechanism 113 includes at least one cam and at least one corresponding cam follower. In the example of FIGS. 7-17, work table assembly 105 includes two cams 126a and 126b which are each mounted on opposite sides of solidification substrate frame 118 and spaced apart across the direction of the width W of solidification substrate assembly 114. Cams 126a and 126b are substantially rigid members that are attached to solidification substrate frame 118, and each of the cams 126a and 126b has a length that extends along all or part of the side of solidification substrate frame 118 to which it is attached. Thus, each of cams 126a and 126b has a lengthwise direction that is generally orthogonal to the lengthwise direction of spring assemblies 123a and 123b. Load frame latch 112 (FIGS. 9-12, 14, 17) is connected to work table 110 to releasably secure load frame 116 to work table 110. When load frame latch 112 is secured to work table 110, the upward vertical movement of solidification substrate frame 118 is limited by the compressible distance of springs 123a and 123b.

Figure 13:
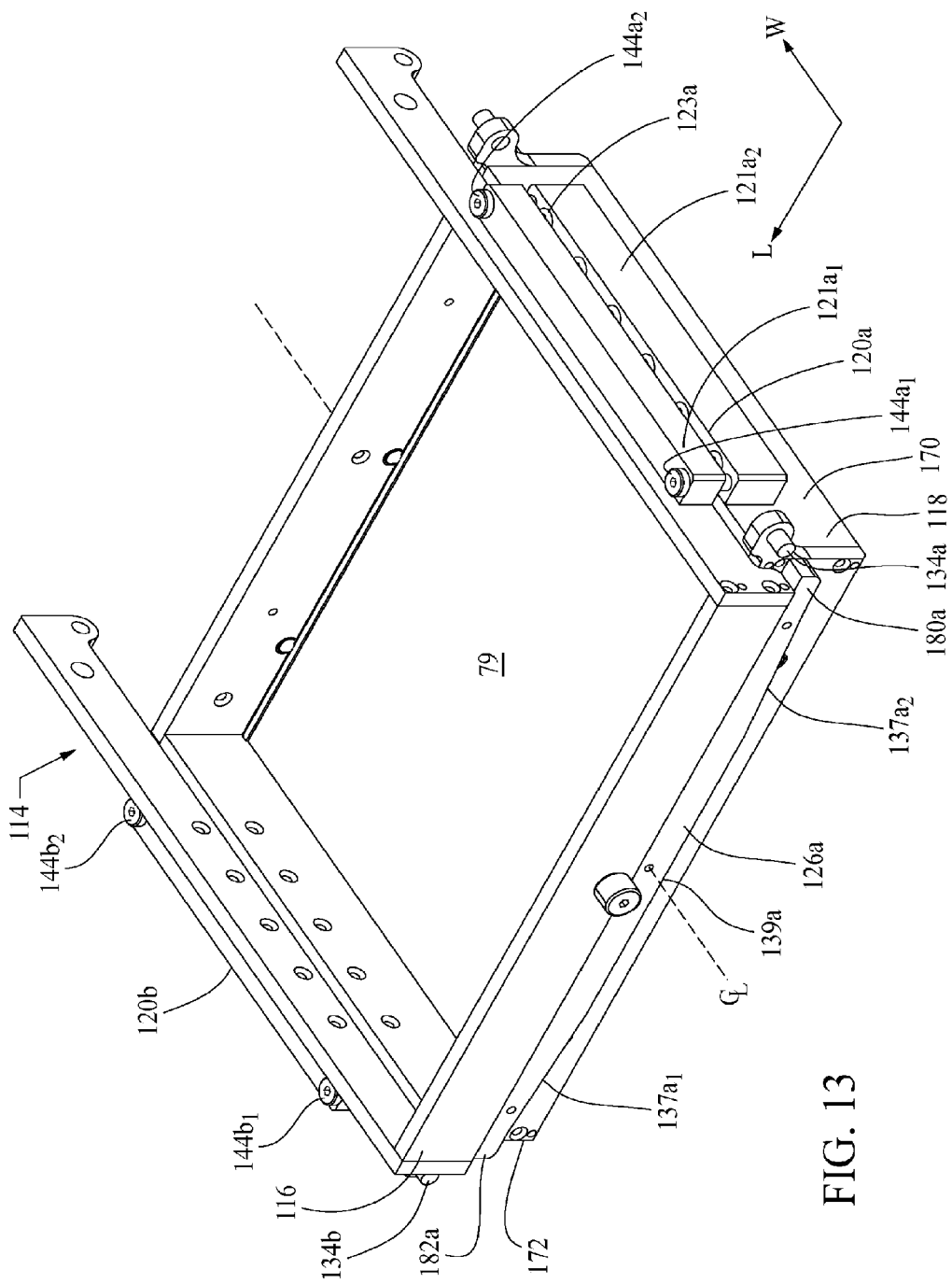
FIG. 13 is a perspective view of a solidification substrate assembly.
Figure 14:
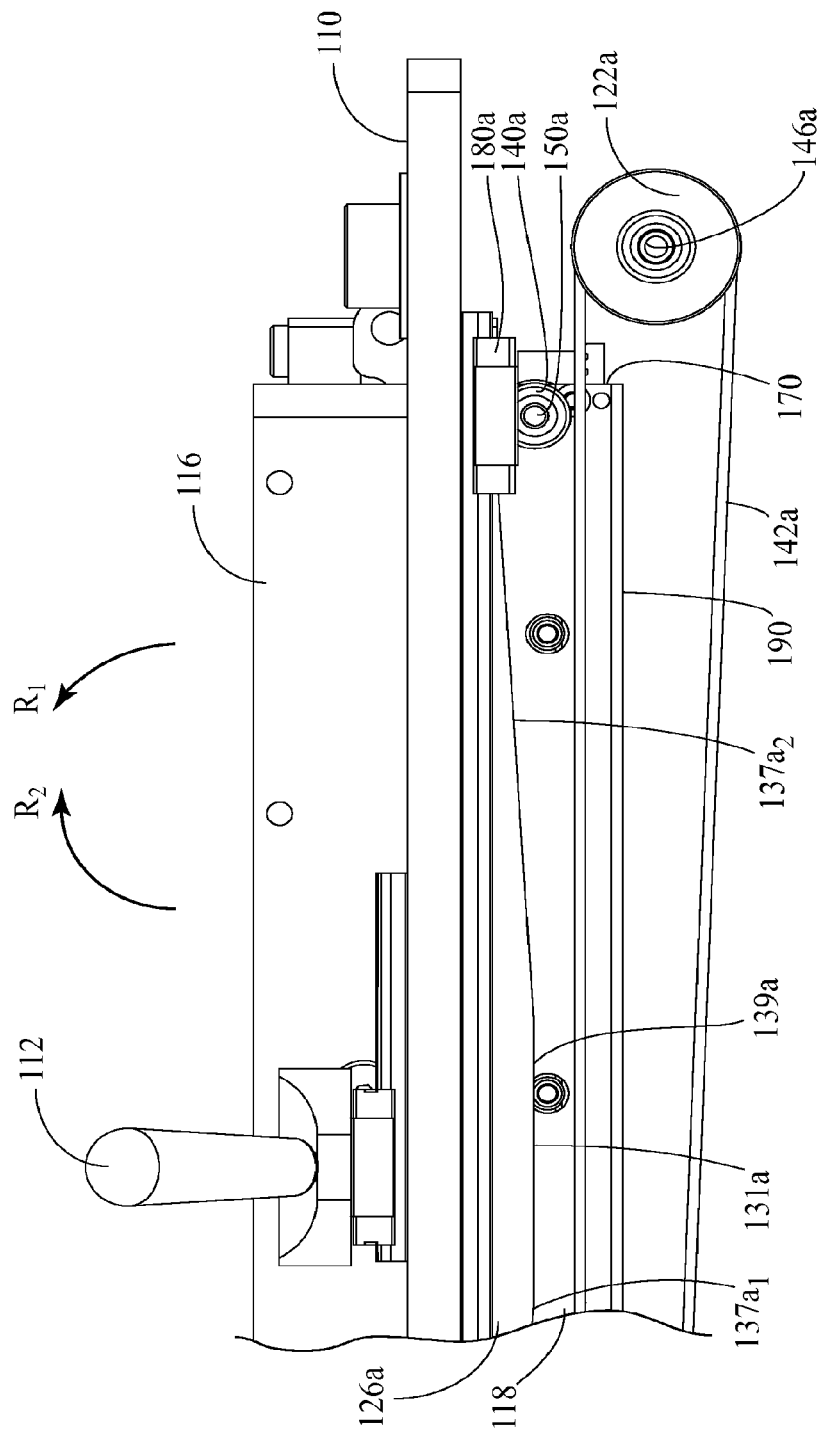
FIG. 14 is a partial side elevational view of a three-dimensional object manufacturing system including a solidification substrate assembly and a bi-directional peeling mechanism.

As best seen in FIG. 14, cam 126a has a downward facing surface 131a that engages a corresponding cam follower 140a. Although not visible in the figures, cam 126b similarly has a downward facing surface 131b that engages a corresponding cam follower 140b. The cam followers 140a and 140b each traverse the length of their respective cams 126a and 126b, engaging their corresponding downward facing surfaces 131a and 131b. The downward facing surfaces 131a and 131b have a profile that is designed to cause the solidification substrate frame 118 to tilt about each of solidification substrate frame ends 170, 172 (FIG. 13) as the cam followers 140a and 140b engage their respective cams 126a and 126b and travel in a first direction along the length of cams 126a and 126b. More specifically, as cam followers 140a and 140b traverse one full length of their cams 126a and 126b, solidification substrate frame 118 tilts about a first one of its ends 170, 172 and then returns to its starting position. As cam followers 140a and 140b travel in the opposite direction, solidification substrate frame 118 tilts about another one of its ends and then returns to its starting position. Thus, system 90 has a multi-axis peeling mechanism that allows for multi-directional peeling. In system 90, the peeling occurs about opposite ends of substrate frame 118. However, additional tilting axes may be provided. In addition, the tilting axes need not be substantially parallel, but may be substantially perpendicular or oriented in directions that are not orthogonal to one another.

To provide the foregoing tilting and peeling operations, cams 126a and 126b preferably have variable engagement profiles (i.e., profiles along their surfaces 131a and 131b which engage the cam followers 140a and 140b). The variation in the profiles can be characterized by the distance between the engagement surfaces (such as downward facing surfaces 131a and 131b) and one or more reference planes. The reference planes are preferably stationary during an object build process. For example, work table 110 may serve as a reference plane. Referring to FIG. 14, at the ends 180a/182a and 180b/182b (not shown) of cams 126a and 126b (not shown), the downward facing surfaces 131a and 131b are at their closest to work table 110. The vertical distance between the downward facing surfaces 131a/131b and the work table 110 increases moving from the cam ends 180a/182a and 180b/182b toward the minimum-section 139a/139b of each cam 126a/126b. Thus, at the minimum sections 139a and 139b, the distances between the downward facing cam surfaces 131a and 131b and the work table 110 are at their greatest. Bottom surface 190 (FIG. 14) of solidification substrate frame 118 may also serve as a reference surface. The spacing between the cam ends 180a/182a and 180b/182b and solidification substrate frame bottom surface 190 is greater than anywhere else along cams 126a and 126b, while the distance at the cam minimum sections 139a and 139b is smaller than anywhere else along the length of cams 126a and 126b.

As mentioned previously, solidification substrate assembly 114 is pivotable about a hinge 115 that defines a pivot axis. More specifically, load frame 116 is secured to hinge 115 at one end and is releasably secured to work table 110 at another end with load frame latch 112 (FIG. 12). Solidification substrate frame 118 is not fixedly attached to work table 110. Instead, it is attached to load frame 116 via spring assemblies 120a and 120b and is restrained from downward vertical movement by the abutment of registration members 134a and 134b with work table 110. As a result, solidification substrate frame 118 is vertically movable toward and away from load frame 116 as cam followers 140a and 140b traverse the lengths of their respective cams 126a and 126b.

Figure 15:
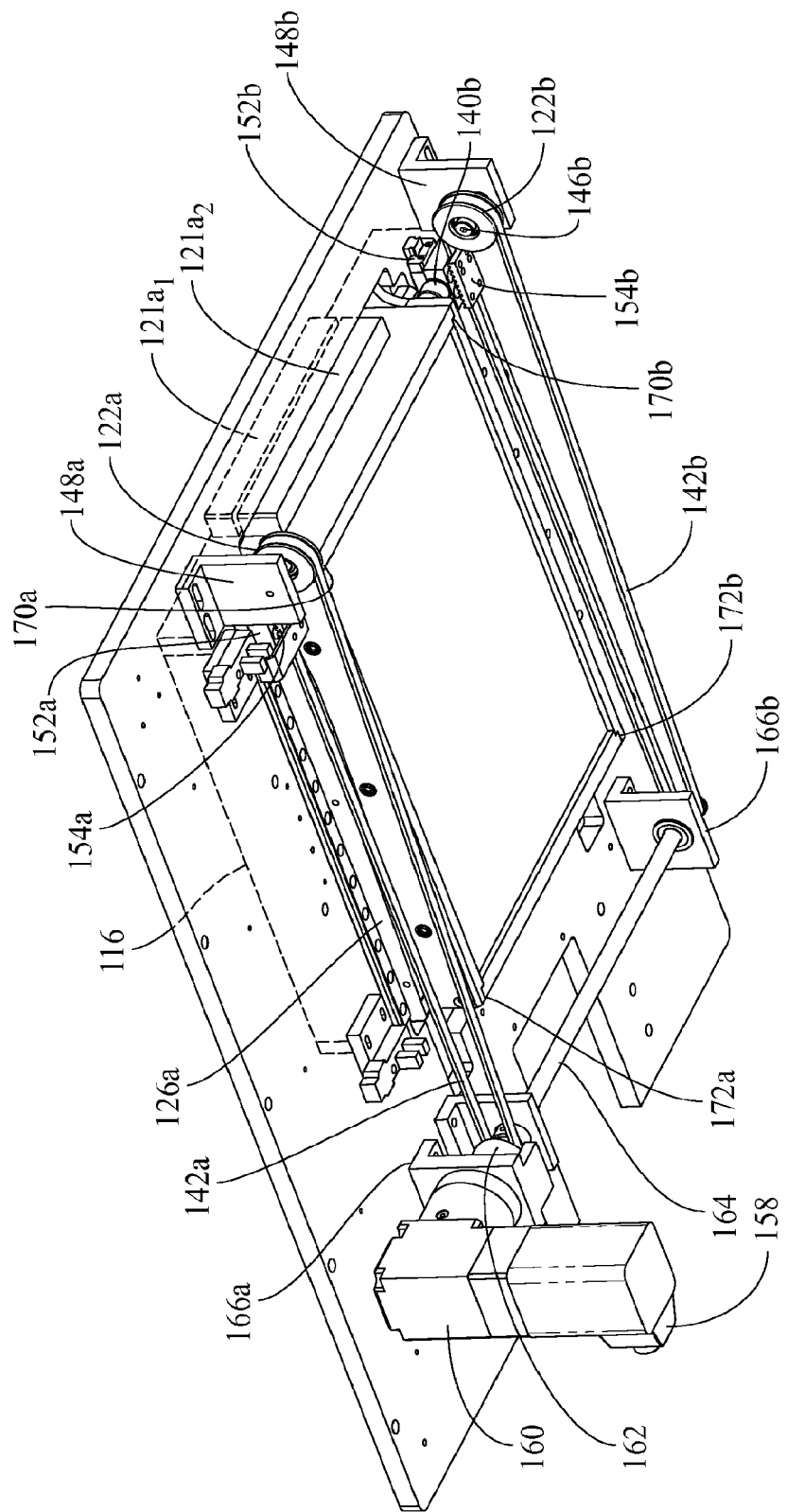
FIG. 15 is a perspective view of a three-dimensional object manufacturing system having a solidification substrate assembly and a bi-directional peeling mechanism.
Figure 16:
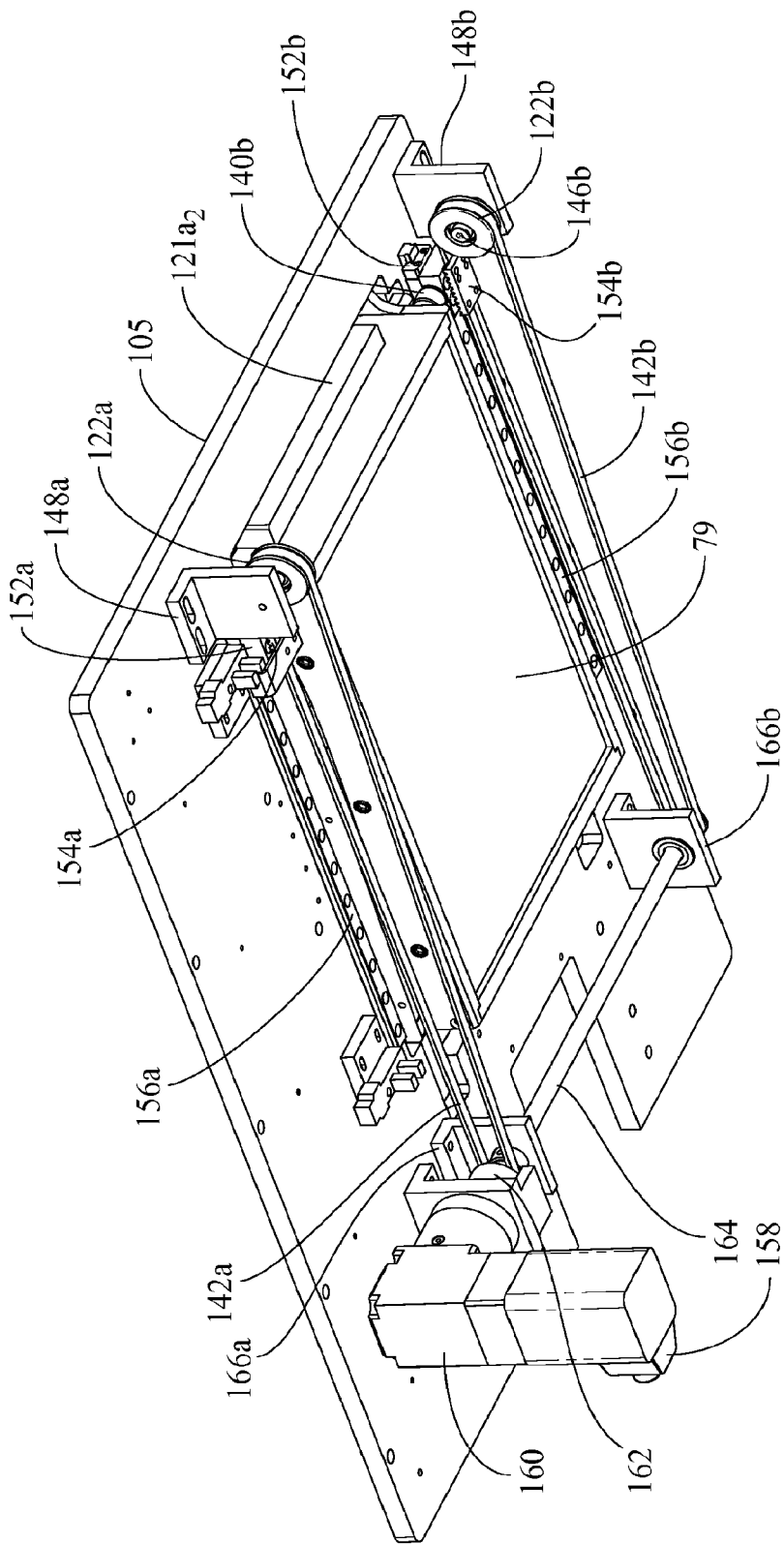
FIG. 16 is a perspective view of the bottom of a three-dimensional object manufacturing system including a solidification substrate assembly and a bi-directional peeling mechanism.
Figure 17:
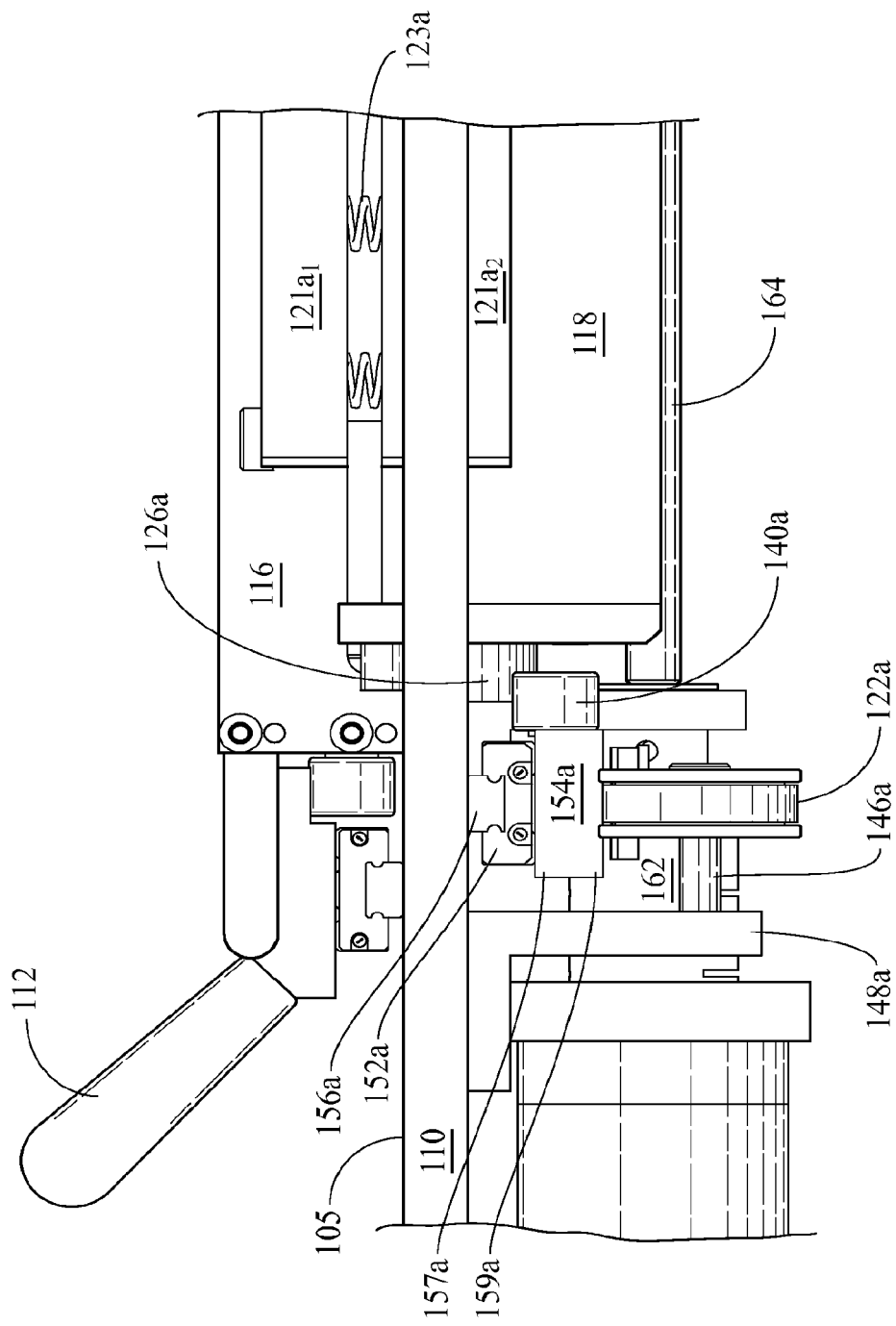
FIG. 17 is a detailed rear elevational view of a portion of a three-dimensional object manufacturing system device including a solidification substrate assembly and a bi-directional tilting mechanism.

Cam followers 140a and 140b (FIGS. 14-17) are provided with a vertical support that is spaced apart from cams 126a and 126b and which allows the followers 140a and 140b to maintain their vertical position as they travel along the lengths of cams 126a and 126b. Referring to FIGS. 14-17, cam blocks 154a and 154b are provided and perform this vertical support function. Cam followers 140a and 140b are rollers that are rotatably mounted on roller axes (not shown) attached to cam blocks 154a and 154b. The cam follower blocks 154a and 154b support the cam followers 140a and 140b and are connected to linear guide blocks 152a and 152b. Linear guide blocks 152a and 152b slidably engage linear rails 156a and 156b, which are fixedly mounted to the bottom of work table 110, as shown in FIGS. 16 and 17. The engagement of the linear guide blocks 152a/152b and cam follower blocks 154a/154b with work table 110 in this manner restrains the cam followers 140a and 140b from vertical movement (i.e., movement perpendicular to work table 110). As a result, when the cam followers 140a and 140b engage their corresponding cams 126a and 126b, the solidification substrate frame 118 tilts against the restoring force of springs 123a and 123b. As best seen in FIG. 17, the upper surface 157a and lower surface 159a of cam follower block 154a each serve as a stationary reference surface for purposes of characterizing the profile of cams 126a and 126b. The cam ends 180a/180b and 182a/182b are the farthest vertically from the cam follower block surfaces 157a/157b and 159a/159b, while the cam minimum sections 139a and 139b are the closest to each of the surfaces.

In one example, cam follower blocks 154a and 154b are each connected to and move with corresponding timing belts 142a and 142b. As best seen in FIGS. 15 and 16, timing belts 142a and 142b move along the direction of the lengths of cams 126a and 126b and carry the cam follower blocks 154a and 154b as they move. Timing belts 142a and 142b are connected to motor drive shaft 164 proximate one end of work table 110 and are spaced apart from one another along the width W of work table 110 and solidification substrate assembly 114. Timing belts 142a and 142b are connected to idler pulleys 122a and 122b proximate the opposite end of work table 110. Idler pulleys 122a and 122b are rotationally mounted on respective shafts 146a and 146b (FIGS. 16, 17). Shafts 146a and 146b are connected to corresponding idler pulley brackets 148a and 148b which are each connected to the underside of work table 110. Drive shaft 164 is rotated by motor 158. Gearbox 160 houses transmission gears that transmit the motion of motor 158 to drive shaft 164 via coupling 162 (FIGS. 15-17). Drive shaft 164 is rotatably mounted in a pair of brackets 166a and 166b which are affixed to the underside of work table 110 proximate one end of work table 110.

Cams 126a and 126b may have a variety of different profiles. Two different cam profiles are illustrated in FIG. 12, and FIGS. 13-14, respectively. However, the profiles are preferably configured to provide bi-directional peeling of solidification substrate 79 from the object being formed by three-dimensional object manufacturing system 90. The cams 126a and 126b may also be configured to provide multiple tilting operations if desired. A portion of one exemplary cam profile is depicted in FIG. 14. FIG. 14 depicts approximately one half of the length of work table 110. Cam 126a is substantially symmetrical about its minimum section 139a. As shown in the figure, cam 126a has a minimum section 139a and slopes upward (toward load frame 116) as the cam is traversed from minimum section 139a to a first end 180a of the cam along upwardly sloping section $137a_2$. Cam 126a also slopes upward as cam 126a is traversed from minimum point 139a to a second end 182a (opposite the first end and not visible in FIG. 14) of cam 126a along upwardly sloping section $137a_1$. Minimum sections 139a and 139b may comprise minimum points or lengths of cams 126a, 126b.

In FIG. 14, cam follower 140a is in an initial position at cam end 180a in which solidification substrate frame 118 is substantially level with respect to work table 110. As cam follower 140a moves from the position shown in FIG. 14 to the minimum point 139a along upwardly sloping section $137a_2$, it exerts an upward force on the downward facing surface 131a of cam 126a. The upward force is to some extent opposed by the compressive force of springs 123a. As cam 126a is traversed, the vertically downward (i.e., orthogonally to the length of cam 126a) distance between the downward facing surface 131a of cam 126a and cam follower block 140a is reduced until cam minimum section 139a is reached. As a result, solidification substrate frame 118 tilts about frame end 172 (FIG. 13) in the direction of $R_1$ as cam follower 140a travels from cam end 180a to minimum cam point 139a.

When cam follower 140a reaches minimum cam section 139a, maximum tilting of solidification substrate frame 118 about frame end 172 (FIG. 13) in the direction $R_1$ is achieved. As cam follower 140a continues to travel from minimum cam section 139a to the opposite end 182a (FIG. 13) of cam 126a (i.e., the end proximate motor 158a; FIG. 15) along upwardly sloping section $137a_1$, the solidification substrate frame 118 begins to tilt in direction $R_2$ (e.g., counterclockwise) about the frame end 172 proximate motor 158. Once cam follower 140a reaches the cam end 182a (FIG. 13), the solidification substrate frame 118 again becomes substantially level with respect to work table 110 as is the case when cam 126a is at cam end 180a. As cam follower 140a returns toward the cam minimum section 139a from cam end 182a, it first traverses along downwardly sloping section $137a_1$ of the downward facing surface 131a of cam 126a. As cam follower 140a travels toward minimum cam section 139a, solidification substrate frame 118 tilts in direction $R_2$ about frame end 170 (i.e., about the end proximate idler pulley 122a). As cam follower 140a travels from cam minimum point 139a to cam end 180a (i.e., the cam position shown in FIG. 14) along upwardly sloping section $137a_2$, solidification substrate frame 118 tilts in direction $R_1$ about frame end 170.

Therefore, as cam follower 140a travels one complete cycle along cam 126a (i.e., from cam end 180a to cam end 182a and back again), solidification substrate frame 118 tilts about both its ends 170 and 172. This multi-axial tilting action provides a multi-directional peeling action by causing solidification substrate 79 to peel away from solidified material in multiple directions, which in the case of FIGS. 7-17 is two rotational directions, $R_1$ and $R_2$. Solidification substrate frame 118 peels in direction $R_1$ about both frame ends 170, 172 and peels in direction $R_2$ about both frame ends 170, 172. As indicated earlier, cam follower 140b travels along cam 126b as cam follower 140a travels along cam 126a. The two cam followers 140a and 140b are preferably substantially synchronized as they move along their respective cams so that they are at substantially the same position along the length of their respective cams, 126a and 126b, at any given time. Thus, the downward-facing cam surface 131a defines a cam profile along the length of cam 126a which facilitates multi-directional peeling, or more specifically, bi-directional peeling.

The bi-directional peeling system illustrated in FIGS. 13-16 is merely exemplary and various different components and configurations can be used to provide bi-directional peeling. For example, instead of timing belts 142a and 142b, screw drives may be used to advance cam blocks 154a and 154b along the lengths of cams 126a and 126b, respectively.

Figure 18:
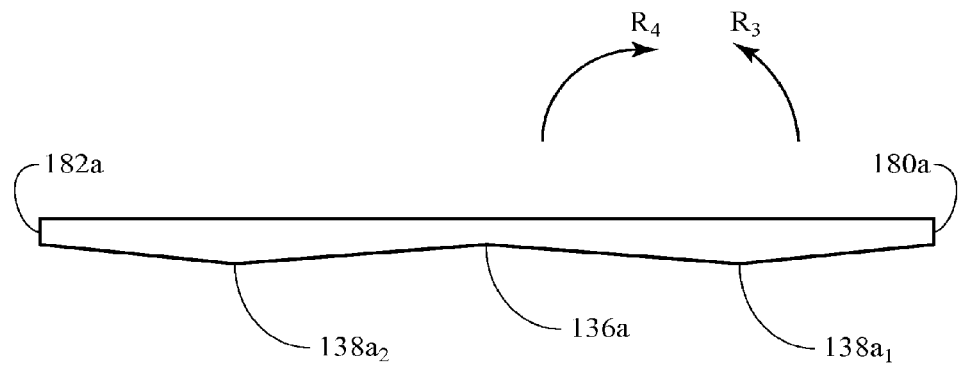
FIG. 18 is an alternate embodiment of a cam for bi-directionally peeling a solidification substrate from a solidified material.

In the previous example, during one round trip of a cam follower 140a/140b (i.e., as it traverses its respective cam 126a/126b from one end to the other and back again), four tilting operations and two peeling operations are provided. The four tilting operations comprise tilting in each of directions $R_1$ and $R_2$ about each solidification substrate frame end 170 and 172 and with respect to both object 44 and load frame 116. The two peeling operations occur as cam followers 140a/140b traverse their respective cams 126a/126b from one end of the cam to the cam minimum section 139a. However, additional tilting and peeling operations may be provided, and in certain embodiments, the cam profiles are varied to provide for additional tilting and peeling operations. Referring to FIGS. 12 and 18, cam 126a has a profile similar to an elongated "W" with two minima, $138a_1$ and $138a_2$. The lengthwise mid-point 136a of cam 126a is not a minimum point, but rather, is at the same vertical position as end points 180a and 182a. As cam follower 140a travels from cam end 180a to first minimum section $138a_1$ solidification substrate frame 118 tilts in direction $R_3$ (FIG. 18) about frame end 172, resulting in a first tilting operation and a first peeling operation. As cam follower 140a travels from minimum section $138a_1$ to mid-point 136a, solidification substrate frame 118 begins to tilt in direction $R_4$ (FIG. 18) about frame end 172, resulting in a second tilting operation. As cam follower 140a travels from cam mid-point 136a to second minimum section $138a_2$, solidification substrate frame 118 again tilts in direction $R_3$ about frame end 172, yielding a third tilting operation and a second peeling operation. As cam follower 140a travels from second cam minimum section $138a_2$ to cam end 182a, solidification substrate frame 118 tilts back in direction $R_4$ about frame end 172, yielding a fourth tilting operation.

As cam follower 140a traverses the length of cam 126a from cam end 182a to second cam minimum $138a_2$, solidification substrate frame 118 tilts in direction $R_4$ about frame end 170, yielding a fifth tilting operation and a third peeling operation. As cam follower 140a moves from second cam minimum $138a_2$ to mid-point 136a, solidification substrate frame 118 tilts back in direction $R_3$ about frame end 170, yielding a sixth tilting operation. The process repeats itself as cam follower 140a travels from cam mid-point 136a to cam end 180a. Thus, when the cam profile of cam 126a of FIGS. 12 and 18 is used, during one round trip of cam followers 140a/140b along their respective cams 126a/126b, four peeling operations and eight tilting operations are provided. Two of the peeling operations and four of the tilting operations are performed about a tilt axis at frame end 170, and another two of the peeling operations and another four of the tilting operations are performed about a tilt axis at the frame end 172. Additional cam structures may be provided to obtain the desired degree and manner of tilting, and the structures depicted herein are merely exemplary.

As indicated previously, in downward building processes such as those depicted in FIG. 1A or used with the device of FIGS. 7-17, solidification substrate 79 rests on the top surface of solidifiable material 41 (e.g., a photopolymeric resin) to provide a substantially planar surface and improve object building accuracy. As indicated previously, as portions of the upper region of the solidifiable material 41 are selectively solidified, the object build platform 46, 74, 104 moves away from solidification substrate 79, thus allowing unsolidified material to flow into the space between the platform 46, 74, 104 and substrate 79. With the device of FIGS. 7-17, the solidification substrate 79 can be immersed below the upper surface of the solidifiable material to create a hydrostatic head above the portion of the solidifiable material 41 that is immediately beneath solidification substrate 79. The level of the solidifiable material 41 is preferably below the upper surface of the solidification substrate frame 118 to prevent the solidifiable material 41 from flowing over and on top of the solidification substrate 79.

Figure 19:
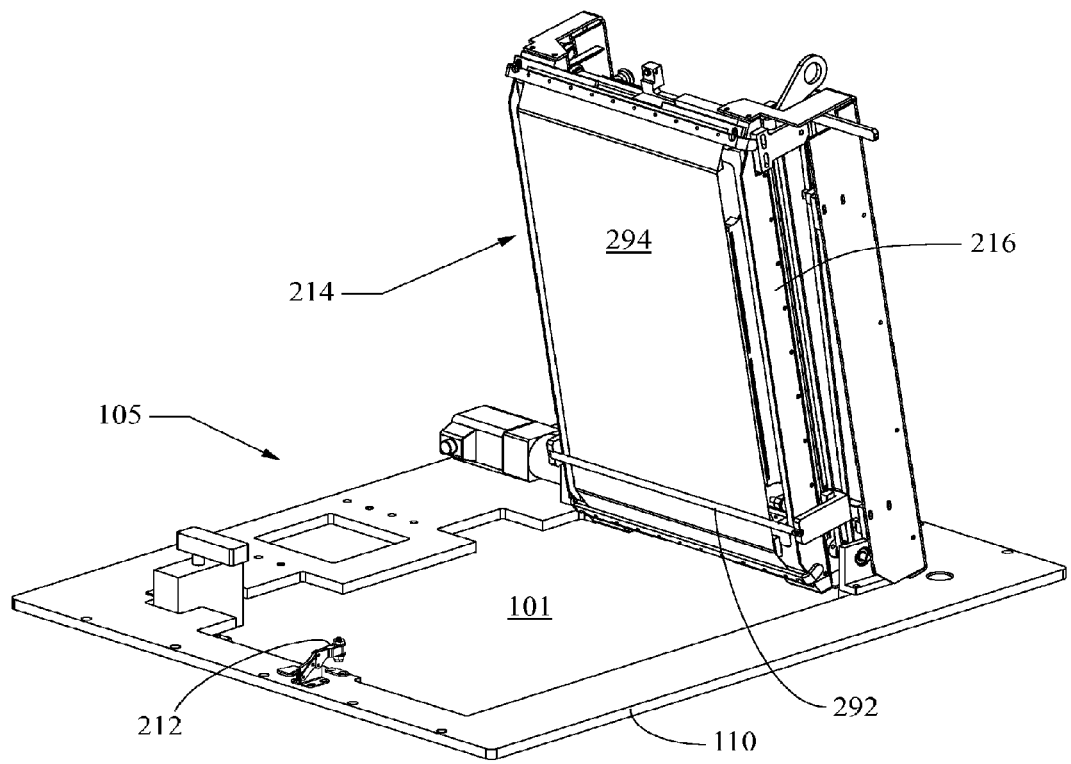
FIG. 19 is a first perspective view of a first alternative embodiment of a solidification substrate assembly connected to a work table with the solidification substrate assembly shown in an open position.

Referring to FIG. 19, an alternate embodiment of a solidification substrate assembly 214 is depicted. In certain exemplary embodiments, solidification substrate assembly 214 may be used in three-dimensional object manufacturing system 90 place of solidification substrate assembly 114. Thus, in certain embodiments, as depicted in FIG. 10, solidification substrate assembly 214 is hingedly connected to work table 110, allowing a user to selectively place assembly 214 within work table opening 101.

Figure 20A:
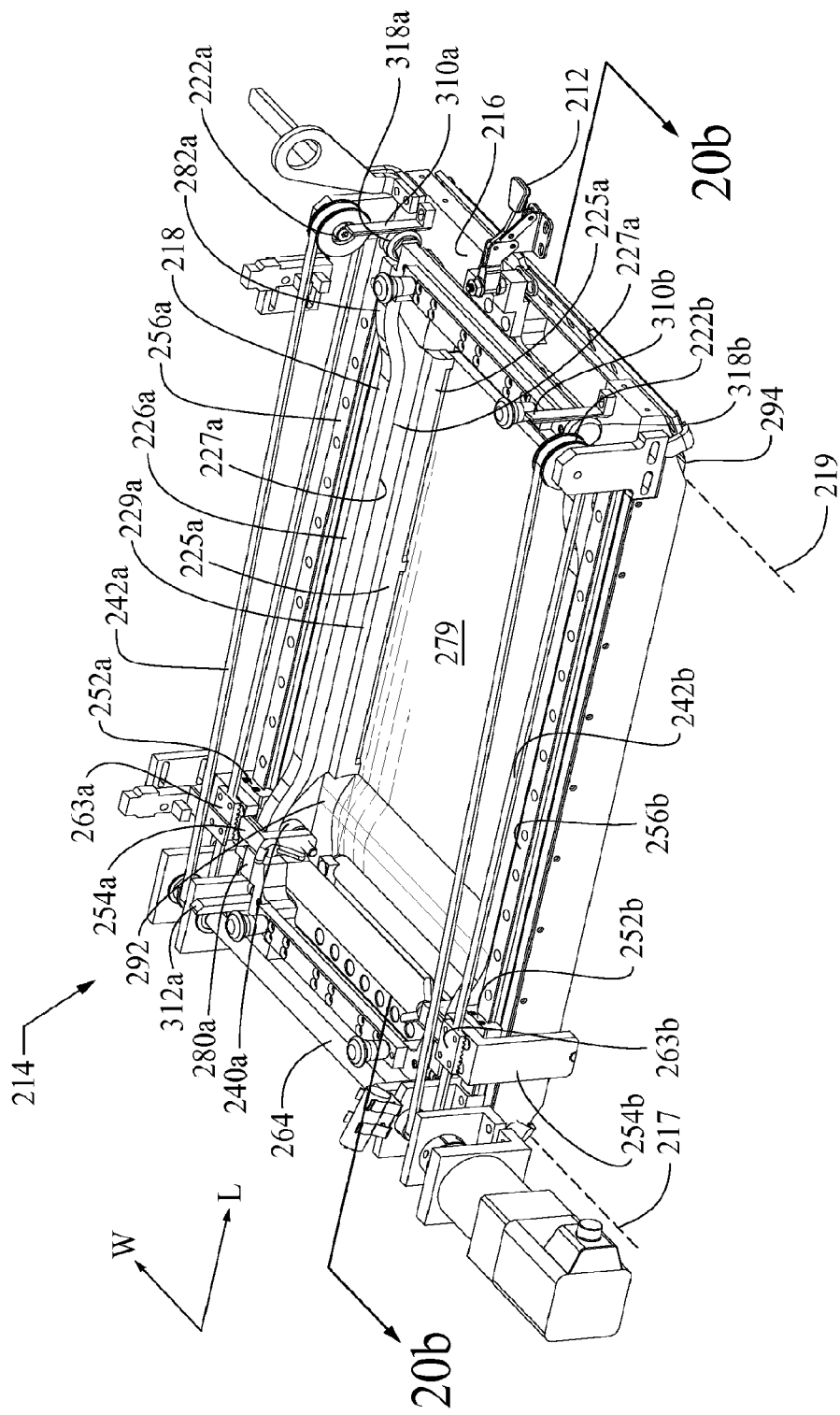
FIG. 20a is a second perspective view of the solidification substrate assembly of FIG. 19.
Figure 20B:
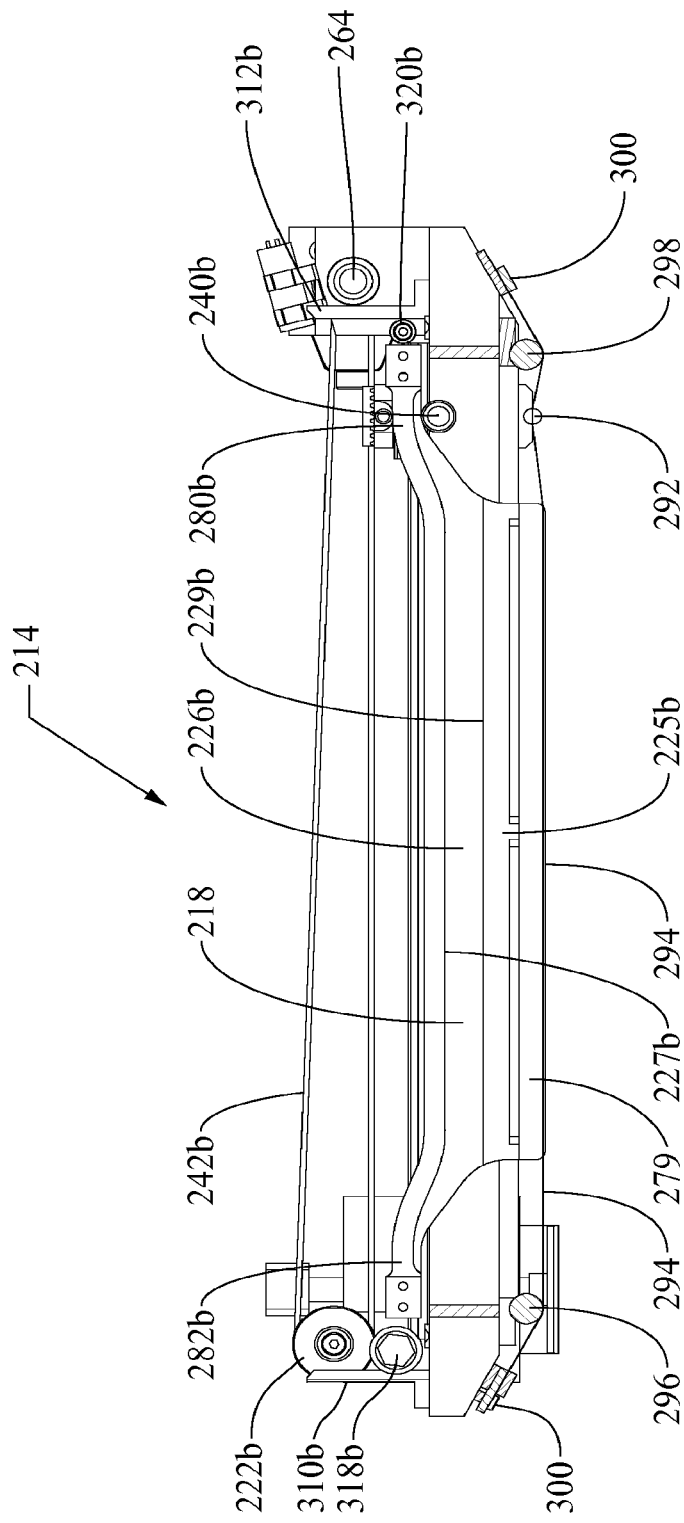
Figure 20C:
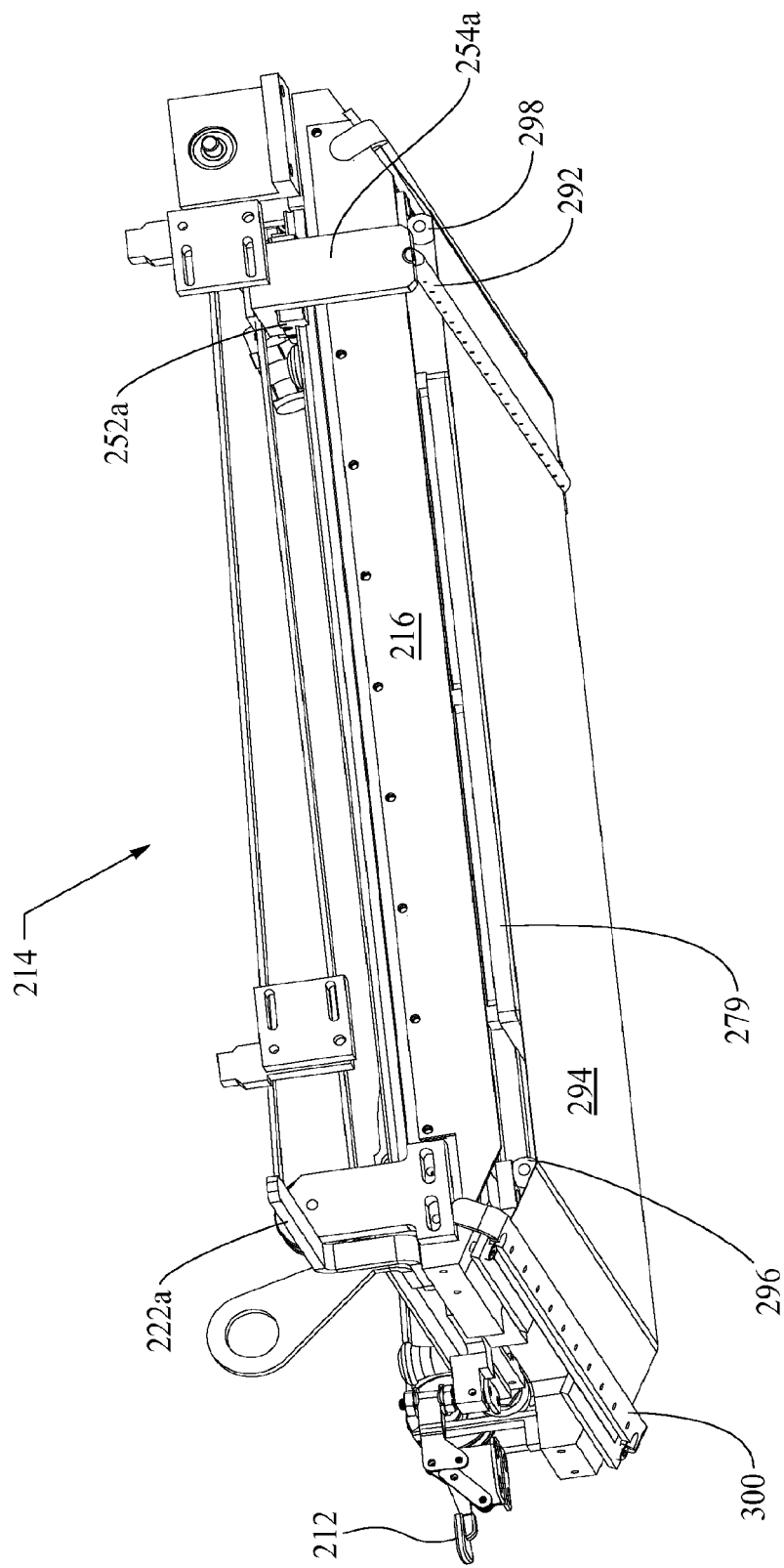
FIG. 20c is a third perspective view of the solidification substrate assembly of FIG. 19 disconnected from a work table.

Unlike solidification substrate assembly 114, solidification substrate assembly 214 includes both a solidification substrate 279 and a separate film 294 (FIGS. 20a-20c). Solidification substrate 279 is of the type described previously with respect to solidification substrates 79a-c. In the example of FIGS. 19-24, solidification substrate 279 comprises a rigid or semi-rigid translucent layer of material without an attached resilient layer or attached protective film 294. In certain embodiments, film 294 is resilient and translucent. Suitable films include the films described for translucent protective film layer 82a, described above. The selected films preferably have sufficient resilience and strength such that they are not damaged when peeled in the manner discussed below. Especially preferred materials for film 294 include MFA and TEFLON® films.

In the depicted embodiment, during an object building operation, translucent film 294 is held below the level of solidifiable material 41 and is pressed downward by solidification substrate 279. The solidification substrate 279 preferably has a degree of rigidity and is dimensioned to cause the exposed surface of solidifiable material 41 to form a substantially planar surface. The maintenance of a substantially planar exposed surface provides for a greater degree of uniformity and/or precision in the solidification process, while in certain embodiments, the use of a separate film 294 provides for greater ease of separation of the solidified part than does a process wherein the solidifiable material is solidified in direct contact with solidification substrate 279.

Because the solidifiable material 41 solidifies in contact with film 294, in certain instances, the film may adhere to recently solidified object sections. The film 294 is preferably separated from the recently solidified object section prior to supplying additional solidifiable material adjacent to solidifiable film 294. Thus, in accordance with certain examples, a peeling member 292 is provided with solidification substrate assembly 214 to separate solidified object sections from film 294. Peeling member 292 may be provided in a variety of different shapes, but is preferably an elongated member. In the example of FIGS. 19-20a-c, peeling member 292 is generally an elongated, cylindrical member that does not rotate about its own longitudinal axis. Following an exposure of solidifiable material 41 to electromagnetic radiation provided by pattern generator 108 (not shown in FIGS. 19-23), peeling member 292 traverses the underside of film 294 between film 294 and the exposed surface of the recently solidified object section to peel the film 294 away from the object 44 (not shown in FIGS. 19-23). In a preferred embodiment, the peeling member 292 is configured to provide line peeling, such that at any given time the section of solidified material be separated from film 294 defines a generally linear path across the width of film 294.

Depending on the material used to construct solidification substrate 279, the traversal of peeling member 292 across the surface of film 294 could damage substrate 279 if the film remains in contact with substrate 279. Thus, in certain examples, the solidification substrate 279 is separated from all or part of film 294 during a film peeling operation such that no force is applied from peeling member 292 to solidification substrate 279. A variety of different mechanisms may be used to achieve the separation. In the example of FIGS. 19-24, solidification substrate 279 is displaced away from peeling member 292 during a peeling operation by providing a tilting mechanism that tilts solidification substrate 279 about axes 217 and 219 (FIG. 20a) at spaced apart ends of solidification substrate assembly 214. Axes 217 and 219 are oriented in a direction that is generally perpendicular to length of film 294 and the direction of travel of peeling member 292.

Figure 21:
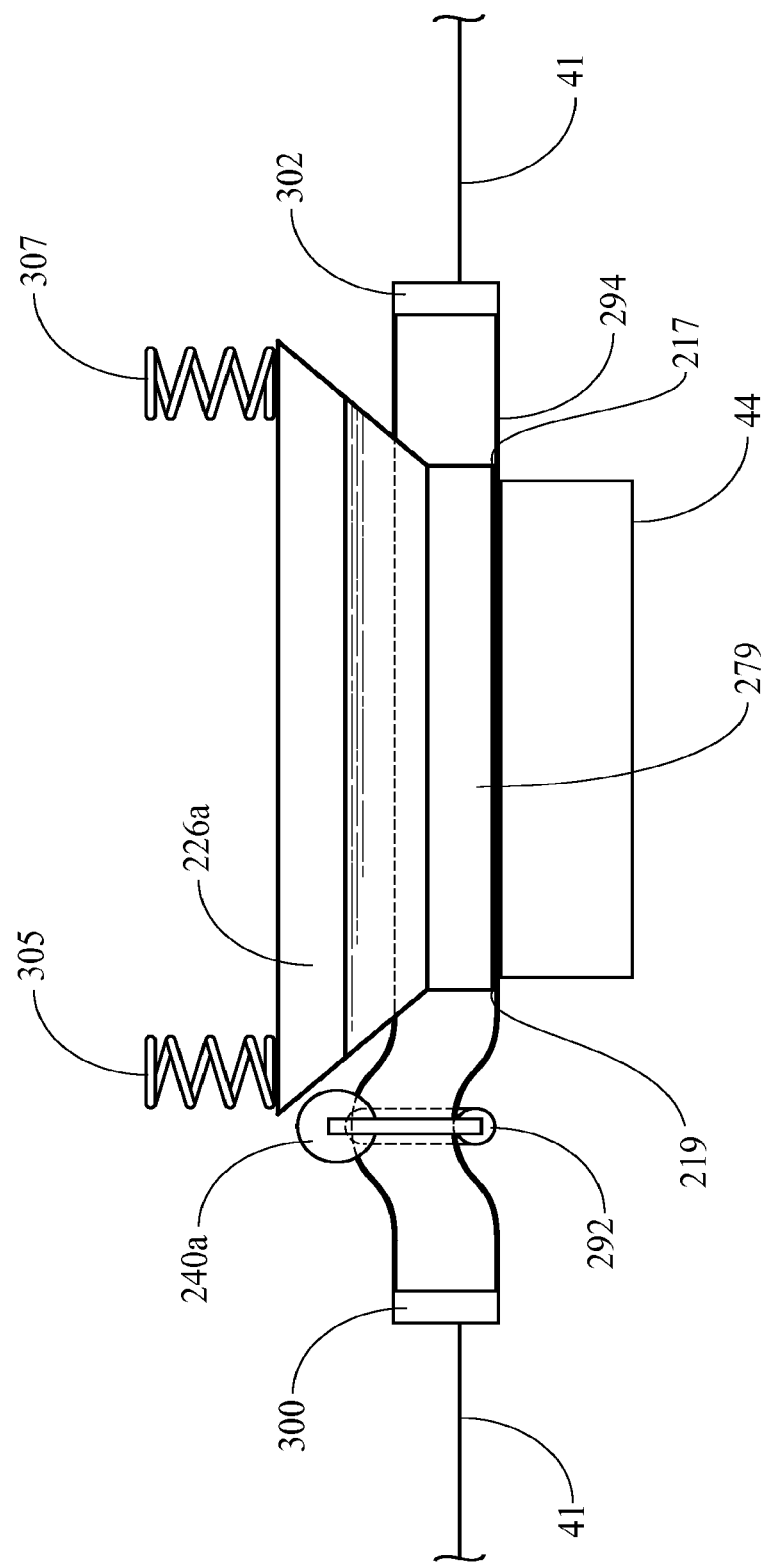
FIG. 21 is a schematic used to depict the operation of the solidification substrate assembly of FIG. 19 in a first configuration.
Figure 22:
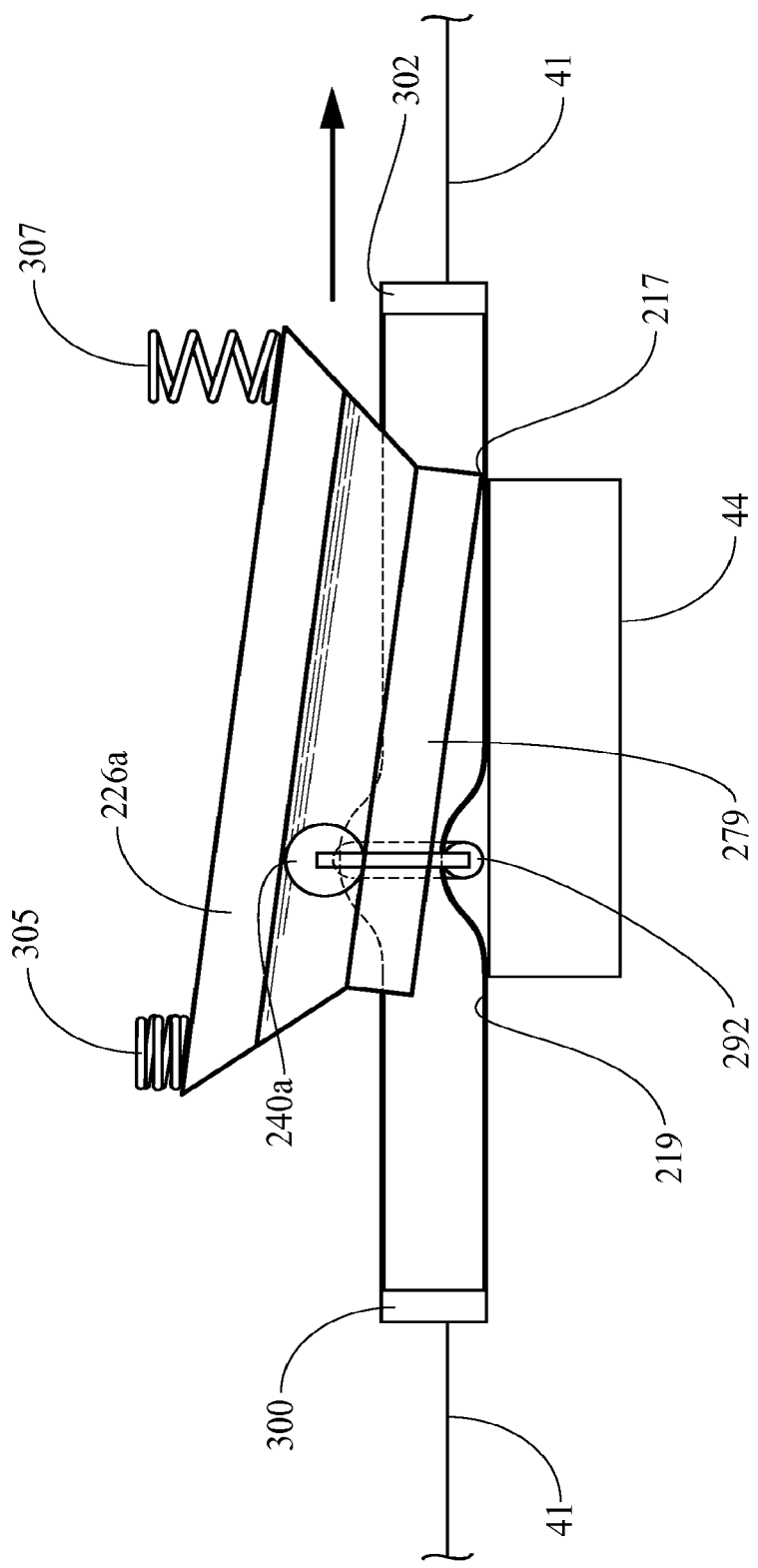
FIG. 22 is a schematic used to depict the operation of the solidification substrate assembly of FIG. 19 in a second configuration.

An exemplary peeling operation is schematically depicted in FIGS. 21-24. In FIG. 21, an exposure has just been performed to solidify an exposed surface of solidifiable material 41 and form the uppermost surface of object 44 in contact with film 294. Peeling member 292 begins its travel proximate one end of the length of film 294 and moves toward the other end of film 295. In FIG. 22, peeling member 292 has begun to separate film 294 from the upper surface of object 44, while at the same time, solidification substrate 279 is tilted in a first direction (clockwise) about axis 217. In a preferred embodiment, the application of any force by peeling member 292 against the bottom side of solidification substrate 279 is eliminated or minimized, which beneficially prevents cracking, warping, bending or other forms of distortion or damage to solidification substrate 279. As depicted in FIGS. 21-24, the peeling member performs a line peeling operation in which the portion of solidified material being peeled from film 294 defines a generally linear shape (when observed from a top plan view) across the width of part 44 and film 294. As the figures indicate, as peeling member 292 moves along the length of film 294, the previously peeled sections trailing behind peeling member 292 fall into contact with, but preferably do not adhere to, the exposed surface of object 44. In addition, the unpeeled sections in front of peeling member 292 remain unpeeled until the peeling member arrives during a peeling operation. Thus, the peeling operation is localized at any given time in correspondence to the position of peeling member 292 along the length of film 294 and object 44.

Figure 23:
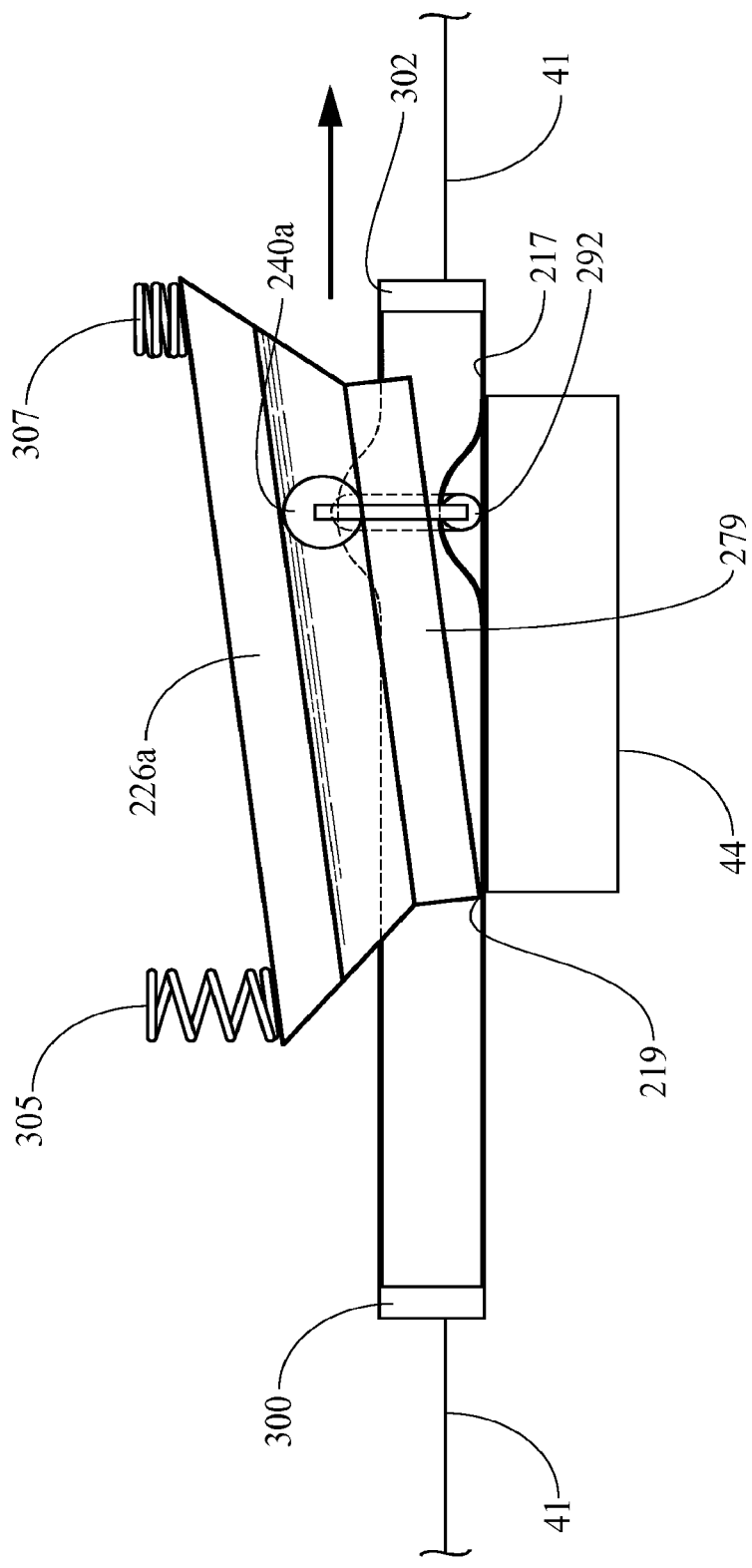
FIG. 23 is a schematic used to depict the operation of the solidification substrate assembly of FIG. 19 in a third configuration.
Figure 24:
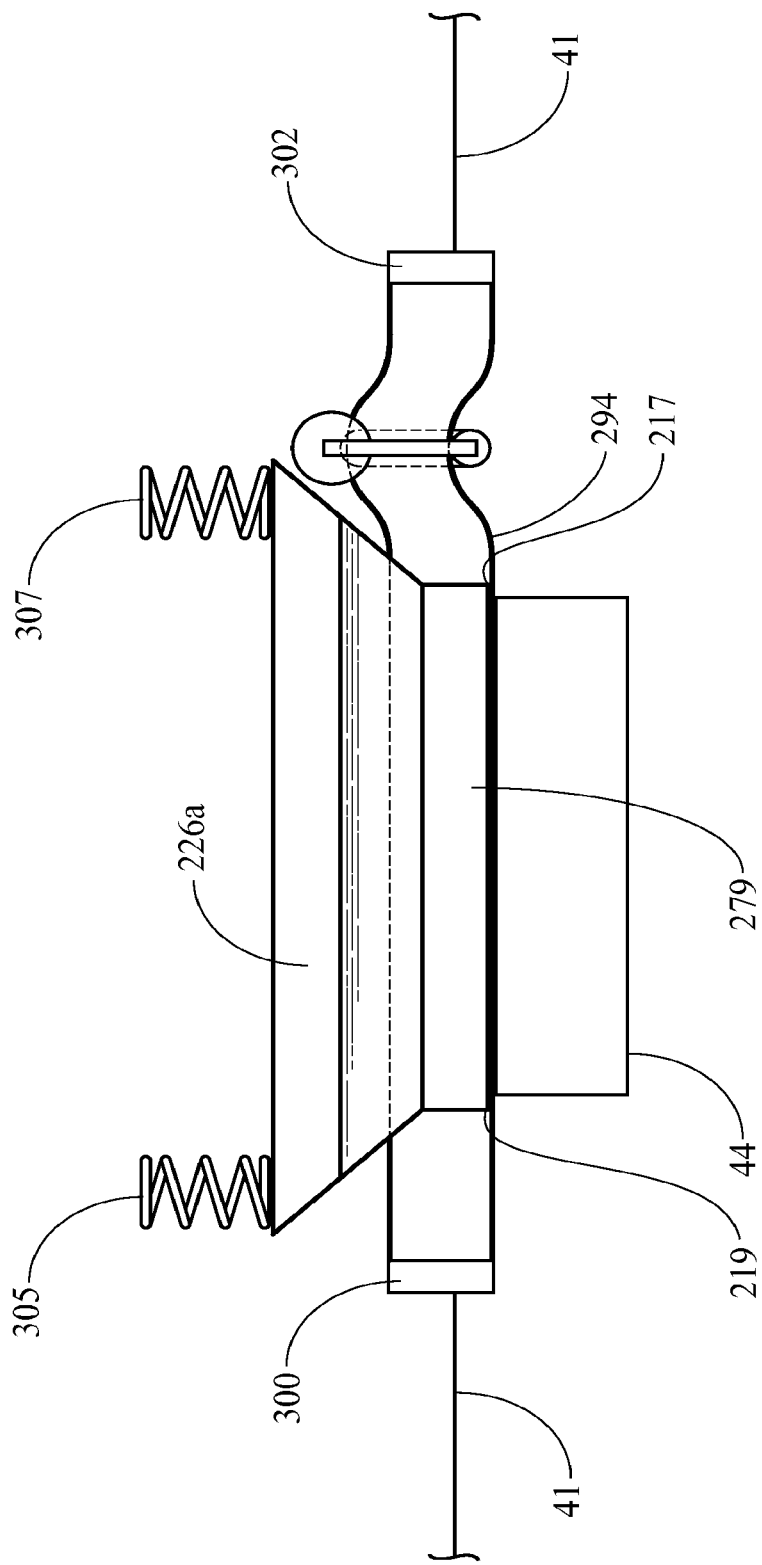
FIG. 24 is a schematic used to depict the operation of the solidification substrate assembly of FIG. 19 in a fourth configuration.

As shown in FIG. 23, as peeling member 292 continues to travel along the length of film 294, solidification substrate 279 eventually tilts in a second direction (counterclockwise) about axis 219 until peeling member 292 reaches its end of travel position shown in FIG. 24. Thus, as peeling member 292 traverses the length of film 294 once, solidification substrate 279 undergoes two tilting operations.

As indicated in FIGS. 21-24, in certain exemplary implementations, a cam and cam follower structure is provided to separate the bottom of solidification substrate 279 from peeling member 292 as peeling member 292 traverses the length of film 294. One specific illustration of such a cam and cam follower structure is depicted in detail in FIGS. 19 and 20a-c. Referring now to these figures, solidification substrate assembly 214 includes at least one cam, which in the embodiment of FIGS. 19 and 20a-c comprises cams 226a and 226b (not shown). Cams 226a and 226b are preferably spaced apart from one another along the width dimension of film 294 and are generally parallel to one another. Cams 226a and 226b are preferably operatively connected to solidification substrate 279 such that movement of the cams 226a, 226b causes a corresponding movement of solidification substrate 279.

Solidification substrate assembly 214 also includes at least one cam follower, which in the embodiment of FIGS. 19 and 20a-c comprises cam followers 240a and 240b (not shown). Cam followers 240a and 240b are each preferably dimensioned to engage a corresponding downward facing cam follower engagement surface formed on their respective cams 226a and 226b. In the embodiment of FIGS. 19 and 20a-c, cam followers 240a and 240b are generally solid cylindrical members configured to rotate about their respective longitudinal axes. As cam followers 240a and 240b abuttingly engage and traverse the lengths of their corresponding cams 226a and 226b, the cams are pulled upward and away from film 294, causing the solidification substrate 279 to be pulled upward therewith.

As best seen in FIGS. 21-24, in certain examples, cams 226a and 226b are biased in a downward direction (toward film 294) at their opposite ends. In one example, springs 305, 307 are provided to facilitate downward biasing. As the cam follower exerts an upward (away from film 294) force, a net moment is created along cams 226a and 226b. The moment varies as peeling member 292 traverses the length of film 294 to produce a variable tilting action of the type depicted in FIGS. 21-24.

In certain embodiments, the vertical distance between the cam followers 240a and 240b and part 44 remains fixed as cam followers 240a and 240b traverse the lengths of their corresponding cams 226a and 226b, thus allowing the cams 226a and 226b to move toward their respective cam followers 240a and 240b and away from film 294 during a film peeling operation. To facilitate this mode of operation, a structure may be provided to fix the vertical position of cam followers 240a and 240b with respect to resin container 100 (see FIG. 8). In the embodiment of FIGS. 19 and 20a-c, a load frame 216 is provided. Cam followers 240a and 240b are connected to load frame 216 and are moveable in a direction along its length (L). Load frame 216 is selectively engageable with a load frame latch 212 which is attached to work table 110, allowing a user to selectively lock load frame 212 into place within opening 101 of work table 110.

A tiltable frame 218 is also provided and is operatively connected to load frame 216 so as to be tiltable with respect to load frame 216. Tiltable frame 218 comprises cams 226a and 226b. The ends of tiltable frame 218 are biased away from the corresponding ends of load frame 216 to provide the variable moment described above as cam followers 240a and 240b traverse corresponding cams 226a and 226b. In one example, one or more compression springs 305, 307 (schematically shown in FIGS. 21-24) are disposed between the corresponding ends of load frame 216 and tiltable frame 218 to provide this biasing function. Although not visible in the figures, stops may be provided to limit the downward travel of tiltable frame 218 with respect to load frame 216. In one example, elongated members, such as screws, extend from the tiltable frame to engage an upward facing surface of the load frame and thereby act as stops.

In certain applications, it is critical to prevent the defocusing of the electromagnetic radiation image generated by pattern generator 108 prior to the exposure of solidifiable material 41 to the image. Defocusing of the image can cause distortions or inaccuracies in the object 44 being built relative to the object model on which it is based. In such applications, the structures through which electromagnetic radiation passes en route from pattern generator 108 to the exposed surface of solidifiable material 41 are preferably substantially planar and parallel to one another and to the image projected by pattern generator 108. In certain embodiments, film 294 is substantially parallel to solidification substrate 279, and both film 294 and solidification substrate 279 are substantially parallel to the build platform 104. In other embodiments, pattern generator 108 directs an electromagnetic radiation image corresponding to a portion of object 44 in a first direction, and the solidification substrate 279 and film 294 are both substantially planar to one another and perpendicular to the first direction. In some embodiments, the level of solidifiable material 41 is maintained above the level of film 294 or above the level of solidification substrate 279 to provide a hydrostatic pressure head that assists in maintaining a parallel orientation between film 294 and solidification substrate 279. In the example of FIGS. 19-20c, film guides 296 and 298 (FIGS. 20b, 20c) also assist in maintaining a substantially flat film 294, thereby reducing the amount of defocusing that would otherwise occur. To further ensure the flatness of film 294, the ends of the film are secured by connectors 300 (FIGS. 20b, 20c) at a vertical position above the solidification substrate 279. Registration members such as registration members 134a and 134b (FIG. 13) may be provided at selected locations around the perimeter of tiltable frame 218 to alter the engagement of tiltable frame 218 with work table 110 such that solidification substrate 279 and film 294 are substantially parallel to build platform 104 and perpendicular to the direction in which pattern generator 108 projects an image to the exposed surface of solidifiable material 41.

As best seen in FIGS. 20a and 20c, in certain embodiments, cam followers 240a and 240b are attached to corresponding support brackets 254a and 254b. Each support bracket 254a and 254b is in turn connected to a corresponding timing belt connector 263a and 263b (FIG. 20a) and to a linear bearing 252a and 252b. Linear bearings 252a and 252b are configured to slidably engage rails 256a and 256b which comprise part of load frame 216. As linear bearings 252a and 252b slidably engage their corresponding rails 256a and 256b, cam followers 240a and 240b engage their corresponding cams 226a and 226b to tilt the tiltable frame 218 and cams 226a/226b with respect to load frame 216 and film 294.

A number of different drive mechanisms may be used to move the cam followers 240a and 240b, including screw/thread drives and belt drives. In the embodiment of FIGS. 19-20a-c, belt drives are used which comprise timing belts 242a and 242b. In certain implementations, belt drives beneficially absorb vibrations from a motor, thereby minimizing or preventing the transmission of such vibrations to the solidifiable material, which can tend to disrupt the uniformity of the objects being built.

Timing belts 242a and 242b are connected to idler pulleys 222a and 222b at one end of load frame 216 and to motor drive shaft 264 at the opposite end of load frame 216. As drive shaft 264 is rotated about its longitudinal axis, timing belts 242a and 242b move along the length of load frame 215, thereby moving the cam followers 240a and 240b, causing them to traverse the lengths of their cams 226a and 226b and tilt tiltable frame 218 in the manner described previously.

In certain embodiments, peeling member 292 is operatively connected to cam followers 240a and 240b such that when cam followers 240a and 240b traverse the lengths of their respective cams 226a and 226b, the peeling member traverses the length of film 294 and peels it from solidified object 44. In one example, as best seen in FIG. 20a, cam follower support brackets 254a and 254b are connected to opposite ends of peeling member 292. In the depicted configuration, peeling member 292 is positioned underneath load frame rails 256a and 256b and underneath cams 226a and 226b. During a peeling operation, as peeling member 292 peels film 294 from object 44 at a given location along the object's length, cam followers 240a and 240b concurrently pull cams 226a and 226b upward and way from peeling member 292, thereby preventing peeling member 292 from applying any appreciable force against solidification substrate 279.

The profile of cams 226a and 226b may comprise a number of different shapes or geometries. In the embodiment of FIGS. 19-24, cams 226a and 226b have a generally linear middle section flanked on either end by sections 280a/280b and 282a/282b (FIGS. 20a, 20b) that slope upwardly and away from film 294. In the illustrated exemplary configuration, the respective surfaces of cam end sections 280a/280b and 282a/282b which face film 294 are concave when viewed from the film 294. As cam followers 240a and 240b begin their travel along cams 226a and 226b, tiltable frame 218 tilts about which ever axis 217, 219 (FIG. 20a) is opposite the starting location of the cam followers 240a and 240b. The degree of tilting diminishes as the cam followers 240a and 240b approach the lengthwise midpoints of their respective cams 226a and 226b. As the cam followers 240a and 240b pass the cam mid-points, tiltable frame 218 and its cams 226 and 226b begin tilting in the opposite direction about the axis proximate the starting point of cam followers 240a and 240b.

In one exemplary embodiment, as depicted in FIGS. 20a and 20b, load frame 216 includes vertically-oriented guides that limit the movement of the tiltable frame 218 in the x-y plane (or the length-wide plane, L×W). A plurality of vertically-oriented guides 310a, 310b, 312a, and 312b are provided and are spaced apart from one another around the perimeter of load frame 216 (Guides 310a and 310b are visible in FIG. 20a, and guides 310b and 312b are visible in FIG. 20b). Guides 310a and 310b are spaced apart from one another across the width (W) direction of film 294 and load frame 216 as are guides 312a and 312b. Guides 310a and 312a are spaced apart from one another across the length direction (L) of film 294 and load frame 216 as are guides 310b and 312b. Each of the four guides engages a corresponding roller (318a, 318b, 320a, and 320b) that is rotatably mounted on tiltable frame 218 (rollers 318a and 318b are visible in FIG. 20a, and rollers 318b and 320b are visible in FIG. 20b). The engagement of vertically-oriented load frame guides 310a, 310b, 312a, and 312b with their corresponding tiltable frame rollers 318a, 318b, 320a, and 320b allows the tiltable frame 218 to move vertically with respect to load frame 216 while simultaneously preventing horizontal movement of tiltable frame 218 with respect to load frame 216.

In certain examples, film 294 is preferably maintained in a substantially planar configuration. To facilitate such a configuration, solidification substrate assembly 214 may be provided with film guides 296 and 298, which comprise elongated members that are spaced apart from one another along the lengthwise direction (L) of film 294 and which each extend along the width-wise direction (W) of film 294.

Tiltable frame 218 may comprise a rigid or semi-rigid translucent layer retaining section 225a (FIG. 20a) and 225b (FIG. 20b) formed proximate cams 226a and 226b. The retaining sections 225a and 225b include corresponding upward facing surfaces 229a and 229b which are in facing opposition to downward facing surfaces 227a (FIG. 20a) and 227b (FIG. 20b) that define the underside profile of cams 226a and 226b. During a film peeling operation, cam followers 240a and 240b ride between their corresponding upward and downward facing surfaces 227a/229a and 227b/229b. Retaining sections 225a and 225b may include grooves, clips, recesses, or other known structures for retaining rigid or semi-rigid translucent layer 279.

A method of using an apparatus for manufacturing a three-dimensional object using the solidification substrate assembly 214 in place of solidification substrate assembly 114 in apparatus 90 (FIG. 8) will now be described. In accordance with the method, apparatus 90 is provided and includes a work table 110 with solidification substrate assembly 214 connected to it as depicted in FIG. 19. Container 100 is filled with a solidifiable material, such as a photocurable polymeric resin with a suitable photoinitiator. Solidification substrate assembly 214 is latched to work table 110 via latch 212. Build platform 104 (FIG. 8) is elevated proximate film 294. Rigid or semi-rigid translucent layer 279 is maintained below the level of solidifiable material 41 in container 100 to maintain a hydrostatic head sufficient to cause solidifiable material 41 to flow in the space between build platform 104 and film 294. Once the material 41 has flowed into the space, rigid or semi-rigid translucent layer 279 maintains a substantially planar exposed surface of solidifiable material 41 immediately beneath and in contact with film 294. Pattern generator 108 then applies electromagnetic energy through rigid or semi-rigid translucent layer and film 294 in accordance with a model of the three-dimensional object that is to be built in the manner described previously. The application of electromagnetic energy solidifies all or a portion of the exposed surface of solidifiable material 41 to one or more depths that may vary with the location on the exposed surface. As a result, certain sections of solidified material are created and may adhere to film 294.

The solidification substrate assembly 214 of FIGS. 19 and 20a-c is illustrated in a simplified schematic form in FIGS. 21-24 to show tilting and peeling operations. As shown in FIG. 21, following an exposure of solidifiable material 41 to solidification energy, cam followers 240a and 240b begin to traverse their respective cams 226a and 226b, causing the peeling member 292 to travel with the cam followers along the length of cams 226a and 226b. As described previously, as the cam followers 240a and 240b traverse the cam lengths one time, tiltable frame 218 tilts in a first direction with respect to axis 217, as well as with respect to the exposed surface of object 44 and a plane parallel to the plane intersecting axes 217 and 219. Once the cam followers 240a and 240b reach a location at or proximate to the mid-point of their respective cams 226a and 226b, the tiltable frame 218 and cams 226a and 226b tilt in the opposite direction about the opposite axis 219, as well as with respect to the exposed surface of object 44 and a plane parallel to the plane intersecting axes 217 and 219. In this manner, film 294 is peeled from part 44 without peeling member 292 applying an appreciable force (or any force) to rigid or semi-rigid translucent panel 279.

Once cam followers 240a and 240b reach the end of one length of travel (i.e., the position of FIG. 24), additional solidifiable material 41 is supplied between the upper surface of object 44 and film 294 (e.g., by lowering build platform 104), and the newly created exposed surface of solidifiable material 41 is exposed to electromagnetic radiation from pattern generator 108. The peeling and tilting operation described above is then repeated, this time with peeling member 292 moving in the opposite direction along the length of film 294. The process of exposing and peeling is repeated until the object build process is complete.

Figure 25:
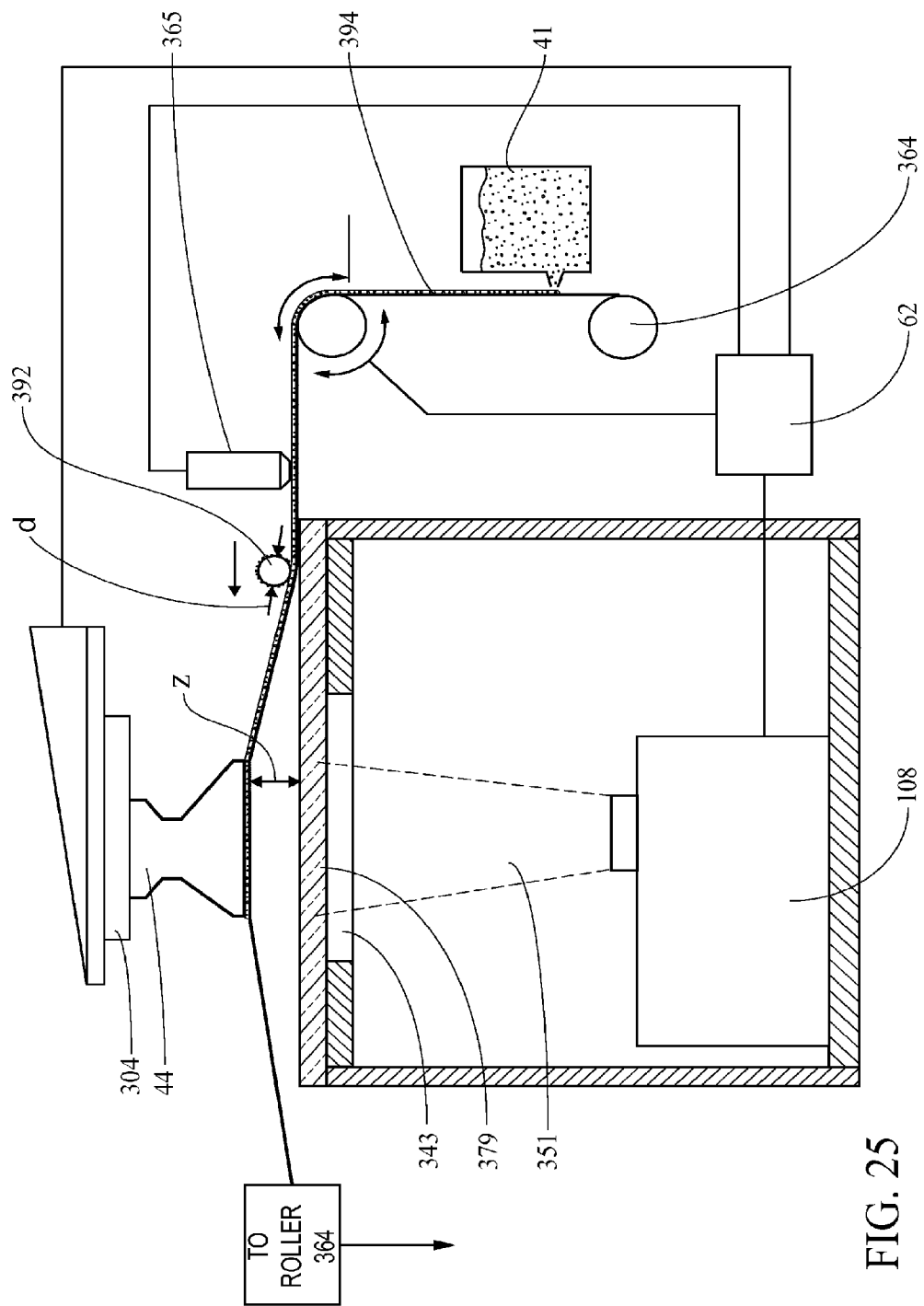
FIG. 25 is a film transfer imaging rapid prototyping system with a film peeling member.

The film peeling techniques described herein are also suitable for use with film transfer imaging rapid prototyping methods. The system depicted in FIG. 25 utilizes a film transfer imaging technique. In accordance with such methods, a movable film 394 is circulated via roller 364 to receive solidifiable material 41. Once the solidifiable material 41 is applied to movable film 394, the coated film 394 is circulated to an applicator 365 for removing excess material 41 and into an exposure zone 343 to receive electromagnetic radiation from pattern generator 108. Pattern generator 108 solidifies at least a portion of the exposed surface of material 41 to one or more depths across the surface in correspondence with a model of the object 44 being built. As with the methods previously described herein, the material 41 solidifies in contact with the movable film 394 during an exposure and must be separated from the film 394 before fresh solidifiable material 41 can be supplied to the film 394 and recirculated to the pattern generator 108. In the exposure zone 393, the film 394 is disposed on a solidification substrate 379 of the type described previously (e.g., a rigid or semi-rigid translucent layer) to provide a substantially parallel exposed surface of solidifiable material 41. In a preferred embodiment, a peeling member 392 is provided which peels the object 44 from the film 394 without applying an appreciable force or any force to the solidification substrate 379. In FIG. 25, peeling member 392 is shown from a side elevational view. In accordance with the embodiment, the build platform 304 is pulled away from solidification substrate 379 by a vertical distance, z, that is greater than the largest vertical dimension (d) of peeling member 392, thereby ensuring that the peeling member 392 can travel between object 44 and solidification substrate 379.

Peeling member 392 is preferably maintained at a vertical height that is slightly above solidification substrate 379 to avoid applying any force to it. Thus, in an example wherein the peeling member 392 is generally cylindrical, build platform 304 is pulled away from solidification substrate 379 by a distance, z, that exceeds the diameter of peeling member 392. A suitable drive mechanism is provided which then moves the peeling member 392 along the length of the film 394 between film 394 and object 44, thereby separating the film 394 and object 44 in a line peeling operation of the type described previously. Once the peeling operation is complete, the build platform 304 is moved vertically downward such that the exposed surface of object 44 is separated from film 394 by a distance equal to the thickness of solidifiable material 41 to be applied to film 394, and the exposure/peeling process is repeated.

Referring to FIG. 26, an alternate embodiment of a solidification substrate assembly 414 is depicted. Unlike solidification substrate assembly 214, assembly 414 does not include frames that are tiltable with respect to one another.

In preferred embodiments, solidification substrate assembly 414 is used in a system for making a three-dimensional object, such as system 90, discussed previously. The components of solidification substrate assembly 414 which are substantially similar to those of solidification substrate assembly 214 are identified with reference numerals that begin with a "4" and which end in the same two digits as their respective counterparts in assembly 214. Solidification substrate assembly 414 comprises a load frame 416 that is connected to a multi-layer assembly 421 (FIGS. 29A-B and 30A-B). Multi-layer assembly 421 comprises a rigid or semi-rigid solidification substrate assembly 501 which is connected to a film assembly 505 (FIGS. 29A-B and 30A-B).

Rigid or semi-rigid solidification substrate assembly 501 includes a rigid or semi-rigid solidification substrate 479, such as a hard plastic or glass of the type described previously with respect to rigid or semi-rigid solidification substrate 279, and a rigid or semi-rigid solidification substrate frame 423. As best seen in FIGS. 29A-B and 30A-B, rigid or semi-rigid solidification substrate frame 423 is a generally rigid and rectangular structure with a first side 426a spaced apart from a second side 426b along the width of frame 423. Side 426a includes elevated end portions 480a and 482a at opposite ends of the length of side 426a. Similarly, side 426b includes elevated end portions 480b and 482b at opposite ends of the length of side 426b. Rigid or semi-rigid solidification substrate 479 is connected to the underside of rigid or semi-rigid solidification substrate frame 423 as best seen in FIGS. 28, 29A-B and 30A-B.

Multilayer assembly 421 also includes a film assembly 505 which comprises an object contacting film assembly 510 (not separately shown), and a loose film 516. Object contacting film assembly 510 comprises an object contacting film 494 and a film frame assembly 514 (not separately shown). Film frame assembly 514 comprises an outer frame 512, and an inner frame 518. Film assembly 505 has first and second sides 508a and 508b which are spaced apart along the width of film assembly 505 (FIG. 26) and first and second ends 504 and 506 which are spaced apart along the length of film assembly 505. When installed in a three-dimensional object manufacturing system such as system 90, film assembly 505 is positioned between build platform 104 and rigid or semi-rigid solidification substrate assembly 501.

Figure 31:
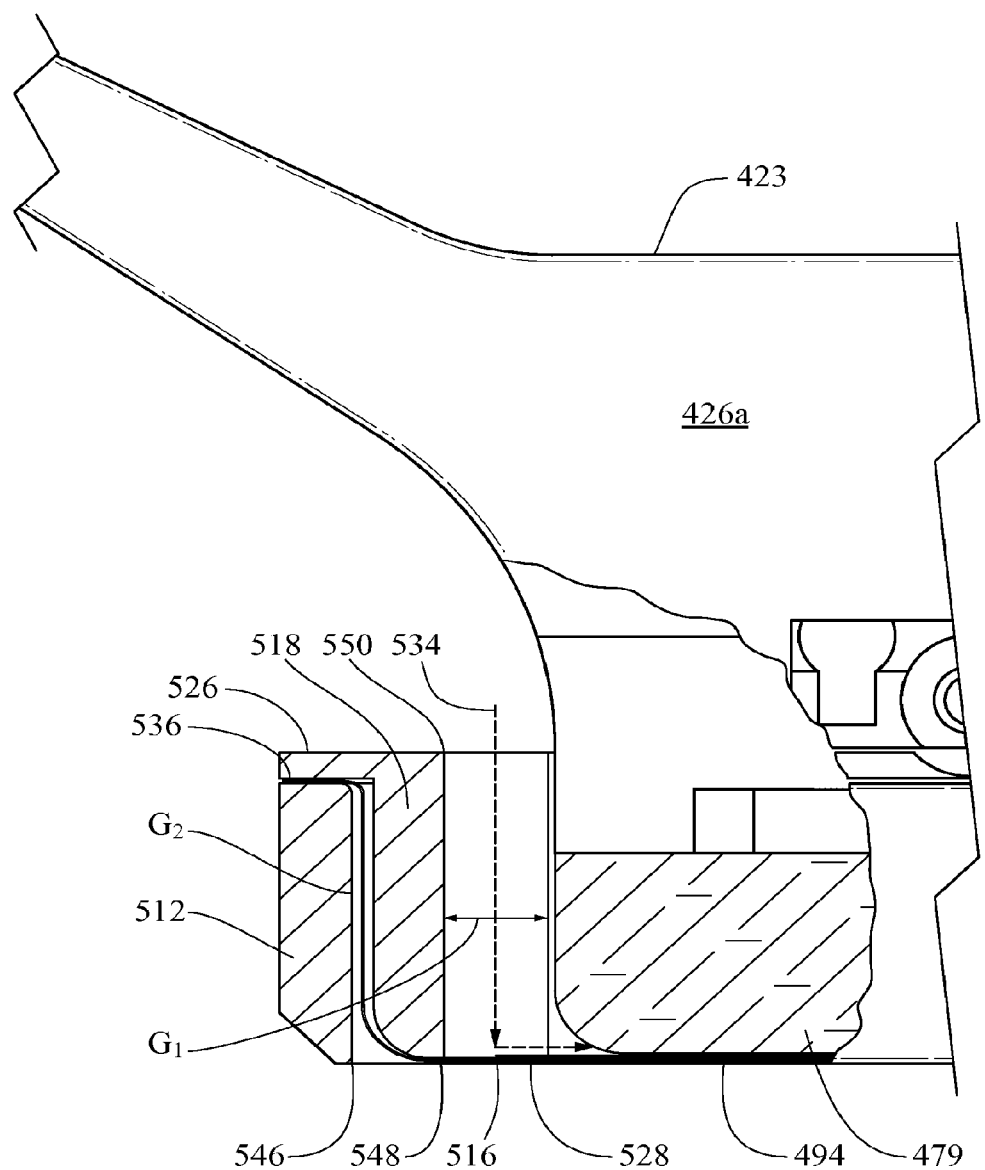
FIG. 31 is a close-up cut-away cross-sectional view of the multi-layer assembly of the solidification substrate assembly of FIG. 26.

Object contacting film 494 is preferably of the same material as film 294, described above. As best seen in FIG. 31, in one example, object contacting film 494 is secured to film frame assembly 514 and is disposed between inner and outer frames 512 and 518. In a more preferred embodiment, object contacting film 494 has an unstretched condition prior to attachment to film frame assembly 514 and a stretched condition when object contacting film 494 is attached to film frame assembly 514. Thus, in certain preferred embodiments, object contacting film 494 and film frame assembly 514 define a pre-stretched film assembly.

During an object building process, solidifiable material will solidify in contact with object contacting film 494. As build platform 104 descends into container 100 and solidifiable material 41, object 44 will tend to pull and stretch object contacting film 494. Because of the repeated stress exerted on object contacting film 494, it is contemplated that object contacting film assembly 510 will be a replaceable component of solidification substrate assembly 414 and of multi-layer assembly 421.

During certain object building operations, especially those involving objects with larger surface areas (e.g., objects with portions comprising substantially flat solid surfaces that are greater than about 1 square inch in area), a vacuum can form between film 494 and rigid or semi-rigid solidification substrate 479, making it difficult to separate object 44 from object contacting film 494. Thus, in certain embodiments a vacuum breaking system is provided. In the embodiment of FIGS. 29A-B and 30A-B, the vacuum breaking system comprises a loose film 516. As best seen in FIG. 31, loose film 516 preferably lay on object contacting film 494 and is sandwiched between object contacting film 494 and rigid or semi-rigid solidification substrate 479 without being fixedly secured to either outer frame 512 or inner frame 518. To facilitate this configuration, loose film 516 preferably has a surface area that is less than the open area of inner frame 518. In certain examples, loose film 516 is a transparent and/or translucent film of the same type used for object contacting film 494.

To facilitate vacuum breaking, in a preferred embodiment, loose film 516 is provided with a relieved area 528 on the surface of loose film 516 which faces away from object contacting film 494 and toward rigid or semi-rigid solidification substrate 479. The relieved area is preferably one or more sections of loose film 516 of reduced thickness. In one preferred embodiment, relieved area 528 comprises a plurality of grooves that are spaced apart along the width of loose film 516. Shapes other than grooves may be used, such as circles, squares, rectangles, and irregular shapes. Where grooves are used, they may extend along the length and/or width of loose film 516 and may be spaced apart at regular or irregular intervals. Relieved area 528 preferably does not create through-openings in loose film 516. As will be explained further below, relieved area 528 preferably provides a leak path for allowing atmospheric air to enter between loose film 516 and rigid or semi-rigid solidification substrate 479, which reduces the likelihood of vacuum formation.

In one exemplary embodiment, relieved area 528 comprises a plurality of spaced apart relieved sections such as grooves extending along the length of loose film 516 and spaced apart from one another by substantially equal spacings. The thickness of loose film 516 in the grooves is preferably from about 25 percent to about 75 percent, more preferably from about 40 percent to about 60 percent, and even more preferably from about 45 percent to about 55 percent of the thickness of loose film 516 in areas away from the grooves. In certain examples, the thickness of loose film 516 away from relieved area 528 ranges from about 20 microns to about 1,000 microns, preferably from about 50 microns to about 500 microns, and more preferably from about 120 microns to about 125 microns. In one illustrative example, loose film 516 has a thickness of from about 120 microns to about 125 microns, and relieved area 528 comprises a plurality of grooves, each of which has a width of from about 40 to about 45 microns and a depth of from about 40 to about 45 microns (as measured from the upper surface of loose film 516 facing rigid or semi-rigid solidification substrate 479).

It is especially preferred to configure relieved area 528 to minimize or eliminate distortion of the image projected by pattern generator 108 as the image is transmitted through loose film 516. In certain examples, relieved area 528 comprises grooves having a width less than the width of a pixel projected by pattern generator 108. The groove width is preferably less than about 80 percent, more preferably less than about 60 percent, and even more preferably less than about 40 percent of the width of pixels projected by pattern generator 108. A variety of known processes may be used to create relieved area 528 in loose film 516. In one example, a plurality of grooves is laser etched into the surface of film 516 facing away from object contacting film 494. In another example, groove widths are provided which are preferably not more than about 150 microns, even more preferably not more than about 100 microns, and still more preferably not more than about 80 microns. In an especially preferred embodiment, groove widths of not more than about 50 microns are provided.

Instead of using a loose film 516, object contacting film 494 may be provided with a relieved area similar to loose film relieved area 528. In addition, instead of providing a relieved area in object contacting film 494 or loose film 516, a relieved area may be provided in the surface of rigid or semi-rigid solidification substrate 479 that faces toward object contacting film 494, and loose film 516 may be omitted. Regardless of how it is provided, a leak path is preferably provided from the atmosphere to the relieved area to minimize the likelihood of vacuum formation, especially if larger object builds are contemplated. One such exemplary leak path 534 is depicted in FIG. 31 and will be discussed in greater detail below.

As best seen in FIGS. 29A-B and 30A-B, in one example, outer frame 512 is a generally rigid and rectangular structure shaped to cooperatively engage inner frame 518. Inner frame 518 is a generally rigid and rectangular structure which includes an upper lip 526 that projects outwardly around the perimeter of inner frame 518. Outer frame 512 fits underneath upper lip 526. In certain examples, the outer edge of lip 526 and the outer perimeter of outer frame 512 are substantially flush with one another and define a substantially continuous surface.

Referring to FIG. 31, outer frame 512 and inner frame 518 are preferably secured to minimize the likelihood of resin leakage through inter-frame gap $G_2$ and the area between lip 526 of inner frame 518 and the upper most surface of outer frame 512. The likelihood of such leakage occurring is particularly acute when build platform 104 is moved toward object contacting film 494 during an object building operation due to the increased pressure applied by solidification material 41 against film assembly 505. Numerous methods of minimizing or eliminating such leakage may be provided. In one example, as shown in FIG. 31, object contacting film 494 is stretched between inner and outer frames 518 and 512, so that a portion of object contacting film 494 is located in gap $G_2$, and so that a peripheral portion 536 of object contacting film 494 is sandwiched between inner frame lip 526 and the upper most surface of outer frame 512. In addition, through-holes 515 (FIG. 29A) formed on the upper surface of upper lip 526 are alignable with complementary holes 513 (FIG. 29A) formed on the upper surface of outer frame 512, allowing fasteners such as screws, bolts, etc. to secure object contacting film frame 512 to inner frame 518. Thus, in certain examples, the fasteners are selected to minimize the amount of leakage in the area between inner frame lip 526 and the upper most surface of outer frame 512. In other examples, portions of gap $G_2$ may be filled with a suitable resin blocking agent such as a cured resin. Suitable cured resins include silicones and epoxies.

Together, object contacting film 494, outer frame 512, and inner frame 518 define an object contacting film assembly 510 (not separately shown) that is securable to rigid or semi-rigid solidification substrate frame 423, with loose film 516 optionally being placed between object contacting film 494 and rigid or semi-rigid solidification substrate 479. As mentioned above, rigid or semi-rigid solidification substrate assembly 501 and film assembly 505 define a multi-layer assembly 421. As also mentioned earlier, in certain embodiments, it is contemplated that object contacting film assembly 510 will be replaced periodically due to the stress on object contacting film 494. Thus, film frame assembly 514 is preferably releasably secured to rigid or semi-rigid solidification substrate frame 423 to facilitate replacement of object contacting film assembly 510.

In certain preferred embodiments, relieved area 528 of loose film 516 lies beneath rigid or semi-rigid solidification substrate 479 while also extending beyond the perimeter of rigid or semi-rigid solidification substrate 479 to provide a leak path to the atmosphere. Film assembly 505 has a length defined by parallel sides 508a and 508b (FIG. 26) which is longer than the length of rigid or semi-rigid solidification substrate 479. As shown in FIG. 31, the variation in lengths creates a gap $G_1$ between the edge of rigid or semi-rigid solidification substrate 479 and the inner surface of inner frame 518. Loose film 516 and a portion of relieved area 528 extend into the gap $G_1$ creating a leak path 534 from the atmosphere to the portion of the relieved area 528 lying underneath and in facing opposition to rigid or semi-rigid solidification substrate 479, thereby minimizing the likelihood of vacuum formation between loose film 516 and rigid or semi-rigid solidification substrate 479. In the embodiment of FIG. 31, gap $G_1$ creates a leak path from the atmosphere to loose film relieved area 528 that is generally in the z-direction (i.e., substantially parallel to the direction of movement of build platform 104 and to the surface area of object contacting film 494). However, other leak path orientations are possible, such as one that is generally in the x-y plane.

In the embodiment of FIGS. 29A-B and 30A-B, rigid or semi-rigid solidification substrate 494 is secured to the underside of frame 423 by mechanical connection, or in one example, adhesive bonding. Rigid or semi-rigid solidification substrate frame 423 may be connected to film assembly 505 by a variety of known structures and connectors. In one example, the upper surface of inner frame 518 is integrally formed with brackets 520a-b and 522a-b (bracket 520b is not shown) which are alignable with rigid or semi-rigid solidification substrate frame through holes 530a-b and 532a-b to allow screws, bolts, etc. to connect rigid or semi-rigid solidification substrate frame 423 and film assembly 505 together, thereby forming multi-layer assembly 421. In the exemplary embodiment of FIG. 31, the upward facing surface of rigid or semi-rigid solidification substrate 479 is beneath the upward facing surface 550 of film assembly 505, and the downward facing surface of rigid or semi-rigid solidification substrate 479 is slightly above the downward facing surfaces 548, 546, respectively, of inner and outer frames 512 and 518.

Figure 27A:
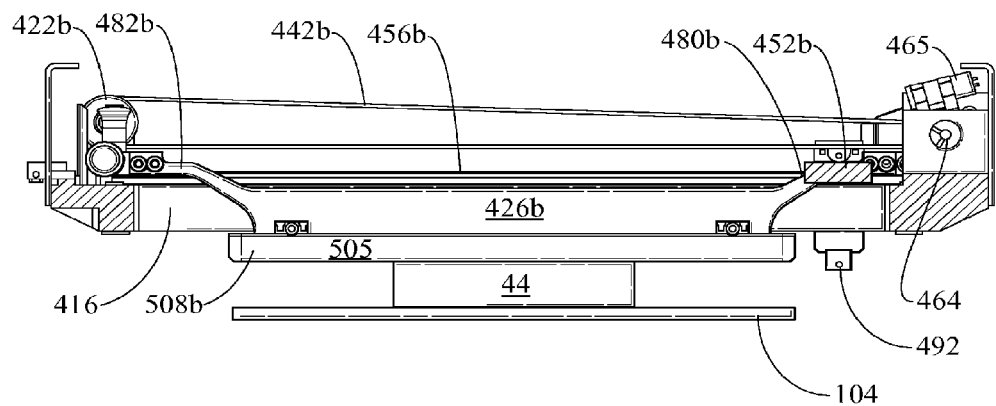
FIG. 27A is a cross-sectional view of the solidification substrate assembly of FIG. 26 taken along the line A-A with the assembly in a first film peeling configuration.
Figure 27B:
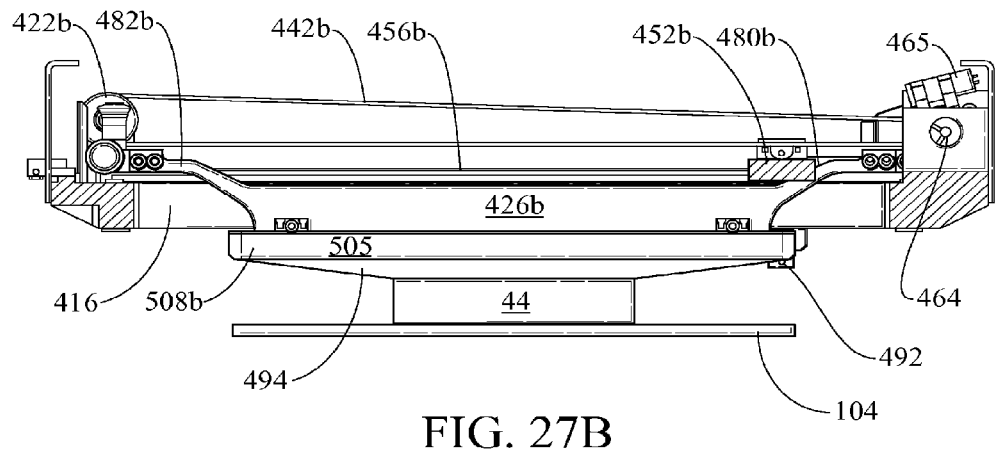
FIG. 27B is a cross-sectional view of the solidification substrate assembly of FIG. 26 taken along the line A-A with the assembly in a second film peeling configuration.
Figure 27C:
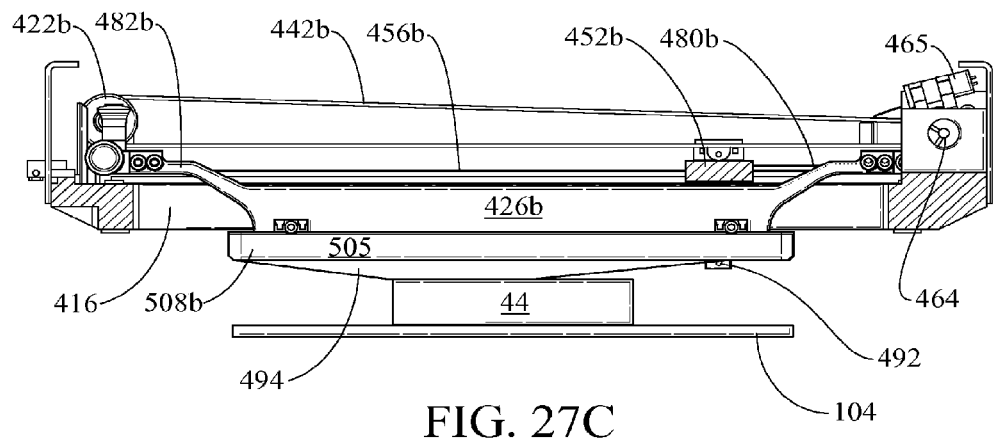
FIG. 27C is a cross-sectional view of the solidification substrate assembly of FIG. 26 taken along the line A-A with the assembly in a third film peeling configuration.
Figure 28:
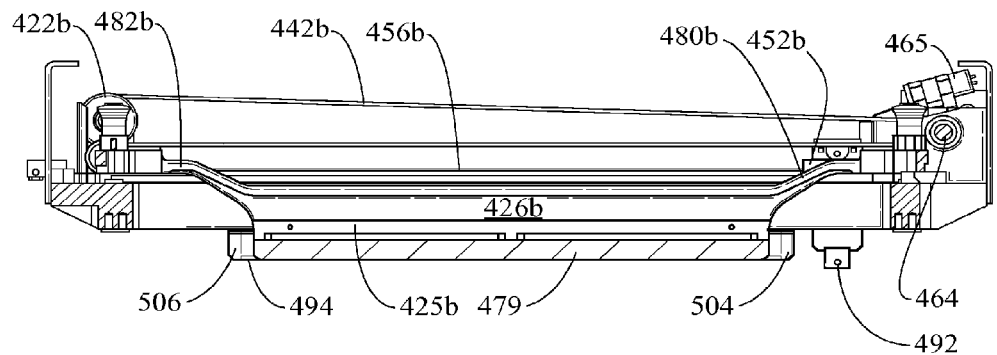
FIG. 28 is across-sectional view of the solidification substrate assembly of FIG. 26 taken along the line B-B.
Figure 29A:
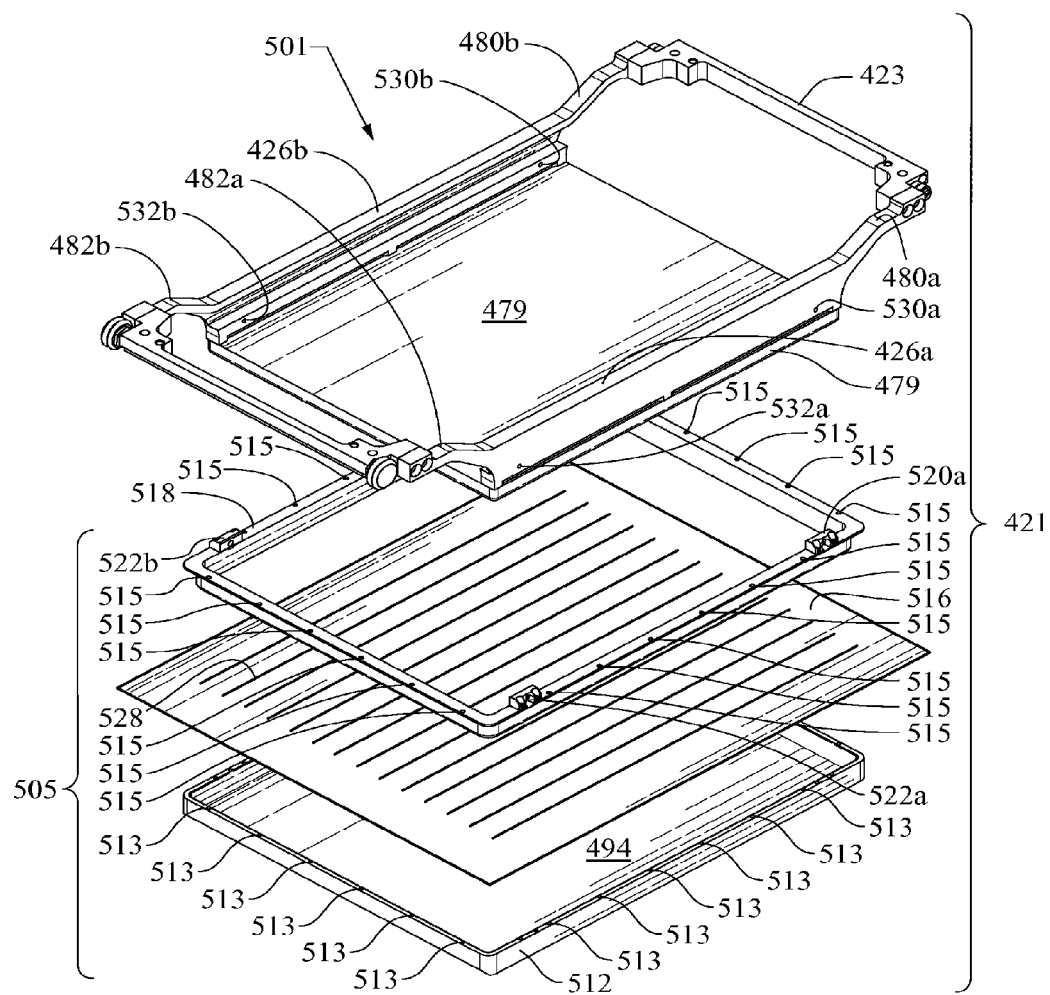
FIG. 29A is an exploded perspective view of the multi-layer assembly of the solidification substrate assembly of FIG. 26.
Figure 29B:
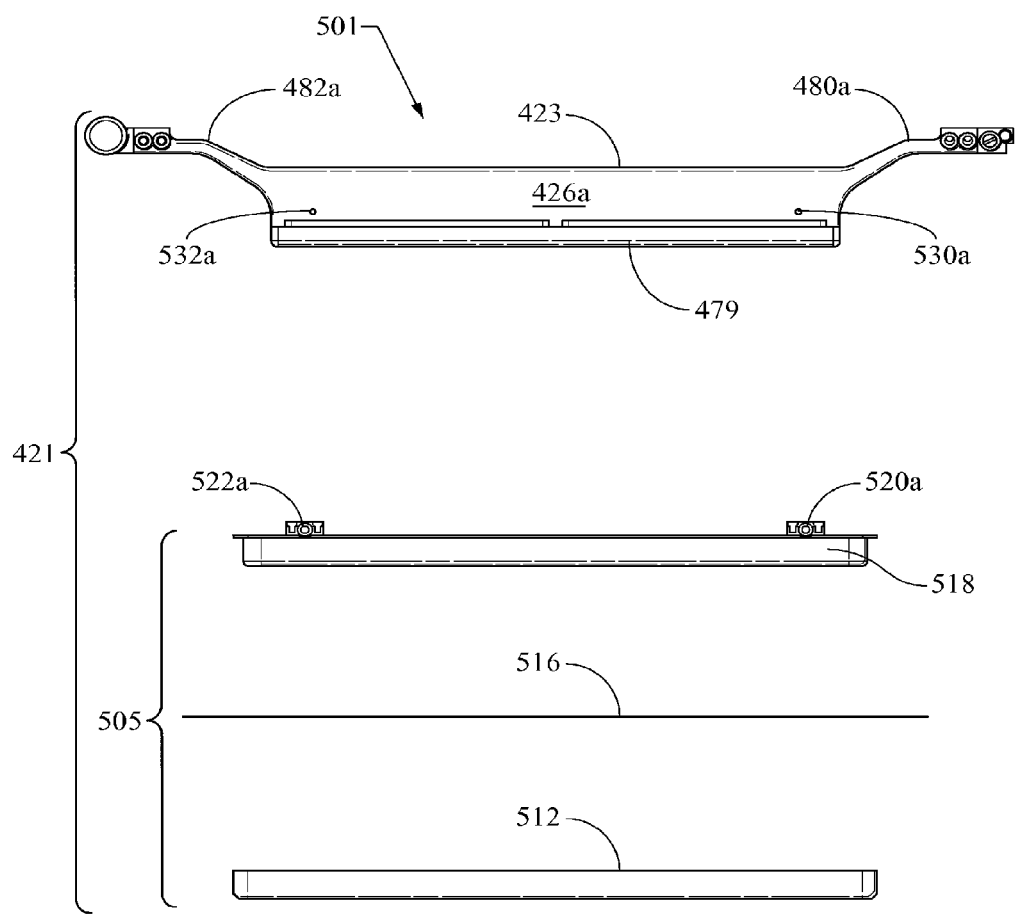
FIG. 29B is an exploded side elevational view of the multi-layer assembly of the solidification substrate assembly of FIG. 26.
Figure 30A:
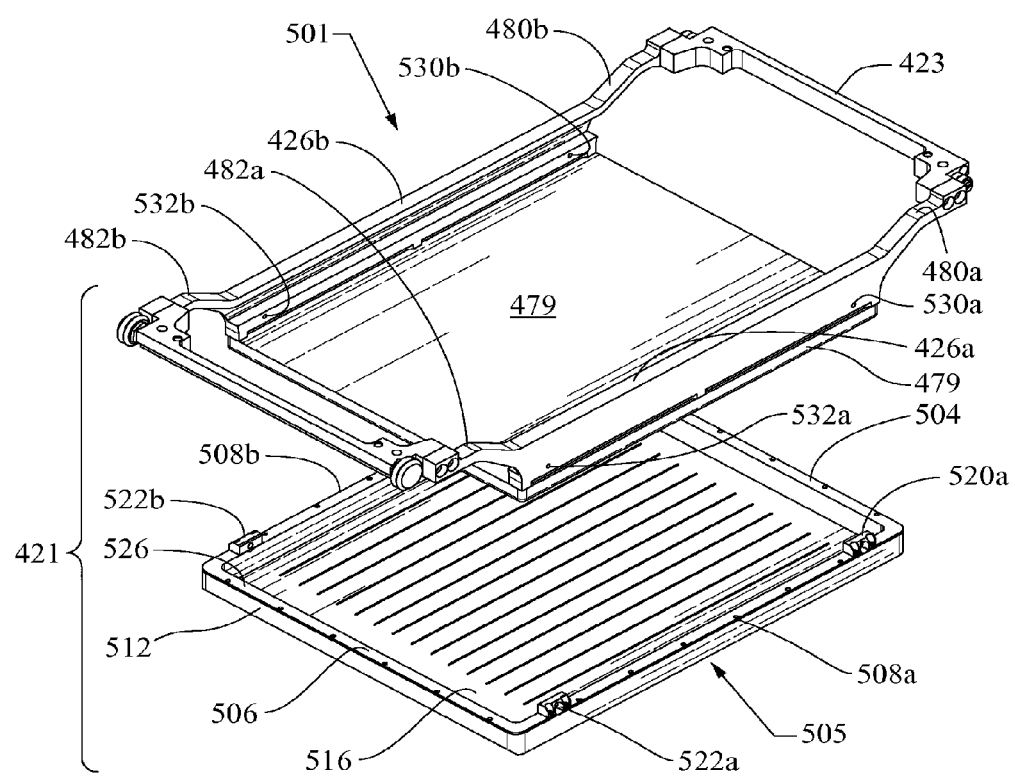
FIG. 30A is an exploded perspective view of the multi-layer assembly of the solidification substrate assembly of FIG. 26, depicted with the film assembly in an assembled configuration.
Figure 30B:
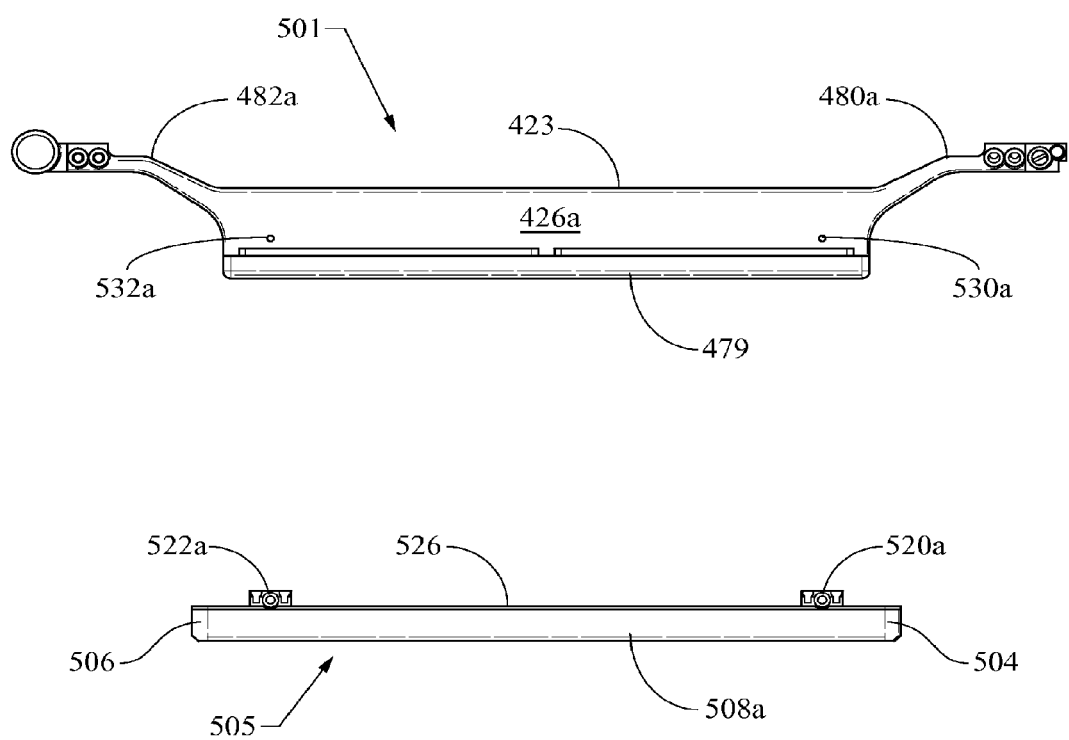
FIG. 30B is an exploded side elevational view of the multi-layer assembly of the solidification substrate assembly of FIG. 26, depicted with the film assembly in an assembled configuration.

In contrast to the previous embodiments of a solidification substrate assembly, multi-layer assembly 421 remains substantially stationary and does not tilt with respect to load frame 416 during an object build process. As best seen in FIGS. 26 and 27A-C, solidification substrate assembly 414 includes a peeling member 492, which is preferably similar or identical to peeling member 292 described previously. During a film peeling operation, peeling member 492 traverses the length of object contacting film 494 to peel film 494 from object 44. An exemplary peeling operation is depicted in FIGS. 27A-C. In certain examples, following an exposure of solidifiable material 41 to solidification energy, object 44 will solidify in contact with film 494. As build platform 104 and object 44 move away from solidification substrate assembly 414, a portion of object contacting film 494 will pull away from film assembly 505 and away from rigid or semi-rigid solidification substrate frame 423. To release object 44 from object contacting film 494, film peeling member 492 will traverse the length of film 494 between object 44 and object contacting film 494 to engage film 494 and separate it from object 44.

Film peeling member 492 starts its peeling motion from an initial position shown in FIG. 27A. As depicted in the figures, in certain preferred examples, the starting position of film peeling member 492 is outboard of film assembly 505 proximate a first end of film frame assembly 505. In FIGS. 27B-C, film peeling member 492 is depicted in second and third positions, respectively, as it continues to peel film 494 from object 44. At the conclusion of peeling, film peeling member 492 will arrive at a rest position outboard of film assembly 505 proximate the end opposite its initial starting position. The rest position will then serve as a starting position for a subsequent peeling operation. Other peeling operations may be used as well. In certain embodiments, it may be advantageous to perform two peeling passes each time peeling is required so that the start position of peeling member 492 remains the same throughout the build process.

To facilitate an effective peeling process, peeling member 492 is preferably fixed at a vertical location that creates a minimum tolerance between film peeling member 492 and the underside of film assembly 505 (i.e., the undersides 546 and 548 of film frames 512 and 518 as shown in FIG. 31) to avoid having the film assembly 505 impede the movement of peeling member 492. In addition, film peeling member 492 is preferably configured to exert no appreciable force against rigid or semi-rigid solidification substrate 479 to avoid cracking or other damage to substrate 479. Thus, the vertical location of peeling member 492 also preferably creates another minimum tolerance between peeling member 492 and rigid or semi-rigid solidification substrate 479.

The components used to move peeling member 492 during a peeling operation are similar to those described with respect to the movement of peeling member 292 in the embodiment of FIGS. 20a-c. However, the cam followers 240a and 240b are not used. Linear bearings 452a and 452b (FIGS. 26, 27A-C, 28) are connected to timing belts 442a and 442b and to a corresponding end of peeling member 492. Linear bearings 452a and 452b slidably engage linear rails 456a and 456b which are connected to load frame 416. Linear rails 456a and 456b extend along the direction of the lengths of films 494 and 516 and are spaced apart from the films in a direction perpendicular to films' upper surfaces.

Timing belts 442a and 442b are connected to idler pulleys 422a and 422b (not shown) at one end of load frame 416 and to motor drive shaft 464 at the opposite end of load frame 416. As drive shaft 464 is rotated about its longitudinal axis, timing belts 442a and 442b move along the length of load frame 416, thereby moving the linear bearings 452a and 452b. Linear bearings 452a and 452b to traverse linear rails 456a and 456b along the direction of the lengths of the rails 456a and 456b and along the direction of the lengths of corresponding sides 426a and 426b of rigid or semi-rigid solidification substrate frame 423, thereby moving peeling member 492 in the manner described previously. Thus, the embodiment of FIGS. 26-31 advantageously provides a mechanism for separating object contacting film 494 from object 44 while keeping solidification substrate assembly 414 substantially stationary with respect to load frame 416 and reducing the likelihood of damage to object 44 due to excessive movement or vibration.

Figure 7:
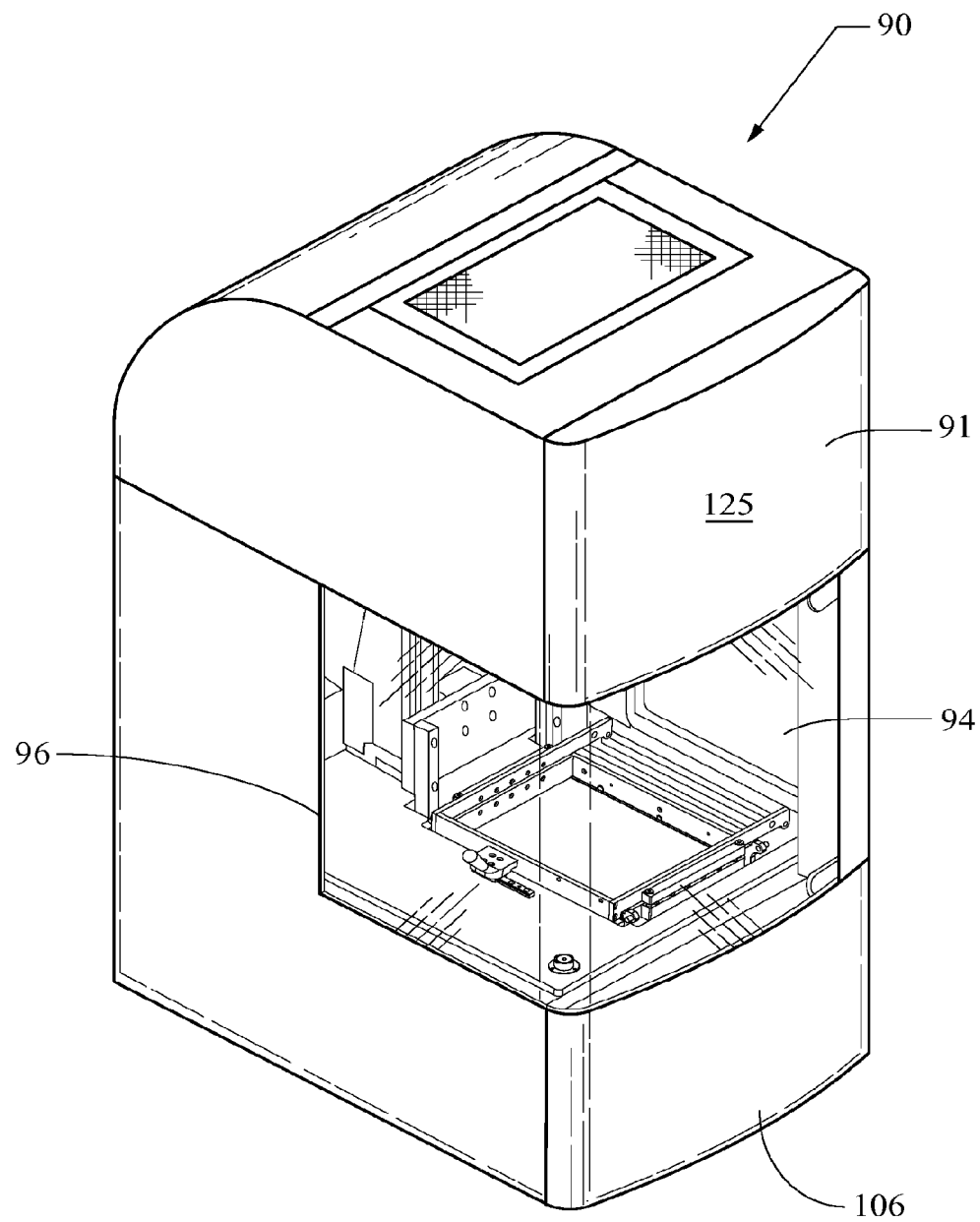
FIG. 7 is a perspective view of a system for making a three-dimensional object from a solidifiable material which includes a bi-directionally tiltable solidification substrate with portions of a load frame depicted in phantom.
Figure 33:
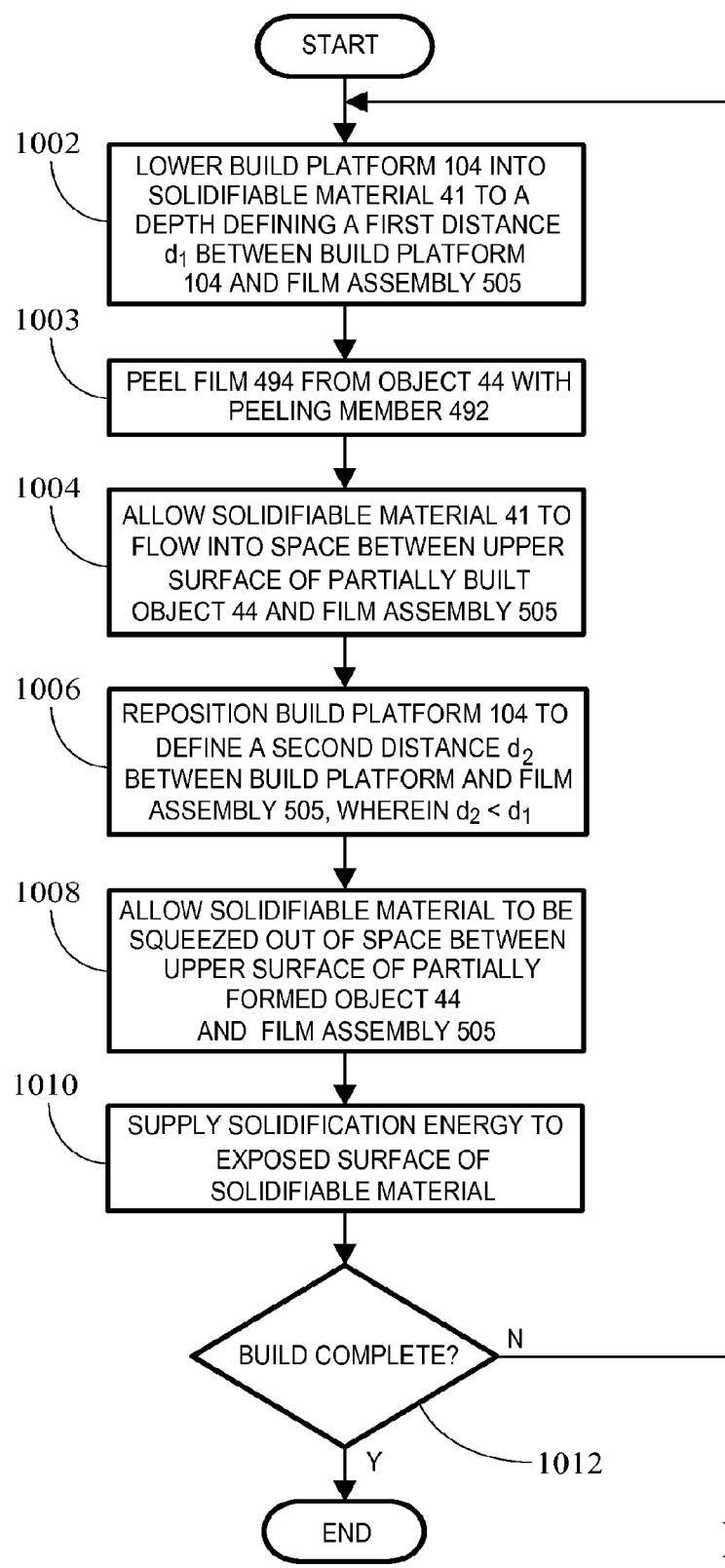
FIG. 33 is a flow chart depicting a method of forming a three-dimensional object using the solidification substrate assembly of FIG. 26.

Referring to FIG. 33, a method of using solidification substrate assembly 414 to perform an object building process will now be described. In accordance with the method, assembly 414 is provided in place of solidification substrate assembly 114 three-dimensional object manufacturing system 90 (FIG. 7). Thus, build platform 104 is provided and moves downward into a solidifiable material container 100 during the build process. In step 1002, build platform 104 is lowered below film assembly 505 and into solidifiable material 41 to define a first distance $d_1$ between film assembly 505 and build platform 104. If an object building process is underway, a partially formed object 44 will be present on the build platform and may have solidified in contact with object contacting film 494 following the previous application of solidification energy by pattern generator 108. To prevent object contacting film 494 from adhering to partially formed object 44, peeling member 492 is activated in step 1003. In step 1004, a selected amount of time will elapse with the build platform 104 at the first distance $d_1$ from film assembly 505, thereby allowing solidifiable material 41 to flow over build platform 104. In step 1006, platform 104 will be re-positioned to define a second, smaller distance $d_2$ between the build platform 104 and film assembly 505. In step 1008, solidifiable material will be squeezed out of the space between the upper surface of the partially formed object 44 and the film assembly 505 as well as between the build platform 104 and the film assembly 505. In certain examples, distance $d_2$ will correspond to a maximum curing depth and/or maximum voxel depth for which the pattern generator 108 is configured. In other examples, between steps 1004 and 1006, build platform 104 will be positioned at its previous position prior to the previous exposure of solidifiable material (e.g., by raising build platform 104 by the distance $d_1$) in order to facilitate squeezing excess resin and/or bubbles out from the space between object 44 and object contacting film 494. The build platform 104 will then be lowered to the distance $d_2$ as provided in step 1006.

After the build platform 104 is at the second distance $d_2$ from film assembly 505 and the volume of solidifiable material between object 44 and film assembly 505 has stabilized, in step 1010 pattern generator 108 will supply solidification energy to the exposed surface of the solidifiable material 41 in accordance with the object 44 being built. The solidification energy will cause the resin to solidify in contact with object contacting film 494, as described above. If the build process is complete, the method terminates (step 1012). Otherwise, the process returns to step 1002 to repeat. To facilitate the "squeezing" of solidifiable material 41 from the space between object 44 and object contacting film 494, build platform 104 may be provided with a plurality of perforations, which provide a flow path in the z-axis direction for solidifiable material 41 displaced from the space between object 44 and object contacting film 494 and solidifiable material 41 that is displaced from the space between build platform 104 and object contacting film 494.

Figure 32A:
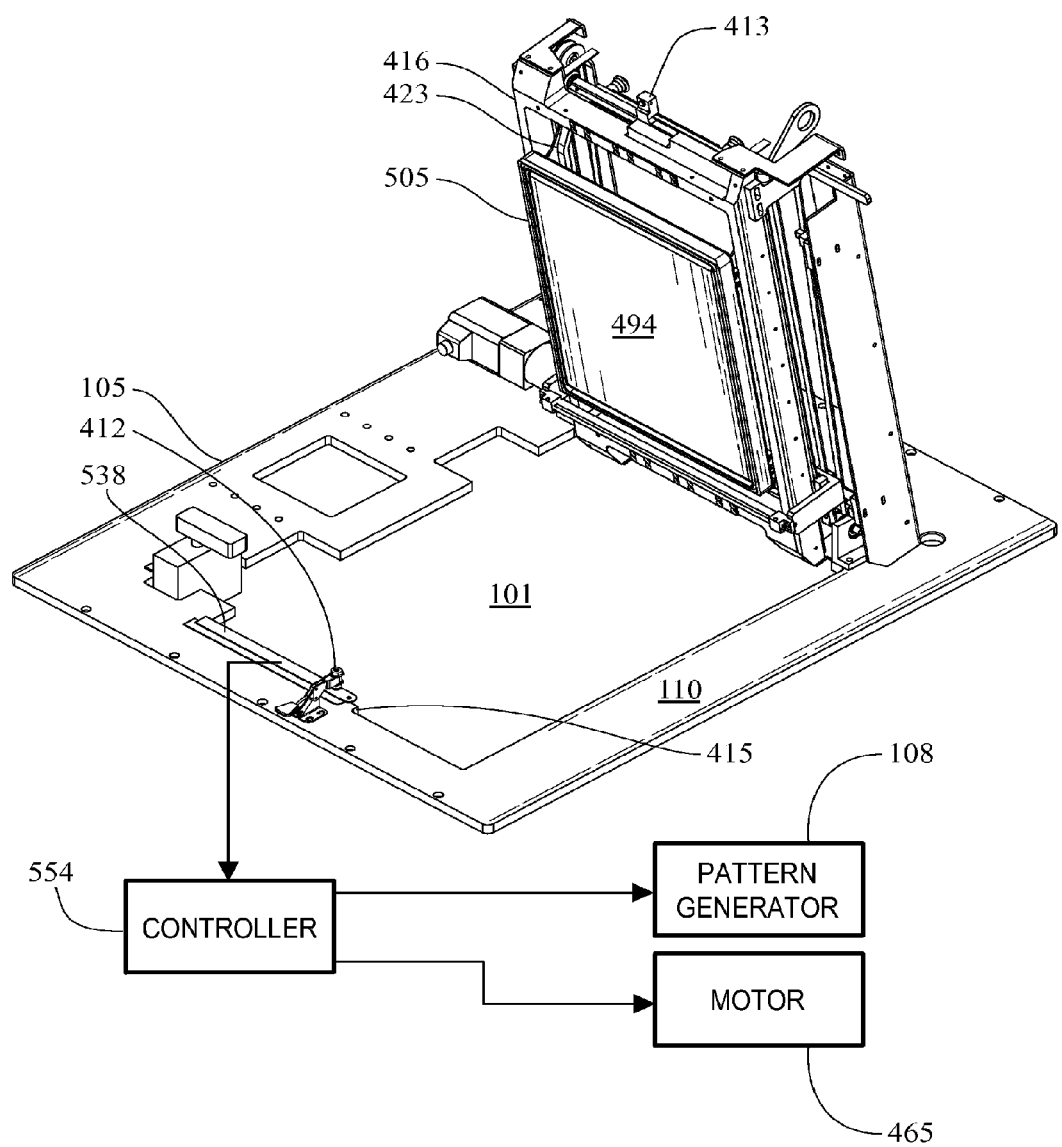
FIG. 32A is a perspective view of an embodiment of a solidification substrate assembly with a force sensor, depicted with the solidification substrate assembly in an open configuration relative to a work table.
Figure 32B:
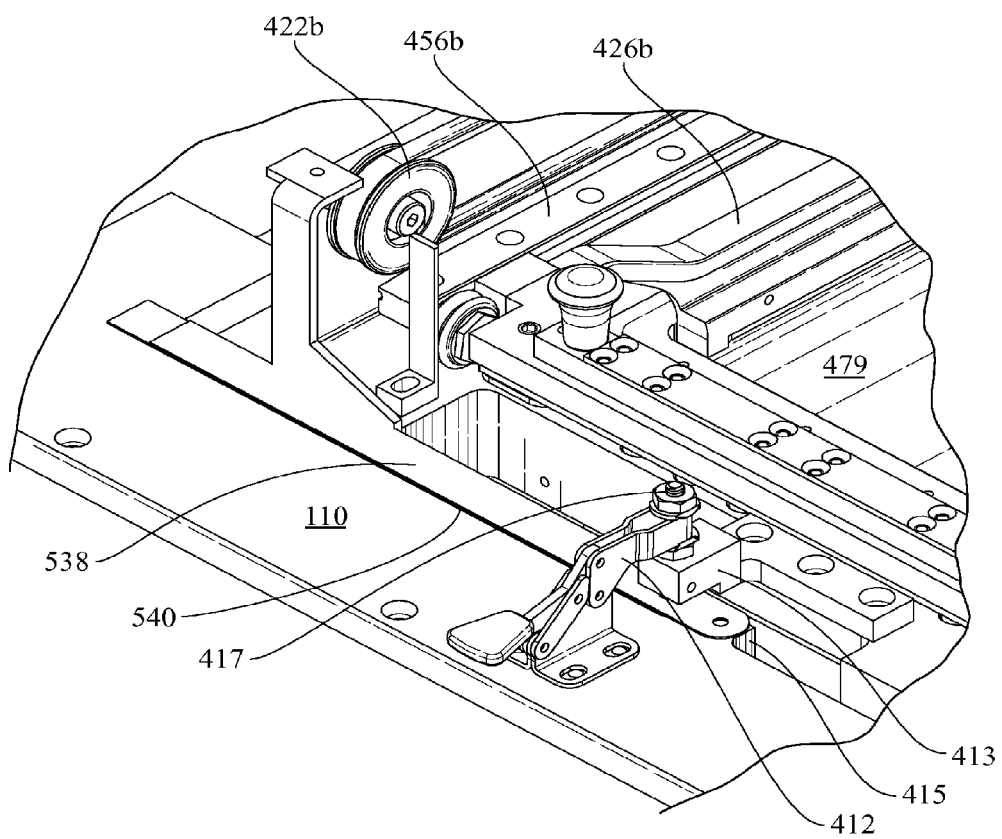
FIG. 32B is a close-up perspective view of the solidification substrate assembly of FIG. 32A showing the force sensor attachment to a work table and the solidification substrate assembly in a closed position relative to the work table.

As indicated by the foregoing, during an object build process, forces are exerted on solidification substrate assembly 414 and object contacting film 494 by both the object 44 and solidifiable material 41. In certain embodiments, it may be advantageous to measure these forces, either for monitoring purposes and/or for control purposes. Thus, in certain embodiments, a sensor is provided which provides sensed information indicative of a force applied to object contacting film 494, such as a force sensor operatively connected to the solidification substrate assembly 414. One such embodiment is depicted in FIGS. 32A-32B. In accordance with the embodiment, a sensor 540 is provided and is configured to sense a force applied to solidification substrate assembly 414. In certain examples, sensor 540 is configured to sense forces in multiple directions, such as in the positive and negative z-axis directions, i.e., along the axis defined by the direction of movement of build platform 104.

In the embodiment of FIGS. 32A-B, sensor 540 is a thin film sensor (not visible in the figures) provided on a lower surface of a protective support 538, such as at thin metal strip, which acts as a protective cover and/or a force transmission member for supporting and transmitting a force from solidification substrate assembly 414 to sensor 540. Protective support 538 is configured to abuttingly engage solidification substrate assembly 414 while preventing or reducing the likelihood of damage to thin film sensor 540. Protective support 538 is attached at both ends to work table 110 and engages a load frame lip 413 proximate one end. Load frame lip 413 is configured overlap a complementary lip 415 formed on work table 410. Work table lip 415 thus supports solidification substrate assembly 414 when the assembly 414 is in a closed position within work table 110.

Flexible sensor 540 is sandwiched between protective support 538 and work table 110. Load frame latch 412 is releasably securable to an upper surface of load frame lip 413 and applies a downward force in the z-axis direction against lip 413 and protective support 538.

During a build process, sensor 540 will sense the amount of force applied to solidification substrate assembly 414, which in turn is indicative of a corresponding force applied to object contacting film 494. For example, when object 44 pulls object contacting film 494 in the negative z-axis direction, load frame lip 413 will apply a force in the negative z-axis direction against protective support 538 and against sensor 540. In certain embodiments, sensor 540 is connected to a controller and provides electrical signals to the controller indicative of a force applied to object contacting film 494 and solidification substrate assembly 414. A variety of sensors constructions may be used, but a preferred sensor 540 is a thin film piezoelectric pressure sensor. As is known to those skilled in the art, the application of pressure to a piezoelectric material generates an electrical signal in correspondence to the pressure applied to the piezoelectric material. Thus, the application of a force to object contacting film 494 results in the transmission of the force to solidification substrate assembly 414, thereby causing load frame lip 413 to apply a force to sensor 540, yielding an electrical signal indicative of the force applied to assembly 414 and to object contacting film 494.

Figure 34:
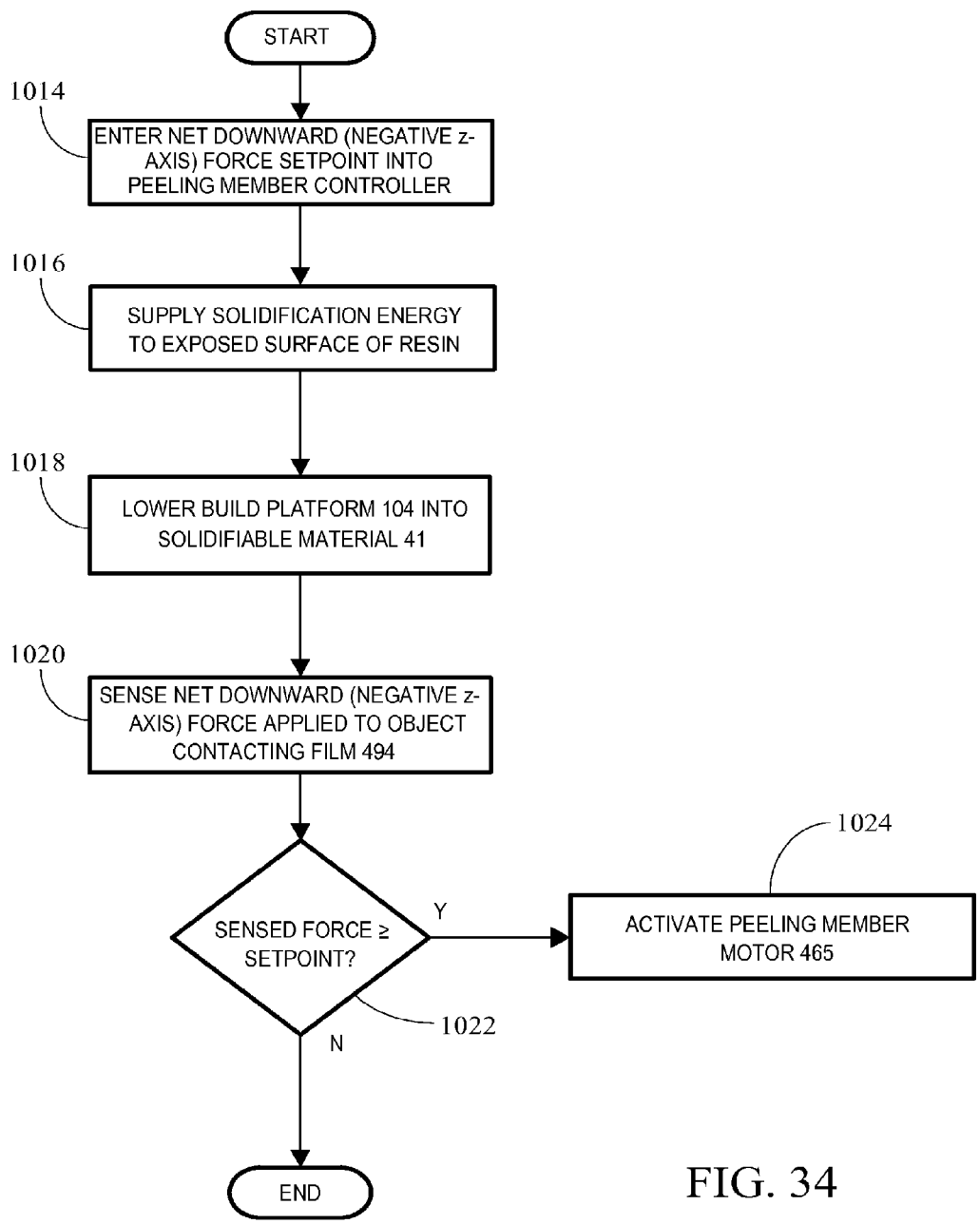
FIG. 34 is a flow chart depicting a method of forming a three-dimensional object using the solidification substrate assembly of FIG. 26 with a force sensor and peeling member controller.

In accordance with one method, sensor 540 is electrically connected to a peeling member controller 554 (FIG. 32A) that operates motor 465 to peel film 494 from object 44 based on the sensed force from sensor 540. As shown in FIG. 34, in accordance with the method, a user specifies a predetermined net negative z-axis force used to dictate when peeling member 492 will be used to peel film 494 from object 44 (step 1014). The predetermined negative z-axis force is then entered as a setpoint into the peeling member controller 554. Following the transmission of solidification energy from pattern generator 108 (step 1016), build platform 104 will move downward into container 100 (step 1018). If film 494 adheres to object 44, sensor 540 will detect a pulling force in the downward (negative) z-axis direction, which is indicative of the force of object 44 exerted against object contacting film 494 (step 1020). If the detected force exceeds the setpoint (step 1022), motor 465 will be activated (step 1024) to initiate peeling. The sensed force thus provides an indication of film adherence to object 44, and the peeling member 492 can be selectively activated only when such adherence is believed to have occurred. In other examples, a build platform controller (not shown) is provided, and the speed at which the build platform moves away from object contacting film 494 is adjusted based on the rate of change of the sensed force signal. In one preferred embodiment, such build platform speed adjustments are made prior to activating motor 465 in step 1024. An intelligent peeling system is thus provided.

As indicated above, load frame latch 412 will generally apply a downward force (negative z-axis) against load frame lip 413, which in turn applies the same force against protective support 538 and sensor 540. Thus, sensor 540 is preferably ranged so that it will detect negative z-axis forces in excess of the baseline force applied by load frame latch 412. In addition, load frame latch 412 is preferably configured to apply an adjustable baseline force against load frame lip 413. In one example, adjustable nut 417 (FIG. 32B) is provided to allow the force to be adjusted. In another example, the baseline force is set to be at or near the mid-point of the range of force sensor 540 to provide for robust bi-directional z-axis force sensing and signaling. In one illustrative application of the method of FIG. 34, sensor 540 is connected to a voltmeter, and adjustable nut 417 is rotated to provide a baseline negative z-axis force that yields a 1.8V baseline force signal. If object contacting film 494 adheres to object 44, during step 1018 (FIG. 34), the negative z-axis force will exceed 1.8V. In step 1014, the user enters a setpoint into peeling member controller 554 which corresponds to a net negative z-axis force signal of 3.0V. As build platform 104 moves in the negative z-axis direction, the rate of change of the measured voltage will be compared to another user entered set-point. If the rate of change set-point is exceeded, the build platform controller will reduce the rate of speed at which the build platform 104 moves in the negative z-axis direction. In certain cases, the adjustment of build platform speed may be sufficient to prevent the negative z-axis force from exceeding the setpoint entered into the peeling member controller in step 1014. In other cases, the adjustment to the build platform speed will be insufficient, and the negative z-axis force will exceed the peeling member controller setpoint (e.g., 3.0V), thus causing the peeling member controller 554 to activate motor 465 and initiate film peeling. In addition, multiple adjustments may be made to the build platform speed, which in some cases may eliminate the need for peeling member 492.

Instead of monitoring the rate of change of the sensed force, an alternative method may be used wherein the user specifies a lower force setpoint (e.g., 2.5 V, as compared to the 3.0V setpoint used to activate peeling member 492), and when the lower setpoint is exceeded, the build platform 104 downward speed is adjusted until a minimum speed is reached. If the higher setpoint is subsequently exceeded, peeling member 492 will be activated.

In accordance with another method, sensor 540 is connected to a pattern generator controller 554 (FIG. 32A) that activates pattern generator 108 to supply solidification energy to solidifiable material 41 based on the sensed force provided by sensor 540. As mentioned previously, in certain embodiments, build platform 104 is lowered to a first distance $d_1$ from film assembly 505 and then raised to define a smaller distance $d_2$ between build platform 104 and film assembly 505. As a result, during the upward movement of build platform 104, a positive (upward) z-axis force is exerted against solidification substrate assembly 414 which offsets the net downward (negative) z-axis force generated by the engagement of load frame latch 412 against load frame lip 413. During this process, solidifiable material 41 is squeezed out from the space between object 44 and film assembly 505 (including through perforations in build platform 104 if they are provided), causing the force sensed by sensor 540 to initially be less than the baseline force (e.g., the force corresponding to 1.8V). As the solidifiable material continues to be displaced, the net negative z-axis force will rise (i.e., the baseline force of load frame lip 413 against protective support 538 and sensor 540 will exceed the upward force of solidifiable material by a progressively greater amount). Once the solidifiable material 41 thickness is stable, the sensed force will again correspond to the baseline force (e.g., 1.8V). At this point, pattern generator 108 supplies solidification energy to solidifiable material 41.

Figure 35:
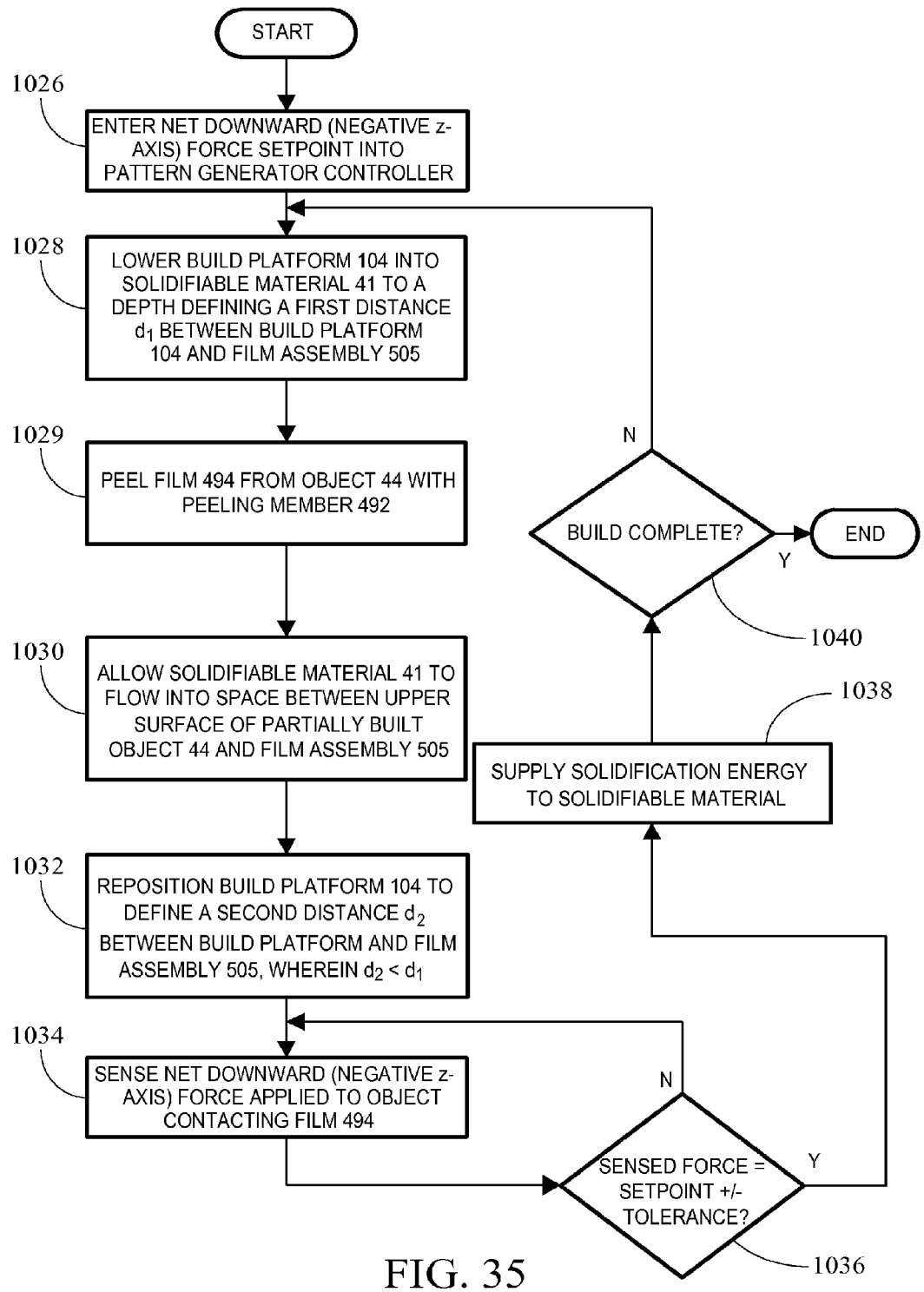
FIG. 35 is a flow chart depicting a method of forming a three-dimensional object using the solidification substrate assembly of FIG. 26 with a force sensor and a pattern generator controller.

As shown in FIG. 35, in accordance with the method, the user supplies a force setpoint to the pattern generator controller (step 1026). In certain examples, the setpoint will correspond to a net negative z-axis force that is less than the baseline force or within a certain tolerance of the baseline force (e.g., 1.8+/−0.1 V). In step 1028, building platform 104 is lowered to a depth defining a first distance $d_1$ between build platform 104 and film assembly 505. In step 1029, peeling member 492 peels film 494 from object 44. Alternatively, the method of FIG. 34 may be used to activate the peeling member 492 in step 1029 based upon the detection of a downward (negative z-axis) force against film 494 that is indicative of the object contacting film 494 adhering to object 44.

In step 1030, solidifiable material 41 is allowed to flow into the space between the upper surface of object 44 and film assembly 505. Build platform 104 is then elevated to define a distance $d_2$ that is smaller than $d_1$ between the build platform 104 and film assembly 505. As mentioned previously, the distance $d_2$ is preferably the maximum curing and/or voxel depth supplied by pattern generator 108. The elevation of build platform 104 will cause solidifiable material 41 to exert an upwardly directed force against film assembly 505 which will offset the downward force applied by load frame lip 413. The upwardly directed force will reach a maximum and then progressively diminish as solidifiable material 41 is squeezed out of the space between object 44 and film assembly 505 and between build platform 104 and film assembly 505. In step 1034, the upward force against film assembly 505 is sensed, and when the upward force reaches the set point (or is within a specified tolerance thereof) (step 1036), pattern generator 108 supplies solidification energy to solidifiable material 41 (1038). If the build process is not yet complete (step 1040), the method returns to step 1028 and is repeated. The method of FIG. 35 may also be modified so that between steps 1030 and 1032, build platform 104 is raised by the distance $d_1$ to accelerate the displacement of solidifiable material 41 from between object 44 and film assembly 505. In step 1032, build platform 104 would then be lowered to reach the distance $d_2$ from film assembly 505. In addition, a build platform speed controller may be provided and may adjust the speed of movement of the build platform 104 in the upward (positive z-axis) direction based on the rate of change of the upward force applied by solidifiable material 41 against film assembly 505. Alternatively, a lower setpoint (e.g., 1.3 V as compared to the 1.8V+/−0.1 V used to activate pattern generator 108) may be used to adjust the speed of build platform 104 by lowering the rate at which it is elevated toward film assembly 505. Then, once the build platform 104 reaches the distance $d_2$ from film assembly 505, the pattern generator controller will cause pattern generator 108 to supply solidification energy to solidifiable material 41 once the net negative z-axis force reaches the user entered setpoint entered in step 1026.

In the method of FIG. 35, the sensed force provides an indication of the upward force exerted by solidifiable material 41 against object contacting film 494 and indicates when the solidifiable material 41 has reached a stable thickness. The pattern generator controller 554 allows the supply of solidification energy to be timed with the attainment of the stable thickness, thereby increasing the accuracy of built objects. An intelligent solidification energy system is thus provided.

In an especially preferred embodiment, sensor 540 is bi-directional and configured to sense forces in the positive and negative z-axis directions. In accordance with the embodiment, the sensor signal is provided to at least one controller configured to provide peeling member control and exposure control, as described above. Individual controllers may be provided, or a combined controller (such as controller 554 of FIG. 32A) for both peeling member control and pattern generator control may be provided.

Referring to FIGS. 36-43, an alternative embodiment of a solidification substrate assembly 614 is depicted. In preferred embodiments, solidification substrate assembly 614 is used in a system for making a three-dimensional object such as system 90 (FIG. 7), discussed previously. The components of solidification substrate assembly 614 which are substantially similar to those of solidification substrate assembly 214 or 514 are identified with reference numerals that begin with a "6" and which end in the same two digits as their respective counterparts in assemblies 214 or 514.

Unlike the previous embodiments, solidification substrate assembly 614 includes a moveable exposed area of solidifiable material 41 which is a sub-area of the total surface area of a solidifiable material which may be exposed to solidification energy. Thus, in certain embodiments, the area of solidifiable material that is subjected to solidification energy is less than the total area upon which solidification energy is projected. In certain examples, a rigid or semi-rigid solidification substrate is provided which is movable in the length and/or width directions of the assembly 614.

Solidification substrate assembly 614 includes a frame 616 and a multi-layer assembly 621 (not separately shown). Multi-layer assembly 621 comprises a rigid or semi-rigid solidification substrate assembly 601 (FIG. 41) which is connected to a film assembly 605 (not separately shown). Rigid or semi-rigid solidification substrate assembly 601 includes rigid or semi-rigid solidification substrate 679, which is preferably translucent and/or transparent, and a pair of brackets 710a and 710b, which are spaced apart from one another and respectively attached to opposite ends of rigid or semi-rigid solidification substrate 679.

Figure 43:
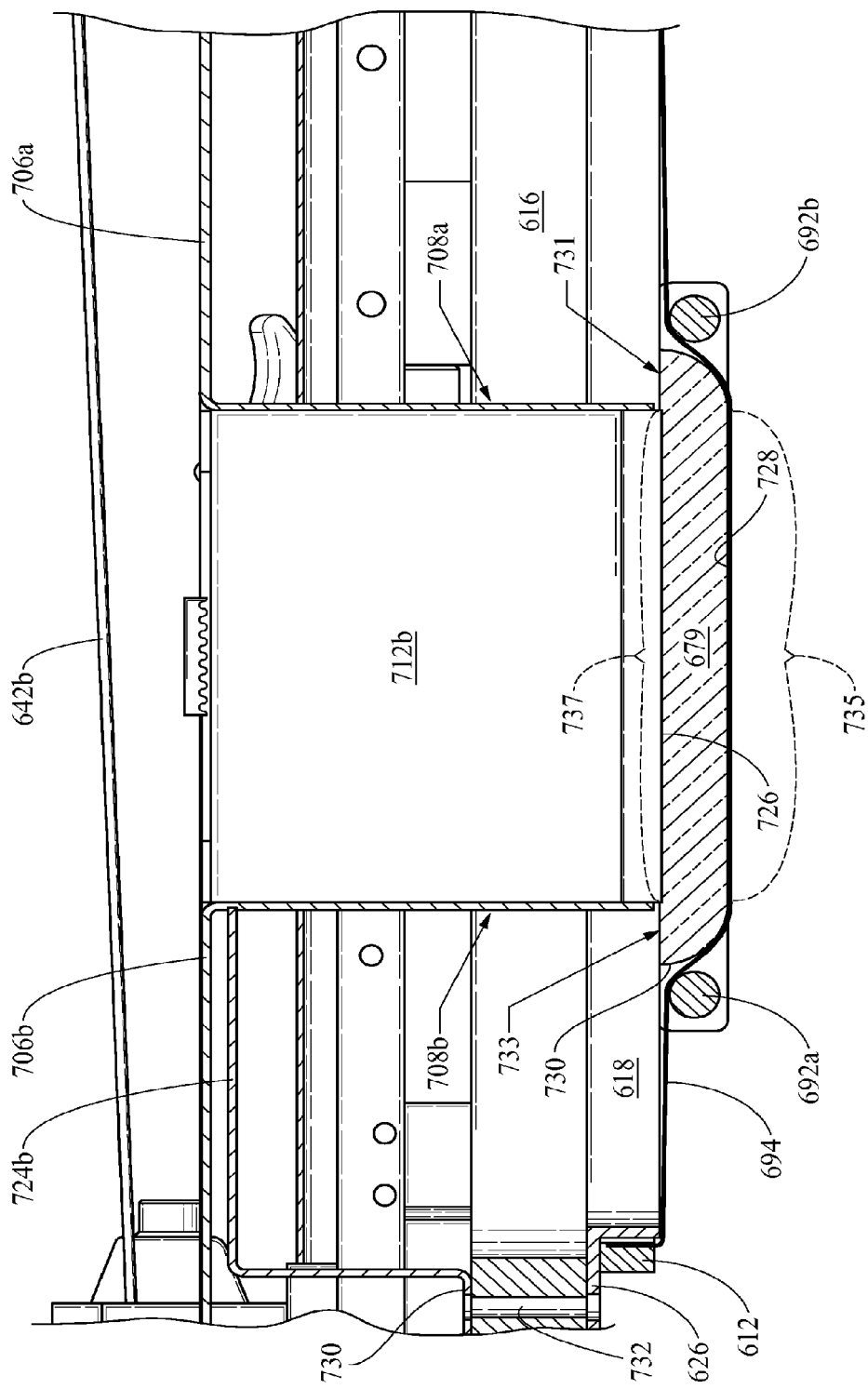
FIG. 43 is a side elevational, cross-sectional view of the solidification substrate assembly of FIG. 36 taking along line A-A.

Film assembly 605 includes a film frame assembly 613 (not separately shown) and an object contacting film 694 (FIG. 43). Film frame assembly 613 includes an inner frame 618 and an outer frame 612 (FIG. 43) configured in the same manner as frames 518 and 512 in FIGS. 29B, and 30 A-B. Unlike film assembly 505, film assembly 605 does not include a loose film. While a loose film may be provided, in certain embodiments one is not required because the movement of rigid or semi-rigid solidification substrate 679 prevents the formation of a vacuum that would otherwise cause film 694 to adhere to substrate 679. Object contacting film 694 is preferably of the type described previously with respect to object contacting film 494. Object contacting film 694 is connected to inner frame 618 and outer frame 612 in the same manner as object contacting film 494 is connected to inner frame 518 and outer frame 512 in the embodiment of FIGS. 26-31. Frames 612 and 618 are substantially identical to and connected to one another in the same manner as frames 512 and 518. Object contacting film 694 has an unstretched condition prior to attachment to film frame assembly 613 and a stretched condition when object contacting film is connected to film frame assembly 613. Thus, in certain embodiments, object contacting film 694 and film frame assembly 613 comprises a pre-stretched film assembly.

During an object building process, solidifiable material 41 will solidify in contact with object contacting film 694. As build platform 104 descends into container 100 and solidifiable material 41, object 44 will tend to pull and stretch object contacting film 694. Because of the repeated stress exerted on object contacting film 694, it is contemplated that film assembly 610 will be a replaceable component.

Rigid or semi-rigid solidification substrate 679 has a surface area that is less than the total area of object contacting film 694 and less than the total area of solidifiable material that may receive solidification energy from a source of solidification energy, such as an imager. Unlike previous embodiments, the total exposable area of solidifiable material 41 is not simultaneously exposed to solidification energy during a given exposure. Instead, a sub-area comprising less than the total exposable area is first supplied with solidification energy. The sub-area is substantially equal to the surface area of rigid or semi-rigid solidification substrate 679. The sub-area is moved between different positions relative to the total exposable area of solidification material 41 and relative to frame 616, and solidification energy is supplied to the sub-area while the sub-area is at the different positions. Thus, solidification energy is exclusively supplied to multiple selected locations in the L×W plane defined by the length and width of solidification substrate assembly 614.

Solidification substrate assembly 614 includes timing belts 642a and 642b which are used to move rigid or semi-rigid solidification substrate assembly 601 from a first position to a second position with respect to frame 616 and the total exposable area of solidifiable material 41. Timing belts 642a and 642b are connected to respective pulleys 622a and 622b at one end and to a motor drive shaft 664 at another end. Motor 665 is provided to move timing belts 642a and 642b.

Figure 37:
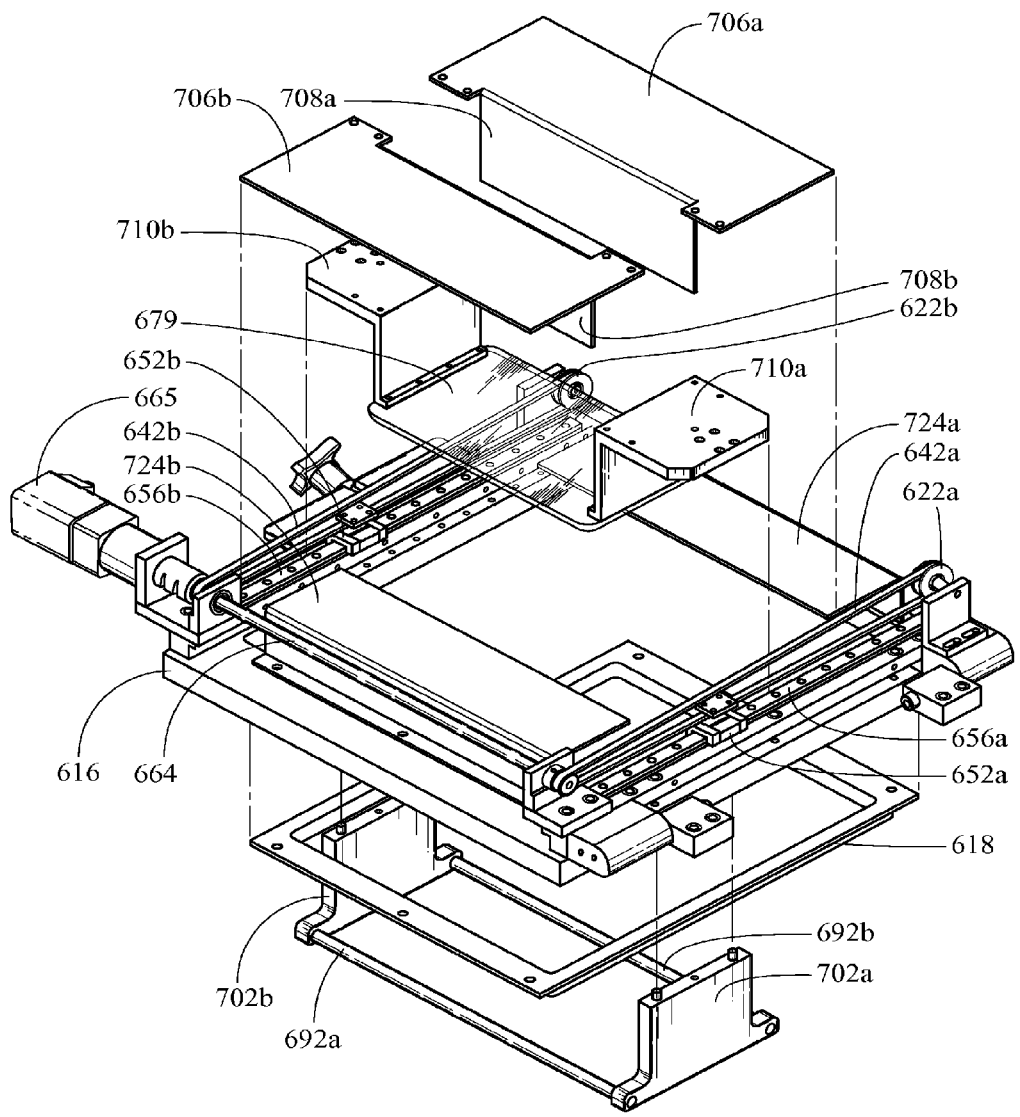
FIG. 37 is an exploded view of the solidification substrate assembly of FIG. 36.
Figure 41:
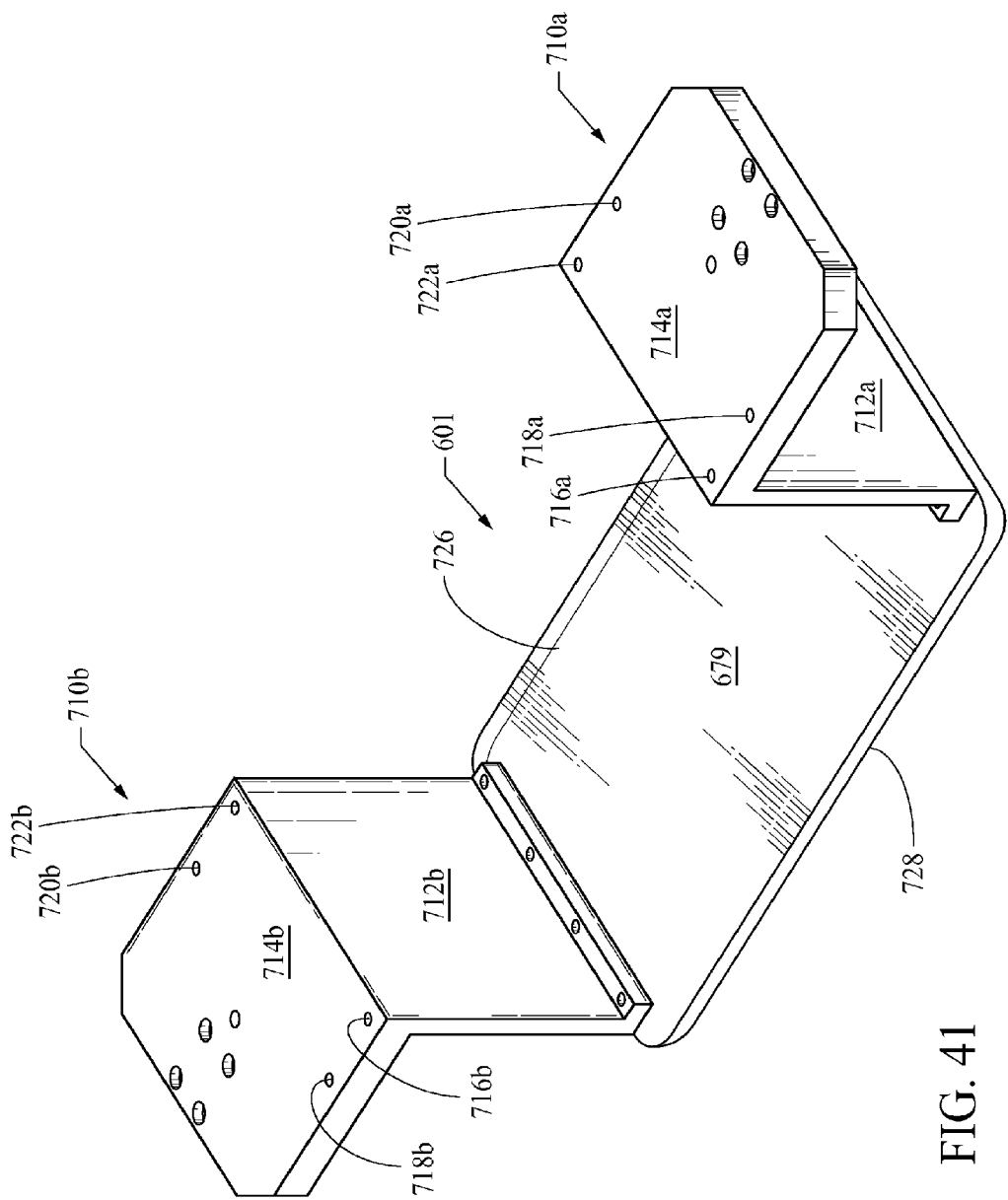
FIG. 41 is a perspective view of a rigid or semi-rigid transparent solidification substrate with attachment brackets.

Referring to FIGS. 37 and 41, rigid or semi-rigid solidification substrate assembly 601 includes a pair of brackets 710a and 710b. Each bracket 710a and 710b includes a respective vertical panel, 712a and 712b, and a respective horizontal panel 714a and 714b (FIG. 41). Vertical panels 712a and 712b are each connected to a respective end of rigid or semi-rigid transparent solidification substrate 679 and to a respective horizontal panel 714a and 714b. Vertical panels 712a and 712b may be separately formed and then connected to their respective horizontal panels 714a and 714b or may be formed integrally therewith.

Rigid or semi-rigid solidification substrate 679 is preferably constructed of glass or hard plastic. In one example, substrate 679 is constructed of a rigid or semi-rigid transparent acrylic polymer.

Figure 36:
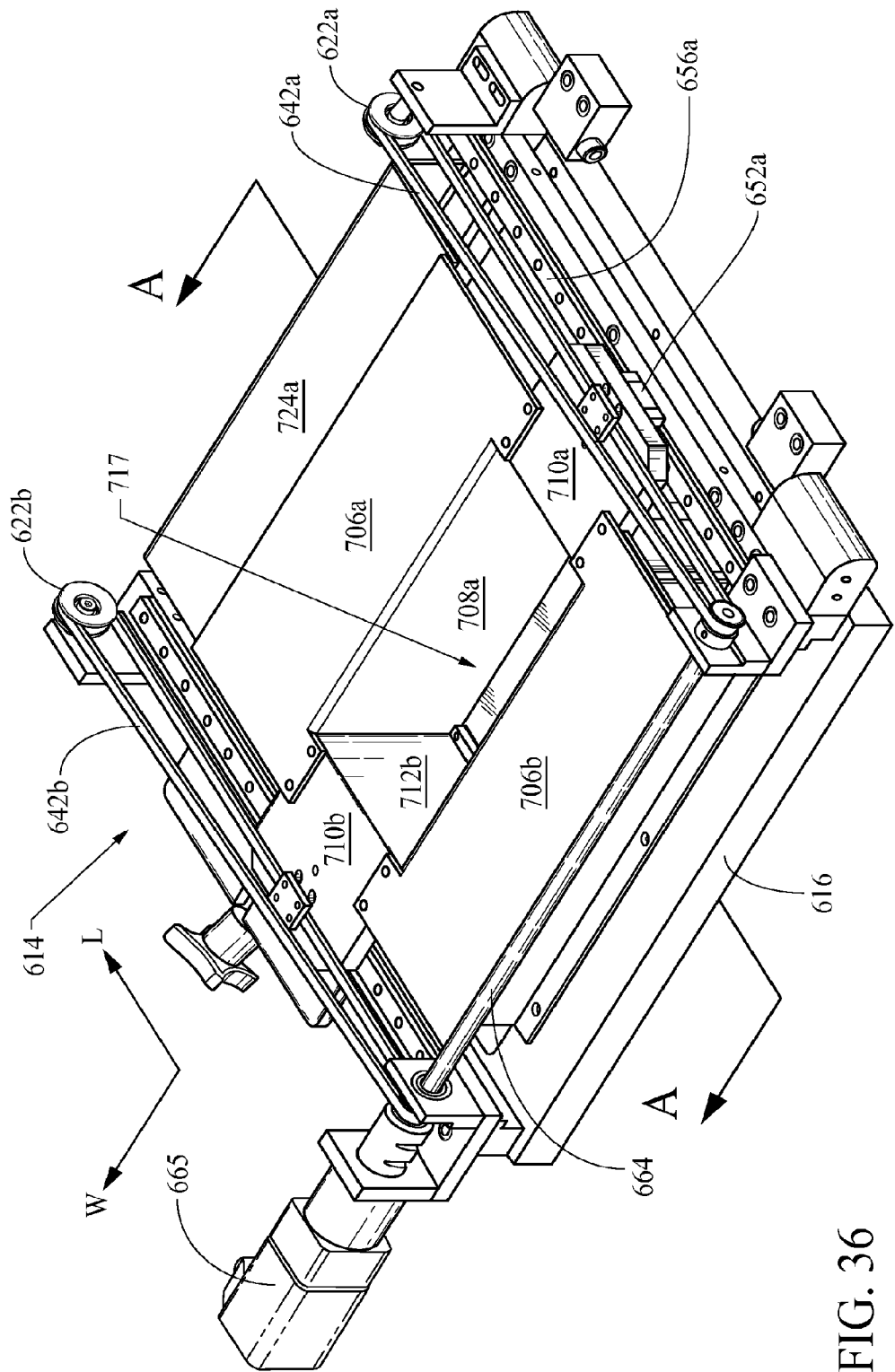
FIG. 36 is a perspective view of a third alternative embodiment of a solidification substrate assembly.

As best seen in FIGS. 36 and 37, brackets 710a and 710b are connected to their respective timing belts 642a and 642b on an upper surface and to respective linear bearings 652a and 652b on a lower surface. Linear bearings 652a and 652b slidingly engage corresponding linear rails 656a and 656b to facilitate the sliding movement of rigid or semi-rigid solidification substrate assembly 601 along the length L of solidification substrate assembly 614. Thus, as motor 665 operates, each bracket 710a and 710b slides along its respective linear rail 656a and 656b causing rigid or semi-rigid solidification substrate 679 to move along the length L of solidification substrate assembly 614.

Figure 38:
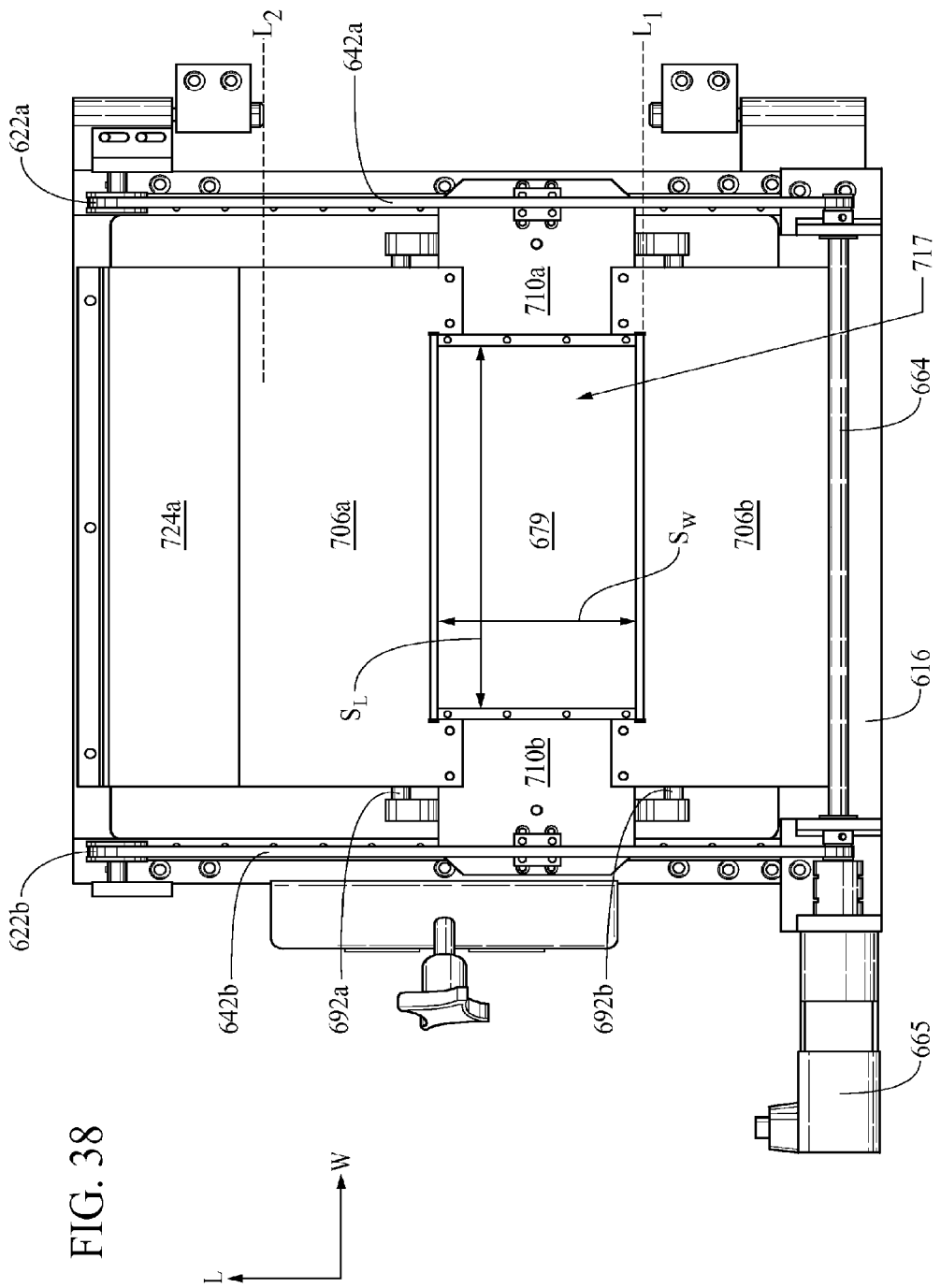
FIG. 38 is a top plan view of the solidification substrate assembly of FIG. 36 depicting an exposure sub-area in a first position with respect to total exposable area of a solidification material.
Figure 39:
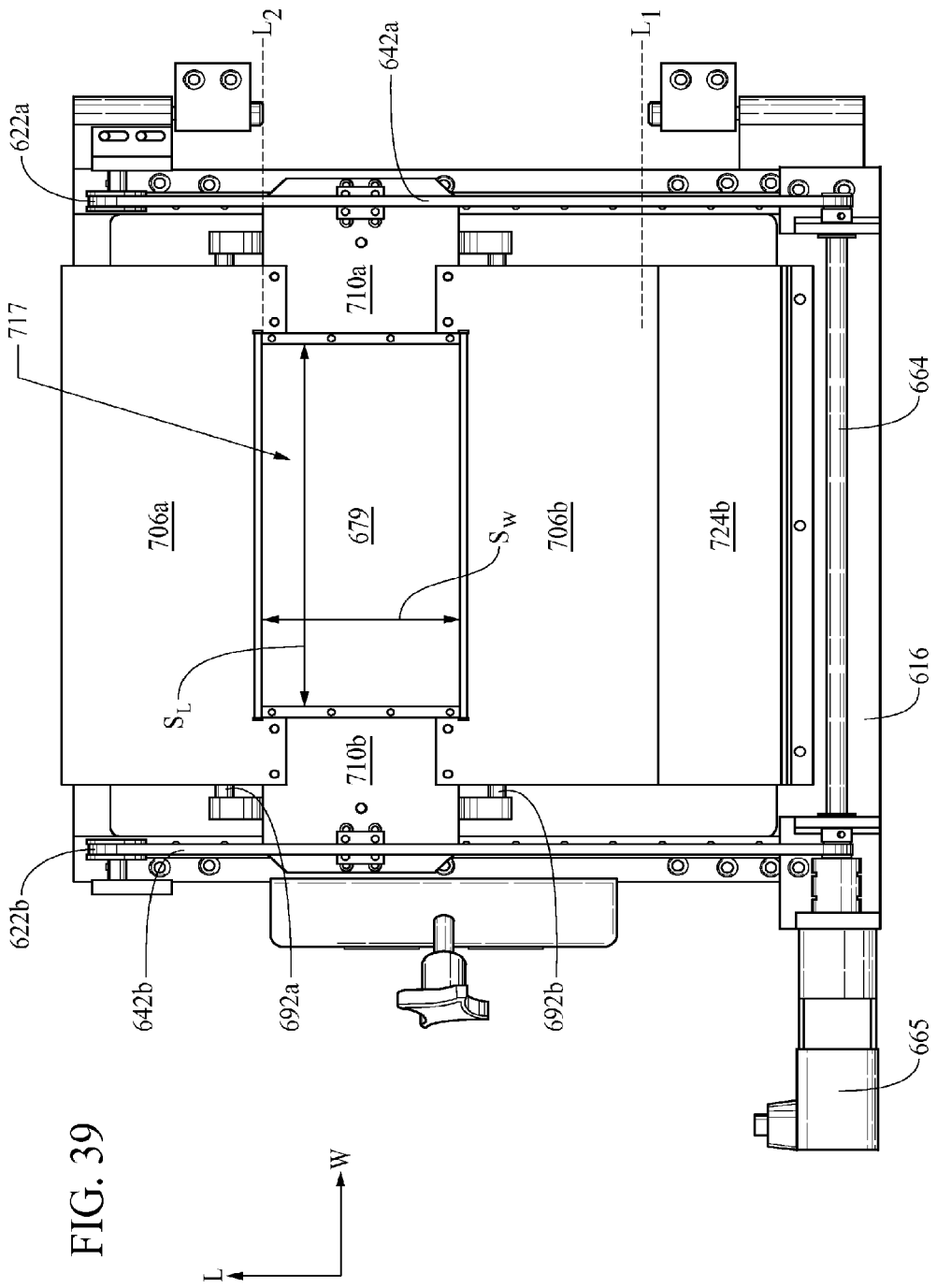
FIG. 39 is a top plan view of the solidification substrate assembly of FIG. 36 depicting an exposure sub-area in a first position with respect to total exposable area of a solidification material.
Figure 40:
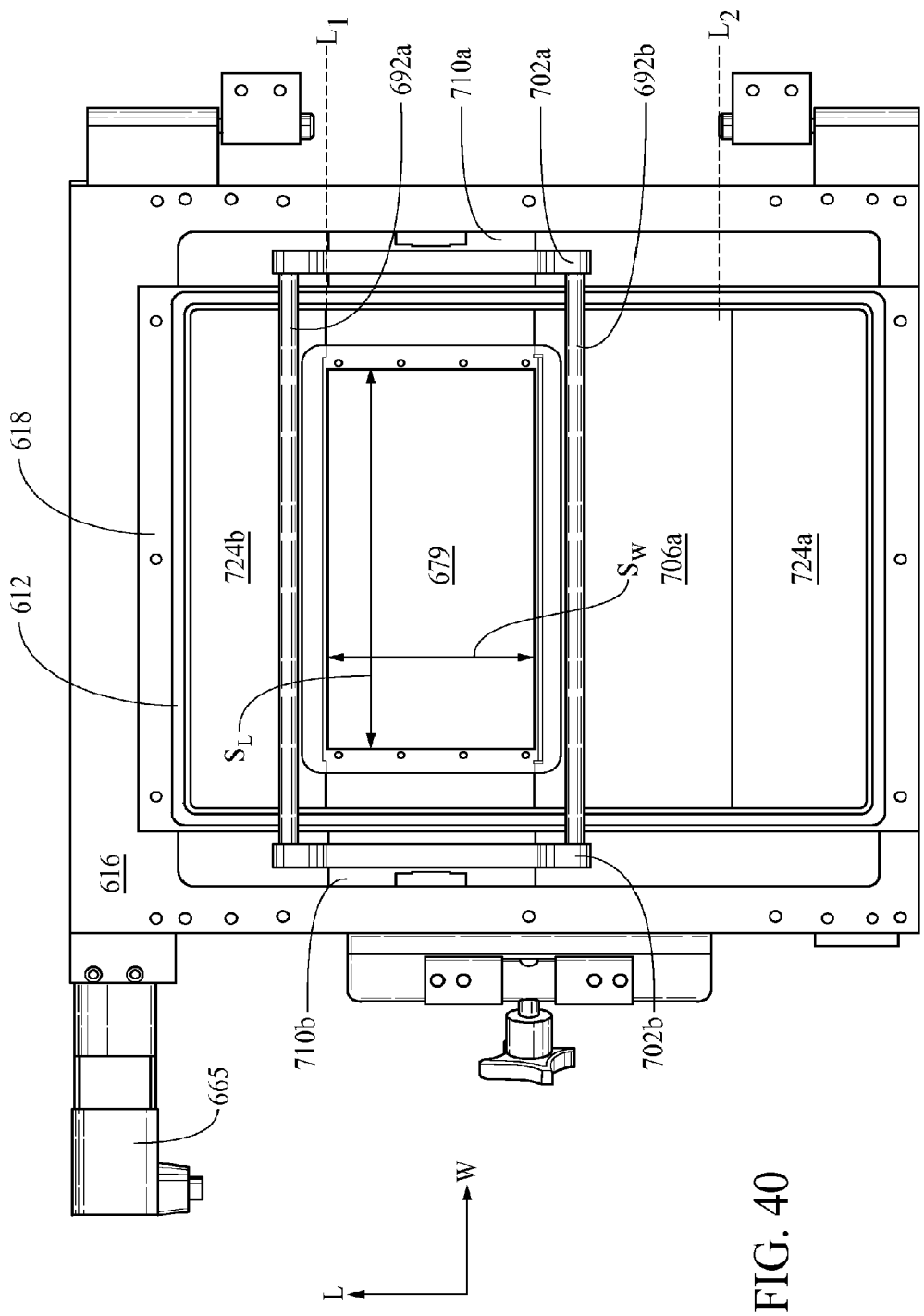
FIG. 40 is a bottom plan view of the solidification substrate assembly of FIG. 38.

As best seen in FIGS. 36, 38, and 39, the only portion of solidifiable material 41 which may be exposed to solidification energy is the portion lying underneath rigid or semi-rigid solidification substrate 679. The remaining portions of the total exposable area of solidifiable material 41 are shielded from solidification energy by moveable covers 706a and 706b and fixed covers 724a and 724b. Referring to FIGS. 36 and 37, moveable covers 706a and 706b are each connected to horizontal panels 714a and 714b of brackets 710a and 710b. Moveable covers 706a and 706b are spaced apart to define an open area in which rigid or semi-rigid solidification substrate 679 is disposed. Moveable covers 706a and 706b are each connected to respective vertical panels 708a and 708b which are spaced apart from one another in the length direction L of solidification substrate assembly 614. In one embodiment, vertical panels 708a and 708b are each connected to an opposing side of rigid or semi-rigid solidification substrate 679 such as by an adhesive. Collectively, vertical panels 712a/712b of rigid or semi-rigid solidification substrate assembly 601, vertical panels 708a and 708b, and moveable covers 706a and 706b define a recess 717 in which rigid or semi-rigid solidification substrate 679 is disposed. In one example, the open area of the recess (i.e., the area parallel to the L×W plane of solidification substrate assembly 614) corresponds to the sub-area of solidifiable material 41 which may receive solidification energy during an exposure.

As best seen in FIG. 43, film frame assembly 613 (not separately shown) is attached to the underside of frame 616 via fasteners connected to frame 616 and lip 626 of inner frame 618. As best seen in FIG. 37, fixed covers 724a and 724b are spaced apart from one another along the length of solidification substrate assembly 614. Fixed covers 724a and 724b may also act as stops which prevent further movement of rigid or semi-rigid solidification substrate assembly 601 due to the engagement of vertical panels 708a and 708b with corresponding fixed covers 724a and 724b. However, in practice, the system may be configured such that vertical panels 708a and 708b never reach and do not come into abutting engagement with their respective fixed covers 724a and 724b.

As shown in FIGS. 36 and 43, moveable covers 706a and 706b are preferably disposed at a height (i.e., in a direction normal to the length and width of solidification substrate assembly 614) which is above the height of their corresponding adjacent fixed covers 724a and 724b. As shown in FIGS. 36 and 43, this allows for a variable degree of overlap between each moveable cover 706a and 706b and its corresponding fixed cover 724a and 724b, which in turn helps ensure that solidification energy is supplied exclusively to the sub-area of solidification material 41 defined by rigid or semi-rigid solidification substrate 679. This configuration facilitates the movement of the sub-area between different positions relative to the total exposable area of the solidifiable material as well as relative to the frame 616 and film assembly 605.

Figure 42:
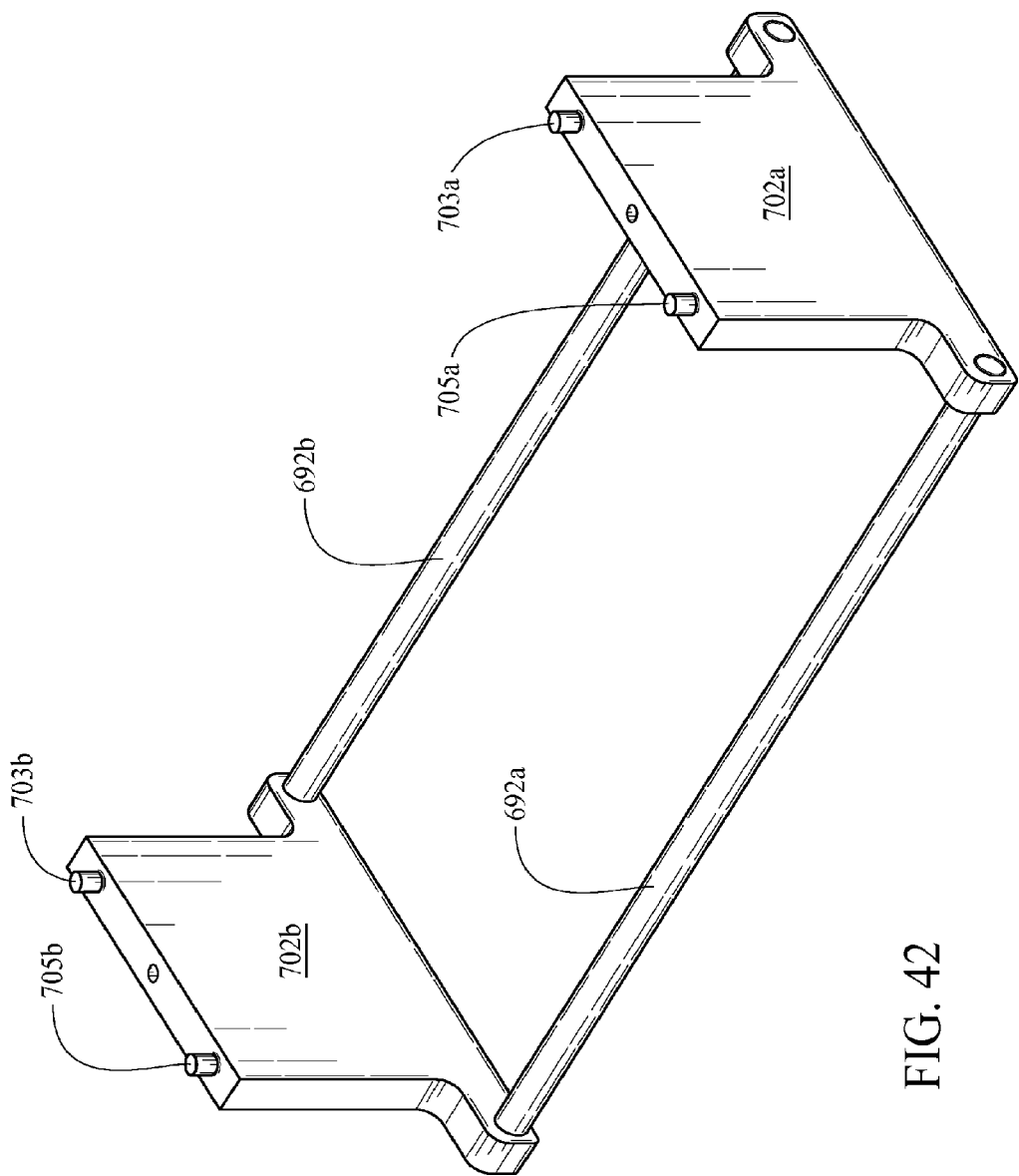
FIG. 42 is a perspective view of the film peeling member assembly of the solidification substrate assembly of FIG. 36.

Referring to FIGS. 37 and 42, solidification substrate assembly 614 includes at least one film peeling member, which in the depicted embodiment is two film peeling members 692a and 692b. Film peeling members 692a and 692b are generally elongated rigid members which are spaced apart from one another along the length L of solidification substrate assembly 614 and on opposite sides of rigid or semi-rigid solidification substrate 679.

In one preferred embodiment, film peeling members 692a and 692b are operatively connected to rigid or semi-rigid solidification substrate 679 to move in a coordinated fashion with rigid or semi-rigid solidification substrate 679. One exemplary apparatus for facilitating this movement is depicted in FIGS. 37 and 42. Referring to FIG. 42, each film peeling member is connected to an opposite side of two brackets 702a and 702b. Brackets 702a and 702b are spaced apart along the width W of solidification substrate assembly 614 while peeling members 692a and 692b are spaced apart along the length L of solidification substrate assembly 614.

Bracket 702a has an upper surface with connectors 703a and 705a which are configured for connection to complementary connectors 718a and 720a formed in horizontal panel 714a of rigid or semi-rigid solidification substrate assembly bracket 710a (FIG. 37, 41). Correspondingly, bracket 702b has an upper surface with connectors 703b and 705b which are configured for connection to complementary connectors 718b and 720b formed in horizontal panel 714b of rigid or semi-rigid solidification substrate assembly bracket 710b. Connectors 703a/b and 705 a/b may be male or female, threaded or unthreaded. Similarly, complementary connectors 718a/720a and 718b/720b may be male or female, threaded or unthreaded. In FIG. 42, connectors 703a/b and 705a/b are male connectors suitable for insertion into corresponding female connectors (e.g., threaded or unthreaded holes) 718a/b and 720a/b.

The connections between brackets 702a/b and 710a/b allow film peeling members 692a and 692b to move in coordination with rigid or semi-rigid solidification substrate assembly 601 as it moves along the length L of solidification substrate assembly 614. Peeling members 692a and 692b are preferably maintained at a fixed distance relative to rigid or semi-rigid solidification substrate 679. As best seen in FIG. 43, rigid or semi-rigid solidification substrate assembly 601 is preferably configured to maintain the upper surface 726 of rigid or semi-rigid solidification substrate 679 beneath inner frame 618 and outer frame 612 of film frame assembly 605 (not separately shown). The lower surface 728 of rigid or semi-rigid solidification substrate 679 is in abutting engagement with object contacting film 694, which facilitates the creation of a substantially planar surface of solidifiable material 41 to which solidification energy is supplied. As shown in FIG. 43, the perimeter of object contacting film 694 is connected to film frame assembly 605 at a height that is above the height of lower-most surface 728 of rigid or semi-rigid solidification substrate. Thus, the portion of object contacting film 694 which engages lower-most surface 728 of rigid or semi-rigid solidifications substrate 679 remains below the film frame assembly 605 defined by inner film frame 618 and outer film frame 612.

Figure 44:
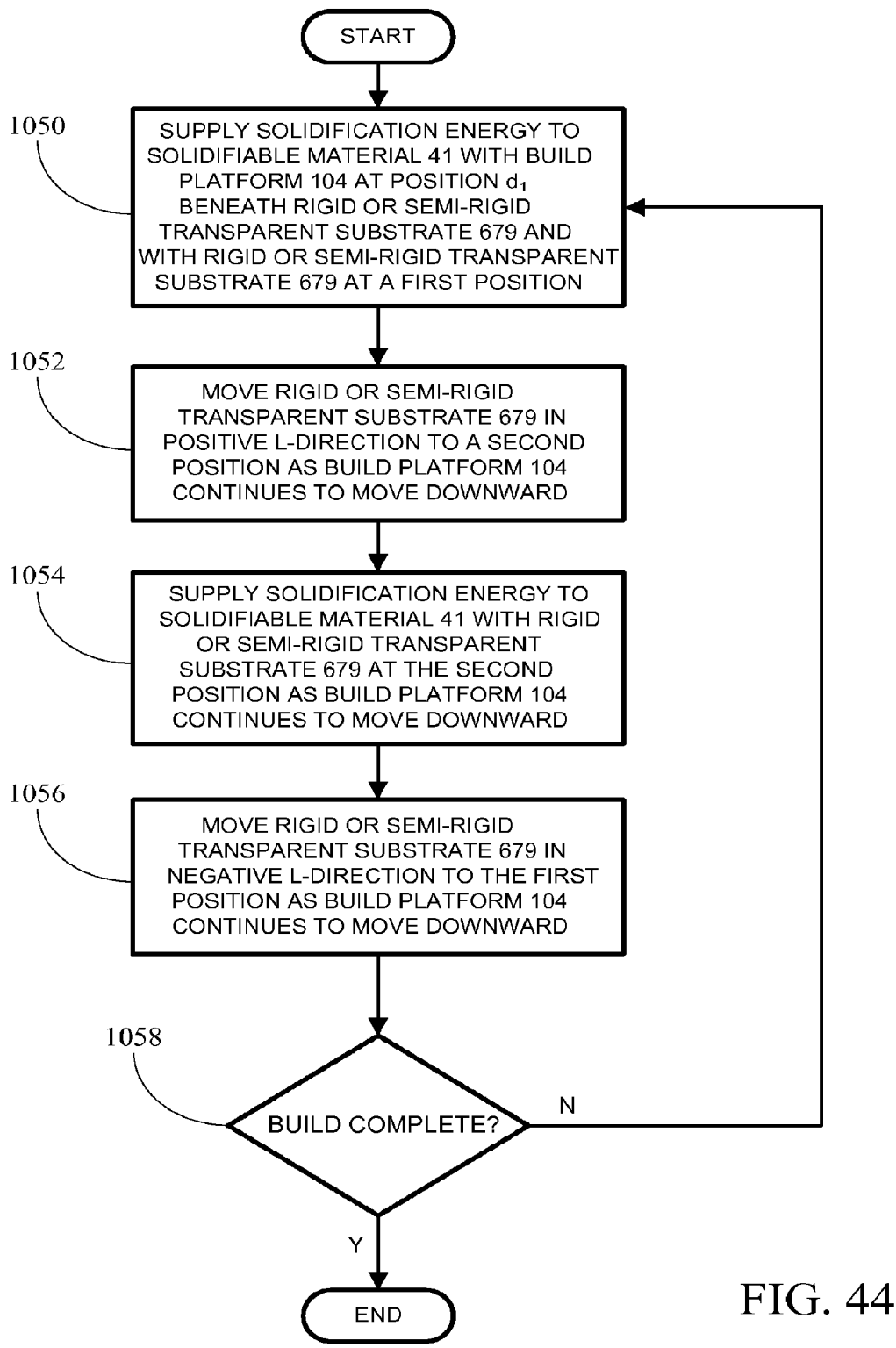
FIG. 44 is a flow chart used to illustrate a method of making a three-dimensional object using the solidification substrate assembly of FIG. 36.

Referring to FIG. 44, a method of forming a three-dimensional object using a system such as system 90 (FIG. 7) in which solidification substrate assembly 614 is installed will now be described. In accordance with the method, rigid or semi-rigid solidification substrate 679 is at a first position shown in FIG. 39 with respect to frame 616 and with respect to the total exposable area of solidifiable material (a corresponding view from the bottom of apparatus 614 is provided in FIG. 40). The total exposable area of solidifiable material 41 represents the total area of solidified material 41 to which solidification energy can be provided as rigid or semi-rigid solidification substrate 679 moves through its full range of travel in the length direction (L) of solidification substrate assembly 679. The total exposable area will be the exposed width ($S_W$) of substrate 679 multiplied by the distance between the end of travel positions $L_1$ in FIG. 38 and $L_2$ in FIG. 39. In FIGS. 38 and 39, $S_L$ represents the exposed length of rigid or semi-rigid solidification substrate 679.

Referring again to FIG. 44, in step 1050 with rigid or semi-rigid solidification substrate 679 at the first position shown in FIG. 38, build platform 104 reaches a depth $d_1$ within solidifiable material 41 relative to substrate 679. Solidification energy is then supplied from above solidification substrate assembly 614 to a sub-area of the total exposable area. Solidification energy incident upon moveable covers 706a, 706b, or fixed covers 724a, 724b will not be transmitted to solidifiable material 41 and will not solidify the material beneath the covers. Solidification energy that is transmitted into the recess 717 (defined by covers 706a/b, 708a/b and panels 714a/b, and 712a/b) and which reaches substrate 679 will be transmitted to solidifiable material 44 and will solidify the material beneath substrate 679 in accordance with the supplied energy pattern. As mentioned previously, the energy pattern may be defined by voxel maps, vectors, bitmaps, etc. The exposed surface area of substrate 679 ($S_L \times S_W$) defines the sub-area of solidifiable material 41 to which energy is transmitted, although the specific locations (e.g., pixels or voxels) within the sub-area which receive solidification energy during any given exposure will depend on the object being built and the supplied energy pattern that corresponds to it. Thus, energy is supplied exclusively to the sub-area of solidifiable material 41 defined by the exposed area ($S_L \times S_W$) of rigid or semi-rigid solidification substrate 679, although not every single portion within the sub-area will necessarily be solidified during a given exposure.

The solidified material 41 will solidify in contact with object contacting film 694 in accordance with the supplied energy pattern. In step 1052, the sub-area of solidifiable material 41 which is defined by the area $S_L \times S_W$ is then moved in a first direction (e.g., positive) along the length (L) axis of solidification substrate assembly 614 from the first position shown in FIG. 38 to the second position shown in FIG. 39. During this movement, peeling members 692a and 692 be will move in coordination with substrate 679 along the length L of solidification substrate assembly 614, thereby peeling object contacting film 694 from the solidified object.

In one exemplary embodiment, solidification substrate assembly 614 is used in a system 90 with a continuously moving build platform 104. In such an embodiment, build platform 104 continues moving into solidifiable material 41 as solidification energy is supplied to the solidifiable material 41. Thus, in step 1054, solidification energy is supplied to solidifiable material 41 with substrate 679 in the second position shown in FIG. 39 as build platform 104 continues to move downward into solidifiable material 41. Although assembly 614 may be used with a continuously moving build platform, such a platform is not required. Solidification substrate assembly 614 may be used in systems in which a build platform 104 moves in discrete increments. In one example, the energy pattern supplied by an imager is identical when rigid or semi-rigid solidification substrate 679 is in both the first position of FIG. 38 and the second position of FIG. 39. However, due to the movement of the substrate 679, a different sub-area of solidifiable material 41 receives the projected energy when substrate 679 is at the two positions. Although FIGS. 38 and 39 describe two discrete substrate 679 positions for which solidification energy is supplied, additional positions and corresponding exposures may be provided. In some examples, solidification energy is also supplied while substrate 679 is moving between positions.

In step 1056, rigid or semi-rigid solidification substrate 679 moves in a second direction (e.g., negative) along the length (L) of solidification substrate assembly 614. As a result, peeling members 692a and 692b peel object contacting film 694 from the solidified object disposed beneath substrate 679. In one exemplary embodiment, build platform 104 continues to move during step 1056. In step 1058, a determination is made as to whether the object build process is complete. If not, control returns to step 1050.

In certain examples, the distance that substrate 679 travels from the first position of FIG. 38 to the second position of FIG. 39 is greater than the exposed dimension of substrate 679 that is parallel to the direction of travel. This technique may be used to ensure that peeling members 692a and 692b traverse the full length (L-direction) of film 694 which is in contact with solidified material. As shown in FIGS. 38 and 39, $S_L$ is the exposed length of the substrate 679, and $S_W$ is the exposed width of the substrate 679. The substrate 679 travels in the direction of the substrate width ($S_W$) and assembly 614 length (L). In the embodiment of FIGS. 38 and 39, substrate 679 travels a distance between exposures to solidification energy (i.e., during step 1052) which is greater than $S_W$ to ensure complete peeling of solidified material from film 694. In certain examples, solidification energy is also supplied between the first position of FIG. 48 and the second position of FIG. 39 to ensure that there are no gaps of uncured material that might otherwise exist if the substrate 679 traverses a distance greater than $S_W$ between exposures to solidification energy.

Referring again to FIG. 43, a cross-sectional view of rigid or semi-rigid solidification substrate 679 is provided. As shown in the figure, substrate 679 has a first upper surface 726 and a second lower surface 728. Substrate 679 also preferably has a beveled edge 730. First surface 726 is positioned proximate inner and outer film frames 618 and 612 and is disposed between second surface 728 and inner and outer film frames 618 and 612. As illustrated in the figure, in certain examples, first upper surface 726 has a surface area greater than the surface area of second lower surface 728. The use of a beveled edge 730 and an upper surface 726 with a surface area greater than lower surface 728 improves the ability of substrate 679 to slide along film 694 as substrate 679 moves relative to frame 616 and film 649. As shown in FIG. 43, when viewed in cross-section, lower surface 728 has a substantially flat region 735 disposed inward of beveled edge 730.

In certain embodiments that include a beveled edge such as edge 730, steps are taken to reduce the likelihood of image distortion that curved substrate geometries may cause. As indicated in FIG. 43, the exposed surface area 737 (i.e., $S_L \times S_W$) of upper surface 726 is substantially equal to the surface area of substantially flat region 735 of second lower surface 728 because of the positioning of vertical panels 712a and 712b. As shown in FIG. 43, vertical panels 712a and 712b are positioned inward of the beveled edge 730 leaving end portions 731 and 733 outside of the exposed area. Vertical panels 712a and 712b are preferably positioned to ensure that only portions of solidifiable material under substantially flat region 735 of surface 728 receive solidification energy in order to avoid image distortion that may otherwise occur. Thus, in the example of FIG. 43, solidification energy is received by substantially flat surface 737 and transmitted from a substantially flat surface 735. In certain preferred examples, no solidification energy is transmitted from beveled edge 730 to solidifiable material 41.

In the solidification substrate assembly 614 depicted in FIGS. 36-43, only one rigid or semi-rigid solidification substrate assembly 601 and one set of peeling members 692a and 692b are used. However, two or more adjacent sets of a substrate assembly 601 and peeling members 692a/692b may be used, with each set being configured with its own associated moveable covers 706a/706b, vertical panels 708a/708b, and peeling member brackets 702a/702b.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of producing a three-dimensional object on a build platform from a solidifiable material, wherein the build platform moves along a build axis, the method comprising:
    providing a source of solidifiable material having a total exposable area perpendicular to the build axis to which solidification energy may be supplied;
    supplying solidification energy exclusively to a first sub-area of the total exposable area where the first sub area is at a first location along a horizontal axis with respect to the total exposable area; and then
    supplying solidification energy exclusively to a second sub area that is the same size as the first sub area of the total exposable area where the second sub area is at a second location along the horizontal axis with respect to the total exposable area.

2. The method of claim 1, wherein the step of supplying solidification energy exclusively to a sub-area of the total exposure area while the first sub area is at the first location along the horizontal axis causes the solidifiable material at the first location to solidify in contact with a film, and wherein a step of transitioning along the horizontal axis from the first location to the second location with respect to the total exposable area further comprises peeling solidified material from the film at the first location.

3. The method of claim 2, wherein the step of peeling solidified material from the film at the first location comprises providing at least one film peeling member disposed between the film and the solidified material and moving the at least one film peeling member along the horizontal axis.

4. The method of claim 1, wherein the build platform is moveable in the source of solidifiable material, and during the step of supplying solidification energy exclusively to the first sub area of the total exposable area while the sub-area is at the first location along the horizontal axis, the build platform continuously moves in the source of solidifiable material.

5. The method of claim 1, wherein the step of supplying solidification energy exclusively to the first sub area of the total exposable area while the sub-area is at a first location along the horizontal axis with respect to the total exposable area comprises supplying solidification energy from a pattern generator.

6. The method of claim 5, wherein the pattern generator is a digital light projector.

7. The method of claim 5, wherein the pattern generator is stationary.

8. The method of claim 5, wherein the pattern generator comprises a moving light source.

9. The method of claim 5, wherein the pattern generator supplies solidification energy in selected patterns of pixels having gray scale values and corresponding to the three-dimensional object.

10. The method of claim 1, further comprising:
    providing a pair of movable covers spaced apart by a movable opening, wherein the step of supplying solidification energy exclusively to the first sub area of the total exposable area while the sub-area is at a first location along the horizontal axis with respect to the total exposable area opening comprises supplying solidification energy through the movable opening while the opening is at the first location along the horizontal axis with respect to the total exposable area.

11. The method of claim 10, further comprising:
    providing a rigid or semi-rigid solidification substrate that is transparent and/or translucent, wherein at least a portion of the rigid or semi-rigid solidification substrate is located in the opening, and wherein a step of transitioning along the horizontal axis from the first location to the second location with respect to the total exposable area further comprises moving the rigid or semi-rigid solidification substrate along the horizontal first axis to the second location with respect to the total exposable area.

12. The method of claim 1, further comprising providing a film, wherein as a result of the step of supplying solidification energy exclusively to the first sub area of the total exposable area while the first sub area is at the first location along the horizontal axis with respect to the total exposable area, a portion of the solidifiable material located within the first sub area solidifies in contact with the film, and the method also comprises peeling the film from the solidified material.

13. The method of claim 12, wherein the step of peeling the film from the solidified material comprises traversing at least one peeling member along the horizontal axis.

14. The method of claim 1, further comprising providing image data representative of a cross-section of the object, wherein the step of supplying solidification energy exclusively to the first sub area of the total exposable area while the first sub area is at a first location along the horizontal axis with respect to the total exposable area comprises first supplying solidification energy in a pattern corresponding to the image data, and the step of supplying solidification energy exclusively to the sub-area of the total exposable area while the second sub area is at the second location along the horizontal axis with respect to the total exposable area comprises second supplying solidification energy in the pattern corresponding to the image data.

15. An apparatus for making a three-dimensional object on a build platform from a solidifiable material, wherein the build platform is movable along a vertical build axis, the method comprising:
    a source of the solidifiable material having a total exposable area perpendicular to the build axis;
    a cover assembly having an opening defining a sub-area of the total exposable area, the cover assembly being movable along a horizontal axis;
    a pattern generator operable to supply solidification energy exclusively to the sub-area through the opening.

16. The apparatus of claim 15, wherein the pattern generator is stationary relative to the cover assembly.

17. The apparatus of claim 15, wherein the pattern generator is a digital light projector.

18. The apparatus of claim 15, wherein the pattern generator is a moving light source.

19. The apparatus of claim 15, wherein the pattern generator is configured to supply solidification energy in patterns of pixels based on gray scale values.

20. The apparatus of claim 15, further comprising a rigid or semi-rigid substrate that is transparent and/or translucent, wherein at least a portion of the rigid or semi-rigid solidification substrate is located in the opening and is movable along the horizontal axis with the cover assembly.

21. The apparatus of claim 15, further comprising a film, wherein at least a portion of the film is located in the opening between an exposed surface of the solidifiable material and the pattern generator along the build axis.

22. The apparatus of claim 21, further comprising at least one peeling member that is movable along the horizontal axis with the cover assembly.

23. The apparatus of claim 15, wherein the cover assembly is located between the source of the solidifiable material and the pattern generator along the build axis.

24. The method of claim 10, further comprising:
providing a pair of fixed covers comprising first and second fixed covers spaced apart from one another along the horizontal axis, wherein a first movable cover of the pair of movable covers is movable along the horizontal axis over and relative to a first fixed cover of the pair of fixed covers, and a second movable cover of the pair of movable covers is movable along the horizontal axis over and relative to a second fixed cover of the pair of fixed covers.

* * * * *

UNITED STATES PATENT AND TRADEMARK OFFICE
CERTIFICATE OF CORRECTION

PATENT NO. : 9,486,944 B2
APPLICATION NO. : 13/740397
DATED : November 8, 2016
INVENTOR(S) : Ali El-Siblani et al.

It is certified that error appears in the above-identified patent and that said Letters Patent is hereby corrected as shown below:

In the Claims
Column 43, Line 36, delete "a" in "a sub-area" and add --first-- before "sub-area"
Column 43, Line 37, delete "while" and add --where--
Column 43, Line 52, delete "while" and add --where--; add --first-- before "sub-area"
Column 43, Line 58, delete "while" and add --where--; add --first-- before "sub-area"; delete "a" in "a first location" and add --the-- before "first location"
Column 44, Lines 9-10, delete "while" and add --where--; add --first-- before "sub-area"; delete "a" in "a first location" and add --the-- before "first location"
Column 44, Line 24, delete "first"
Column 44, Line 29, delete "while" and add --where--
Column 44, Line 41, delete "while" and add --where--
Column 44, Line 42, delete "a" in "a first location" and add --the-- before "first location"
Column 44, Line 46, before "sub-area" add --second--
Column 44, Line 47, delete "while" and add --where--
Column 45, Line 18, add --vertical-- before "build"

Signed and Sealed this
Twenty-seventh Day of December, 2016

Michelle K. Lee
*Director of the United States Patent and Trademark Office*